United States Patent
Krivenok

(10) Patent No.: US 11,281,374 B2
(45) Date of Patent: Mar. 22, 2022

(54) AUTOMATED STORAGE NETWORK RECONFIGURATION FOR HETEROGENEOUS STORAGE CLUSTERS

(71) Applicant: EMC IP Holding Company LLC, Hopkinton, MA (US)

(72) Inventor: Dmitry Vladimirovich Krivenok, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/082,186

(22) Filed: Oct. 28, 2020

(65) Prior Publication Data

US 2021/0334004 A1 Oct. 28, 2021

(30) Foreign Application Priority Data

Apr. 28, 2020 (RU) .......................... RU2020114936

(51) Int. Cl.
*G06F 3/06* (2006.01)
*H04L 12/46* (2006.01)
(Continued)

(52) U.S. Cl.
CPC ............ *G06F 3/0607* (2013.01); *G06F 3/067* (2013.01); *G06F 3/0629* (2013.01);
(Continued)

(58) Field of Classification Search
CPC ......... G06F 2009/45595; G06F 3/0607; G06F 3/0629; G06F 3/0658; G06F 3/0664; G06F 3/067; G06F 9/45558
See application file for complete search history.

(56) References Cited

U.S. PATENT DOCUMENTS 8,954,383 B1 2/2015 Vempati et al.
9,003,227 B1 4/2015 Patel et al.
(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.
(Continued)

*Primary Examiner* — Yong J Choe
(74) *Attorney, Agent, or Firm* — Ryan, Mason & Lewis, LLP

(57) ABSTRACT

An apparatus includes a processing device configured to receive a request to change a given storage network from a first to a second configuration, the given storage network being associated with a heterogeneous storage cluster comprising a plurality of storage targets and initiators having first network addresses in the first configuration. The processing device is also configured to generate a shadow storage network comprising second network addresses having the second configuration, to assign the second network addresses to a subset of a plurality of storage targets and initiators affected by the request to change the given storage network from the first to the second configuration, and, responsive to validating connectivity of the subset of the plurality of storage targets and initiators, to apply the requested change by unassigning ones of the first network addresses assigned to the subset of the plurality of storage targets and initiators.

20 Claims, 67 Drawing Sheets

(51) Int. Cl.
*H04L 61/5007* (2022.01)
*H04L 101/659* (2022.01)
*G06F 9/455* (2018.01)

(52) U.S. Cl.
CPC .......... *G06F 3/0658* (2013.01); *G06F 3/0664* (2013.01); *G06F 9/45558* (2013.01); *H04L 12/4641* (2013.01); *H04L 61/2007* (2013.01); *H04L 61/6059* (2013.01); *G06F 2009/45579* (2013.01); *G06F 2009/45595* (2013.01)

(56) References Cited

U.S. PATENT DOCUMENTS

| | | | |
|---|---|---|---|
| 9,104,675 | B1 | 8/2015 | Clark et al. |
| 9,778,996 | B1 | 10/2017 | Bono et al. |
| 9,836,243 | B1 | 12/2017 | Chanler et al. |
| 10,210,048 | B2 | 2/2019 | Sancheti |
| 10,474,367 | B1 | 11/2019 | Mallick et al. |
| 2011/0307447 | A1 | 12/2011 | Sabaa et al. |
| 2015/0317326 | A1 | 11/2015 | Bandarupalli et al. |
| 2016/0077746 | A1* | 3/2016 | Muth .................... G06F 3/0644 711/159 |
| 2017/0277709 | A1 | 9/2017 | Strauss et al. |
| 2018/0285198 | A1 | 10/2018 | Dantkale et al. |
| 2018/0307609 | A1 | 10/2018 | Qiang et al. |
| 2020/0133541 | A1 | 4/2020 | Kleiner et al. |
| 2020/0241793 | A1 | 7/2020 | Shveidel et al. |

OTHER PUBLICATIONS

NVM Express, "NVM Express, Revision 1.3," NVM Express, May 1, 2017, 282 pages.
Commvault, "Storage Policy (Snapshot)" https://documentation.commvault.com/commvault/v11/article?p=60105_1.htm, Sep. 12, 2019, 3 pages.
Oracle, "Managing Snapshots," https://docs.cloud.oracle.com/en-us/iaas/Content/File/Tasks/managingsnapshots.htm, 2020, 3 pages.
U.S. Appl. No. 16/861,986 filed in the name of Vladimir Shveidel et al. Apr. 29, 2020, and entitled "Lockless Metadata Binary Tree Access."
U.S. Appl. No. 16/862,733 filed in the name of Alexander S. Mathews et al. Apr. 30, 2020, and entitled "Finding Storage Objects of a Snapshot Group Pointing to a Logical Page in a Logical Address Space of a Storage System."
U.S. Appl. No. 16/862,735 filed in the name of Dixitkumar Vishnubhai Patel et al. Apr. 30, 2020, and entitled "Mapping Virtual Block Addresses to Portions of a Logical Address Space that Point to the Virtual Block Addresses."
U.S. Appl. No. 16/862,740 filed in the name of Rohit K. Chawla et al. Apr. 30, 2020, and entitled "Generating Recommendations for Initiating Recovery of a Fault Domain Representing Logical Address Space of a Storage System."
U.S. Appl. No. 16/863,433 filed in the name of Sorin Faibish et al. Apr. 30, 2020, and entitled "Cache Retention for Inline Deduplication Based on Number of Physical Blocks with Common Fingerprints Among Multiple Cache Entries."
U.S. Appl. No. 16/879,459 filed in the name of Yousheng Liu et al. May 20, 2020, and entitled "Reusing Overwritten Portion of Write Buffer of a Storage System."
U.S. Appl. No. 16/888,668 filed in the name of Kundan Kumar et al. May 30, 2020, and entitled "Selective Snapshot Creation Using Source Tagging of Input-Output Operations."
U.S. Appl. No. 16/897,388 filed in the name of Alex Soukhman et al. Jun. 10, 2020, and entitled "Garbage Collection in a Storage System at Sub-Virtual Block Granularity Level."
U.S. Appl. No. 16/907,560 filed in the name of Vamsi K. Vankamamidi et al. Jun. 22, 2020, and entitled "Regulating Storage Device Rebuild Rate in a Storage System."
U.S. Appl. No. 16/916,219 filed in the name of Vladimir Kleiner et al. Jun. 30, 2020, and entitled "Application Execution Path Tracing for Inline Performance Analysis."
U.S. Appl. No. 16/916,621 filed in the name of Dixitkumar Vishnubhai Patel et al. Jun. 30, 2020, and entitled "Reconstruction of Logical Pages in a Storage System."
U.S. Appl. No. 16/916,763 filed in the name of Dixitkumar Vishnubhai Patel et al. Jun. 30, 2020, and entitled "Reconstruction of Links between Logical Pages in a Storage System."
U.S. Appl. No. 16/917,090 filed in the name of Dixitkumar Vishnubhai Patel et al. Jun. 30, 2020, and entitled "Reconstruction of Links to Orphaned Logical Pages in a Storage System."
U.S. Appl. No. 16/938,272 filed in the name of Xiangping Chen et al. Jul. 24, 2020, and entitled "Efficient Token Management in a Storage System."

* cited by examiner

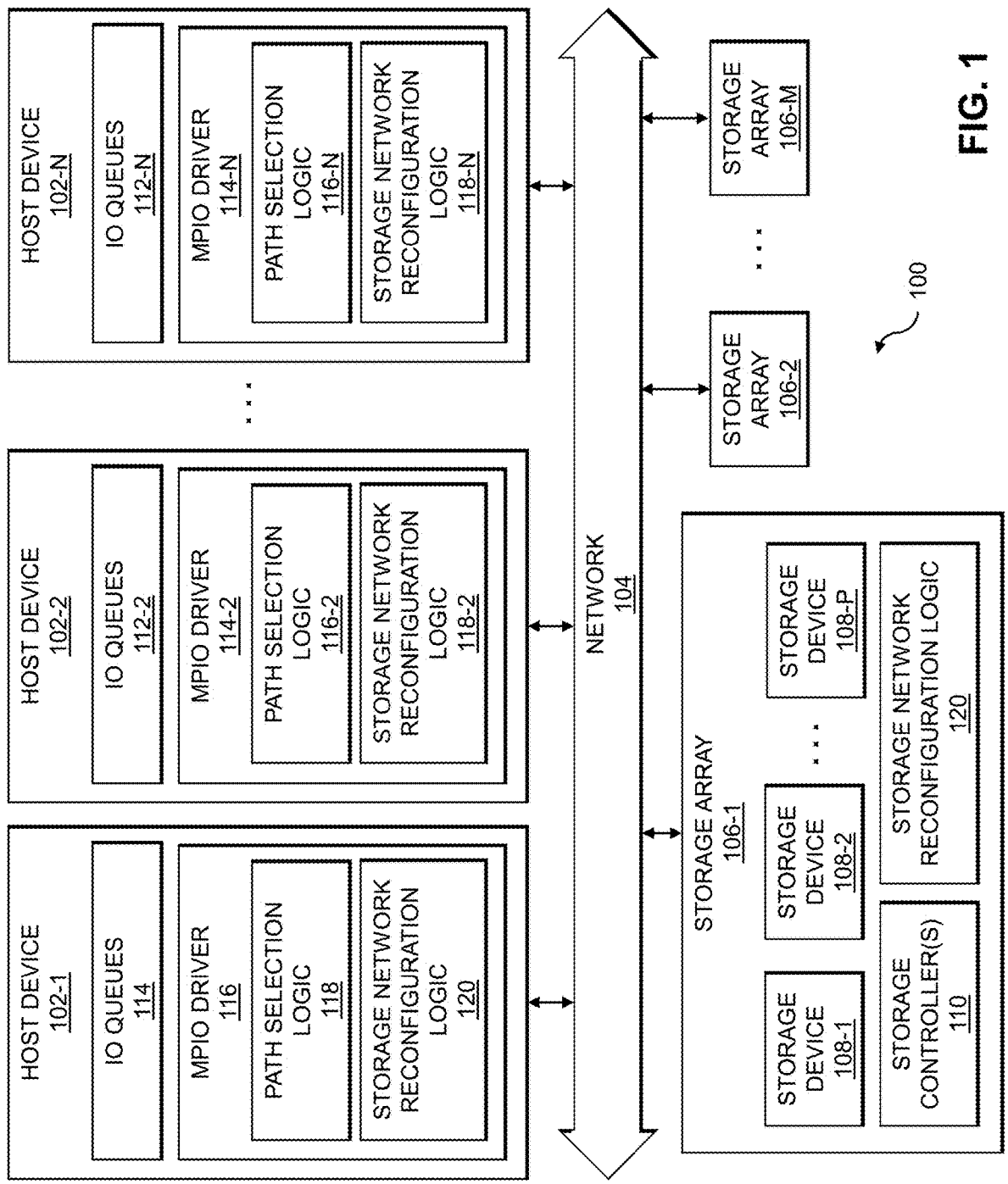

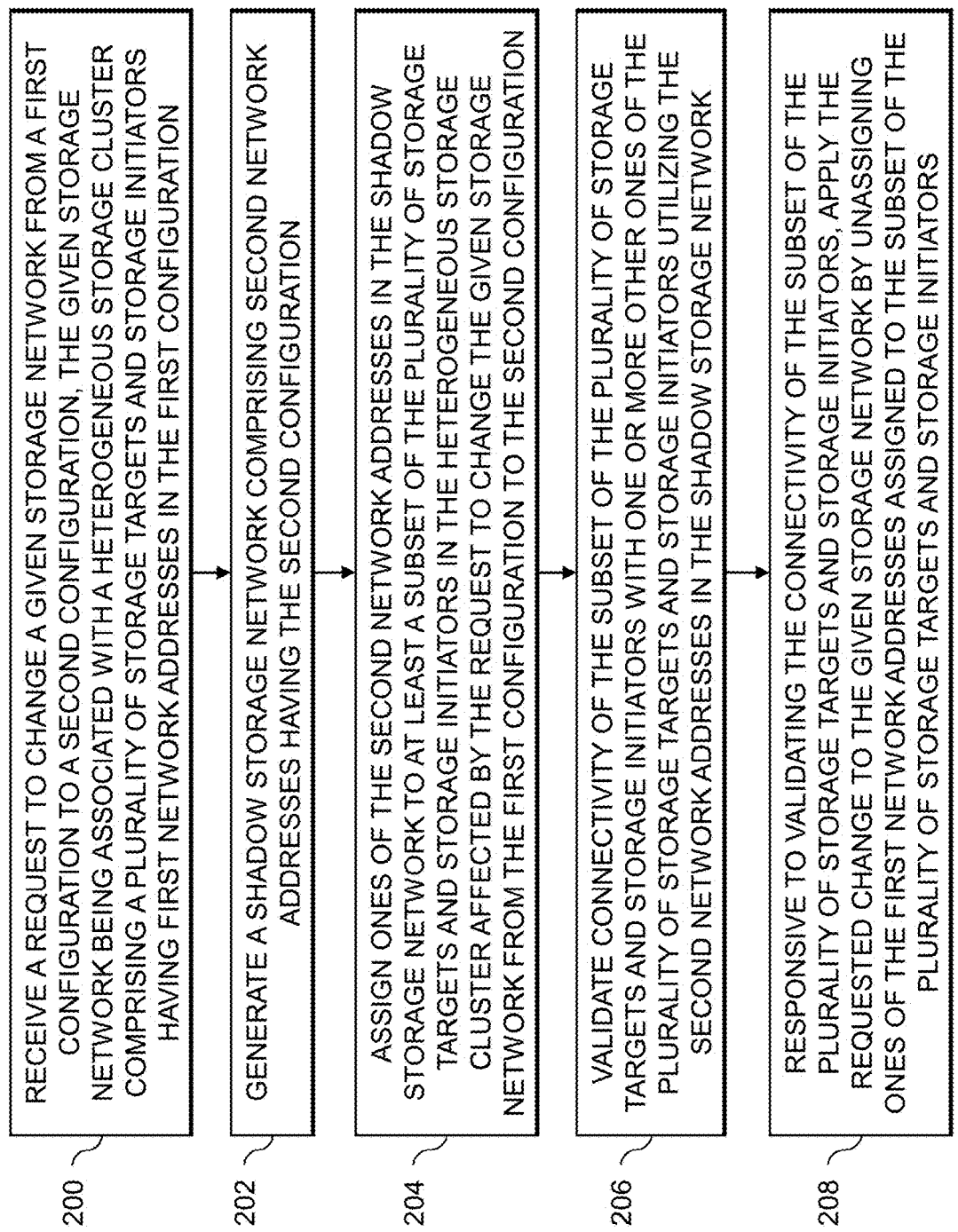

LOGICAL NETWORK — 701

- ID
- NAME
- TYPE/PURPOSE
- IP ADDRESS RANGE
- IP VERSION
- NETWORK PREFIX
- ROUTING (OPTIONAL)
  - GATEWAY
  - STATIC ROUTES
- VLAN ID (OPTIONAL)
- MTU
- PROTOCOLS (OPTIONAL)
- : : :

STORAGE NETWORK — 703

- ID: N1
- NAME: "DEFAULT STORAGE NETWORK"
- TYPE/PURPOSE: STORAGE
- IP ADDRESS RANGE: 10.0.1.20-10.0.1.33
- IP VERSION: IPv4
- NETWORK PREFIX: /24
- ROUTING:
  - GATEWAY: 10.0.1.1
  - STATIC ROUTES: 10.0.2.024 VIA 10.0.1.2
- VLAN ID: 1082
- MTU: 9000
- PROTOCOLS:
  - iSCSI: ON
  - NVMe/TCP: ON
  - NVMe/ROCEv2: OFF

FIG. 7

801 STORAGE NETWORK

ID: N1

NAME: "DEFAULT STORAGE NETWORK"

TYPE/PURPOSE: STORAGE

IP ADDRESS RANGE: 10.0.1.20-10.0.1.33

IP VERSION: IPv4

NETWORK PREFIX: /24

ROUTING:
 GATEWAY: 10.0.1.1
 STATIC ROUTES: 10.2.0.24 VIA 10.0.1.2

VLAN ID: 1082

MTU: 9000

PROTOCOLS:
 iSCSI: ON
 NVMe/TCP: ON
 NVMe/ROCEv2: OFF

⇒

803 STORAGE NETWORK

ID: N1

NAME: "DEFAULT STORAGE NETWORK"

TYPE/PURPOSE: STORAGE

IP ADDRESS RANGE: fd00::2-fd00::40

IP VERSION: IPv6

NETWORK PREFIX: /64

ROUTING:

VLAN ID: 511

MTU: 4200

PROTOCOLS:
 iSCSI: OFF
 NVMe/TCP: OFF
 NVMe/ROCEv2: ON

FIG. 8

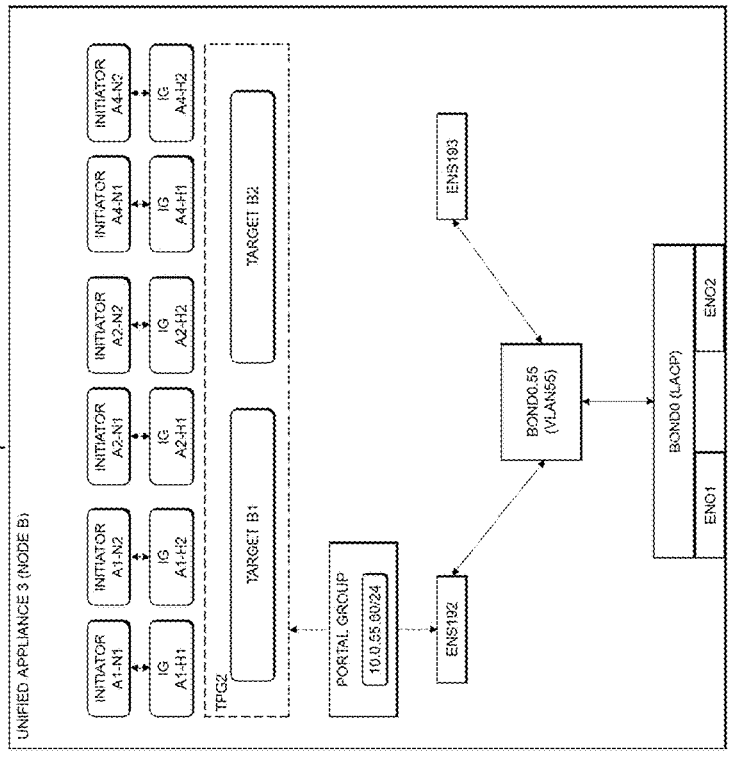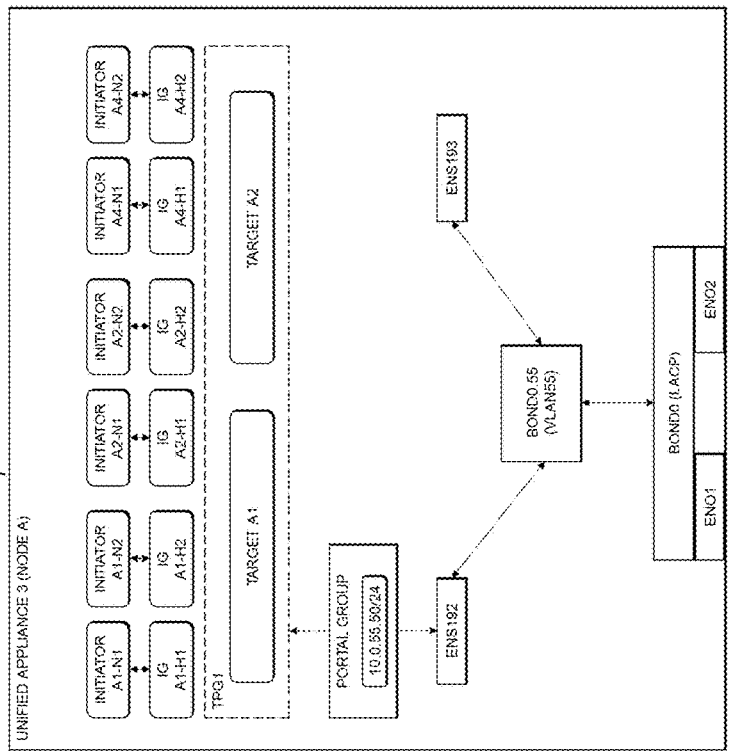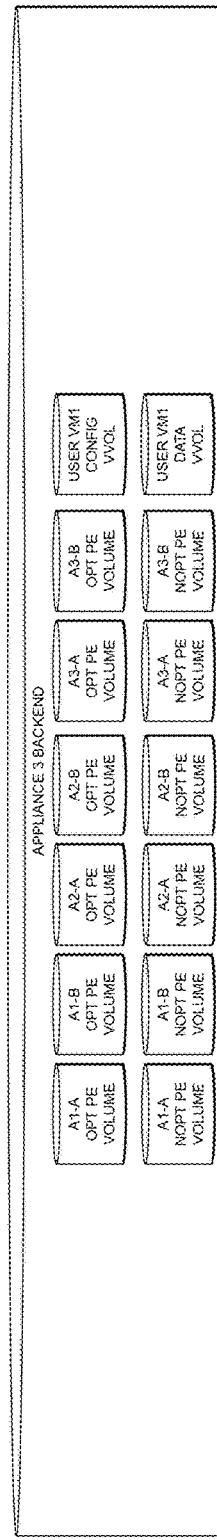
FIG. 14C

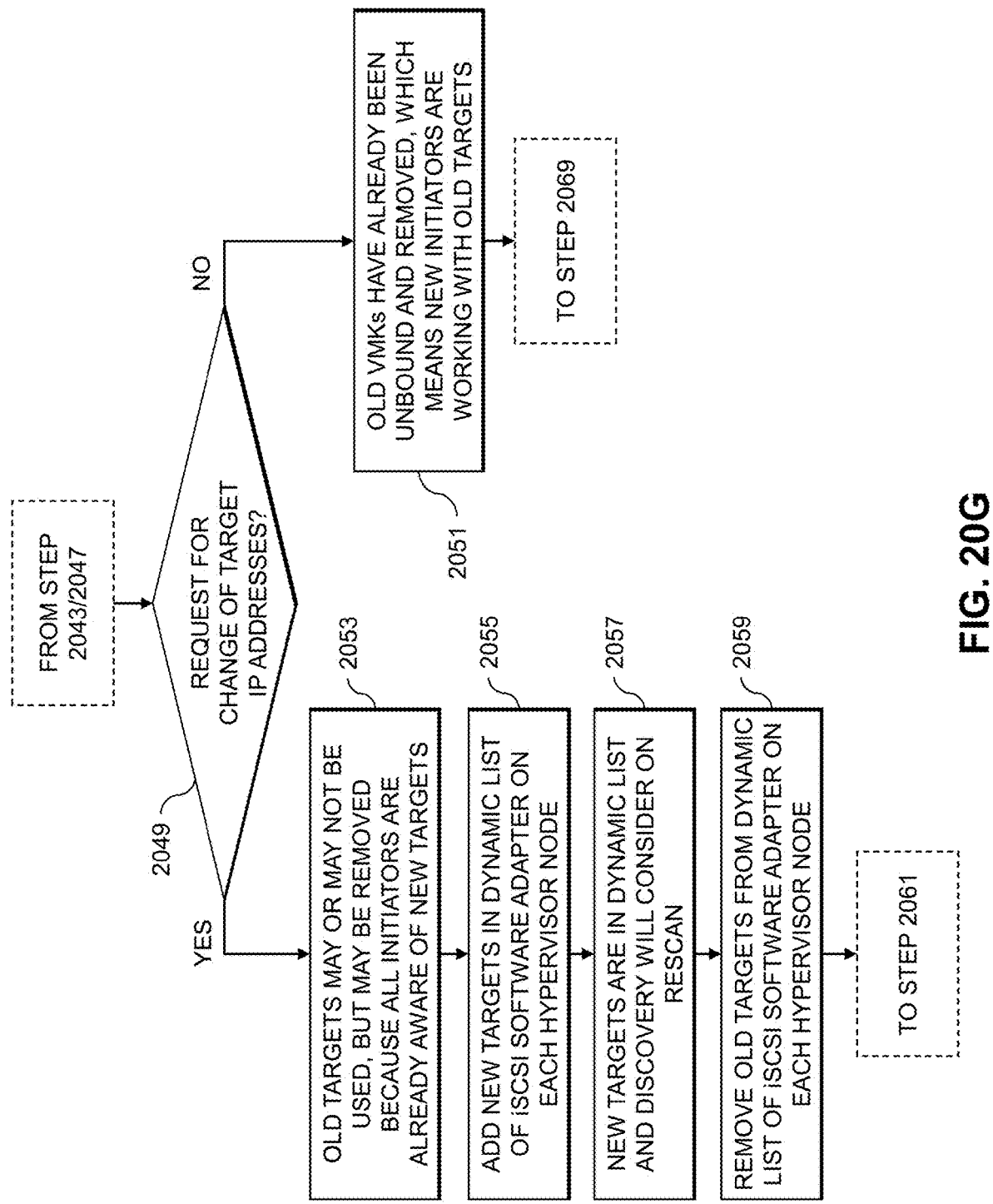

AUTOMATED STORAGE NETWORK RECONFIGURATION FOR HETEROGENEOUS STORAGE CLUSTERS

FIELD

The field relates generally to information processing, and more particularly to storage in information processing systems.

BACKGROUND

Storage arrays and other types of storage systems are often shared by multiple host devices over a network. In some information processing systems, one or more storage arrays or storage systems are part of a storage cluster having an associated storage network for interconnection with internal and external clients running on the storage systems and host devices. Applications running on the internal and external clients issue input-output (IO) operation requests for delivery to the storage systems of the storage cluster using the storage network. Storage controllers of the storage systems service such IO operation requests. Over time, there may be a need to alter the configuration of the storage network utilized by the storage cluster. Such configuration changes are difficult to implement without disrupting processing of the IO operation requests.

SUMMARY

Illustrative embodiments of the present disclosure provide techniques for automatic reconfiguration of storage networks for heterogeneous storage clusters.

In one embodiment, an apparatus comprises at least one processing device comprising a processor coupled to a memory. The at least one processing device is configured to perform the step of receiving a request to change a given storage network from a first configuration to a second configuration, the given storage network being associated with a heterogeneous storage cluster comprising a plurality of storage targets and storage initiators having first network addresses in the first configuration. The at least one processing device is also configured to perform the steps of generating a shadow storage network comprising second network addresses having the second configuration, assigning ones of the second network addresses in the shadow storage network to at least a subset of the plurality of storage targets and storage initiators in the heterogeneous storage cluster affected by the request to change the given storage network from the first configuration to the second configuration, and validating connectivity of the subset of the plurality of storage targets and storage initiators with one or more other ones of the plurality of storage targets and storage initiators utilizing the second network addresses in the shadow storage network. The at least one processing device is further configured to perform the step of, responsive to validating the connectivity of the subset of the plurality of storage targets and storage initiators, applying the requested change to the given storage network by unassigning ones of the first network addresses assigned to the subset of the plurality of storage targets and storage initiators.

These and other illustrative embodiments include, without limitation, methods, apparatus, networks, systems and processor-readable storage media.

BRIEF DESCRIPTION OF THE DRAWINGS

FIG. 1 is a block diagram of an information processing system including a heterogeneous storage cluster configured for automatic storage network reconfiguration in an illustrative embodiment.

FIG. 2 is a flow diagram of an exemplary process for automatic reconfiguration of a storage network for a heterogeneous storage cluster in an illustrative embodiment.

FIG. 7 illustrates a logical cluster-wide storage network configuration and a physical cluster-wide storage network configuration in an illustrative embodiment.

FIG. 8 illustrates cluster-wide storage network reconfiguration in an illustrative embodiment.

FIGS. 20A-20H are a flow diagram of an exemplary process for shadow network reconfiguration of a storage network in an illustrative embodiment.

DETAILED DESCRIPTION

Figure 3A:
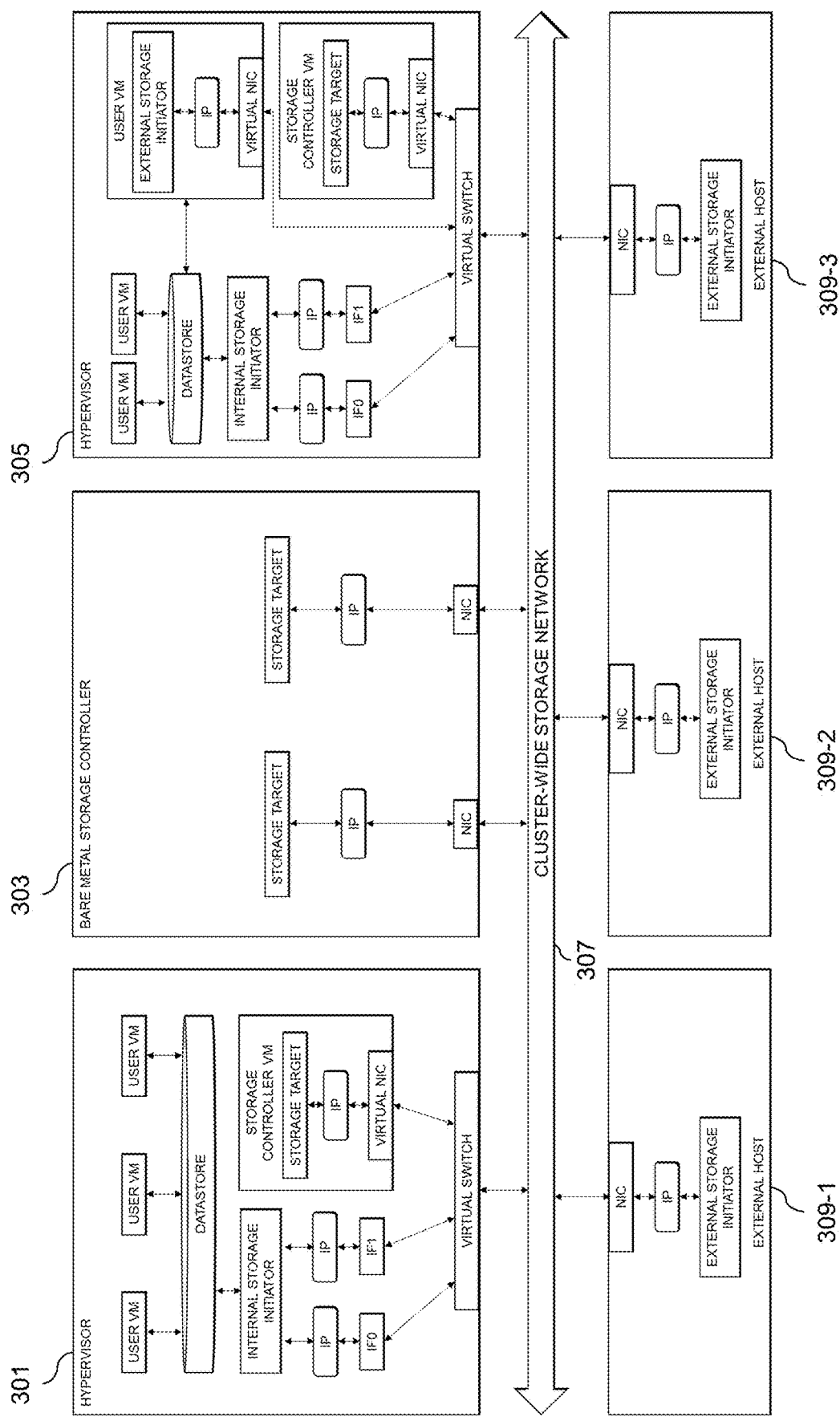
FIGS. 3A-3E illustrate a heterogeneous storage cluster in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102-1, 102-2, . . . 102-N comprise respective sets of IO queues 112-1, 112-2, . . . 112-N (collectively, IO queues 112) and respective MPIO drivers 114-1, 114-2, . . . 114-N (collectively, MPIO drivers 114). The MPIO drivers 114 comprise a multi-path layer of the host devices 102. The multi-path layer provides functionality for dynamic control of one or more path selection algorithms. Such functionality is provided at least in part using respective instances of path selection logic 116-1, 116-2, . . . 116-N (collectively, path selection logic 116) implemented within the MPIO drivers 114. The MPIO drivers 114 are also configured, in some embodiments, to provide functionality for automated reconfiguration of a storage network associated with a heterogeneous storage cluster comprising one or more of the storage arrays 106. More specifically, the MPIO drivers 114 may provide functionality for at least partially automating the reconfiguration of external storage initiators on the host devices 102. Such functionality is provided at least in part using respective instances of storage network reconfiguration logic 118-1, 118-2, . . . 118-N (collectively, storage network reconfiguration logic 118), which will be described in further detail below.

The MPIO drivers 114 may comprise, for example, otherwise conventional MPIO drivers, such as PowerPath® drivers from Dell EMC, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, one or more of the MPIO drivers 114 can comprise one or more software programs running on a hardware processor of one or more of the host devices 102.

The MPIO driver 114-1 is configured to deliver IO operations selected from its corresponding set of IO queues 112-1 to one or more of the storage arrays 106 via selected ones of multiple paths over the network 104 (which, as noted above, may comprise a SAN). The sources of the IO operations stored in the set of IO queues 112-1 illustratively include respective processes of one or more applications executing on the host device 102-1. For example, IO operations can be generated by each of multiple processes of a database application running on the host device 102-1. Such processes issue IO operations for delivery to the storage arrays 106 over the network 104. Other types of sources of IO operations may be present in a given implementation of system 100.

The paths from the host device 102-1 to the storage arrays 106 illustratively comprise paths associated with respective storage initiator-storage target (also referred to as initiator-target) pairs, with each storage initiator comprising a host bus adaptor (HBA) or other initiating entity of the host device 102-1 and each storage target comprising a port or other targeted entity corresponding to one or more of the storage devices of the storage array 106. The storage devices of the storage arrays 106 illustratively comprise LUNs or other types of logical storage devices.

In some embodiments, the paths are associated with respective communication links between the host device 102-1 and the storage arrays 106 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 114-1 in delivering IO operations from the IO queues 112-1 to the storage arrays 106 over particular paths via the network 104. These and other algorithms are assumed to be encompassed by the term "path selection algorithm" as that term is broadly used herein.

Each IO operation is assumed to comprise one or more commands for instructing the storage arrays 106 to perform particular types of storage-related functions such as reading data from or writing data to particular logical volumes of the storage arrays 106. Such commands are assumed to have various payload sizes associated therewith, and the payload associated with a given command is referred to herein as its "command payload."

A command directed by the host device 102-1 to the storage arrays 106 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage arrays 106.

Selecting a particular one of multiple available paths for delivery of a selected one of the IO operations of the set of IO queues 112-1 is more generally referred to herein as "path selection." Path selection as that term is broadly used herein can in some cases involve both selection of a particular IO operation and selection of one of multiple possible paths for accessing a corresponding logical device of the storage arrays 106. The corresponding logical device illustratively comprises a LUN or other logical storage volume to which the particular IO operation is directed.

It should be noted that paths may be added or deleted between the host devices 102 and the storage arrays 106 in the system 100. For example, the addition of one or more new paths from host device 102-1 to the storage arrays 106 or the deletion of one or more existing paths from the host device 102-1 to the storage arrays 106 may result from respective addition or deletion of at least a portion of the storage devices of the storage arrays 106.

Addition or deletion of paths can also occur as a result of zoning and masking changes or other types of storage system reconfigurations performed by a storage administrator or other user. Some embodiments are configured to send a predetermined command from the host device 102-1 to the storage arrays 106, illustratively utilizing the MPIO driver 114-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 106 as well to discover the disappearance of any existing LUNs that have been deleted from the storage arrays 106.

The MPIO driver 114-1 in some embodiments comprises a user-space portion and a kernel-space portion. The kernel-space portion of the MPIO driver 114-1 may be configured to detect one or more path changes of the type mentioned above, and to instruct the user-space portion of the MPIO driver 114-1 to run a path discovery scan responsive to the detected path changes. Other divisions of functionality between the user-space portion and the kernel-space portion of the MPIO driver 114-1 are possible.

For each of one or more new paths identified in the path discovery scan, the host device 102-1 may be configured to execute a host registration operation for that path. The host registration operation for a given new path illustratively provides notification to the storage arrays 106 that the host device 102-1 has discovered the new path.

The MPIO driver 114-1 is further configured to determine IO processing performance for each of at least a subset of the paths, and to dynamically adjust a path selection algorithm, utilized by the path selection logic 116-1 in selecting particular ones of the paths for delivery of the IO operations from the host device 102-1 to the storage arrays 106, based at least in part on the determined performance.

In determining IO processing performance of respective paths, the MPIO driver 114-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage arrays 106 based at least in part on the determined performance are illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, each of the storage arrays 106 comprises one or more storage controllers. For example, the storage array 106-1 includes one or more storage controllers 110. The storage controllers may maintain per-port IO processing information. Such per-port IO processing information is illustratively collected by the storage arrays 106, and in some embodiments may be provided to one or more of the host devices 102 for use in conjunction with path selection.

Additional components not explicitly shown in the figure, such as one or more storage caches, may also be provided in the storage arrays 106 for use in processing IO operations. For example, in some embodiments, each of the storage controllers has a different local cache or a different allocated portion of a global cache associated therewith, although numerous alternative arrangements are possible. The storage controllers can be implemented as respective storage processors, directors or other storage system components configured to control storage system operations relating to processing of IO operations.

It is assumed that each of the other MPIO drivers 114 is configured in a manner similar to that described above and elsewhere herein for the first MPIO driver 114-1. The other host devices 102 of the system 100 are therefore also configured to communicate over the network 104 with the storage arrays 106. The MPIO drivers 114 of such other host devices are each similarly configured to deliver IO operations from its corresponding one of the sets of IO queues 112 to the storage arrays 106 over selected paths through the network 104.

Accordingly, functionality described above in the context of the first MPIO driver 114-1 and the first host device 102-1 is assumed to be similarly performed by each of the other MPIO drivers 114-2 through 114-N and/or more generally by their respective host devices 102-2 through 102-N.

The MPIO drivers 114 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automatic reconfiguration of storage networks for heterogeneous storage clusters.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system. The cloud-based system may comprise one or more clouds, including one or more public clouds, one or more private clouds, one or more hybrid clouds that include both private cloud and public component, multi-cloud arrangements, combinations thereof, etc. The cloud-based system is therefore assumed to comprise one or more clouds, each having respective sets of cloud resources such as compute, storage and network resources in various configurations.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks. More particularly, at least a subset of the storage arrays 106 is assumed to provide or implement a heterogeneous storage cluster having a plurality of storage targets (e.g., on combinations of physical and virtual storage controllers of such storage arrays) and a plurality of storage initiators (e.g., including internal storage initiators on embedded hypervisors of such storage arrays, external storage initiators running in user VMs on the embedded hypervisors or external hosts such as one or more of the host devices 102).

It should therefore be apparent that the term "storage array" as used herein is intended to be broadly construed, and may encompass multiple distinct instances of a commercially-available storage array. For example, the storage arrays 106 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 23 and 24.

The storage controllers 110 of storage array 106-1 implement storage network reconfiguration logic 120. Although not explicitly shown in FIG. 1 for clarity of illustration, it is assumed in some embodiments that other ones of the storage arrays 106-2 through 106-M implement respective additional instances of storage controllers providing storage network reconfiguration logic, as well as respective sets of storage devices in a manner similar to that described herein with respect to storage array 106-1.

The storage network reconfiguration logic 120 is configured to receive a request to change a given storage network from a first configuration to a second configuration. The given storage network is associated with a heterogeneous storage cluster that comprises a plurality of storage targets and storage initiators having first network addresses in the first configuration. The plurality of storage targets may be implemented on one or more physical ones of the storage controllers of one or more storage systems in the heterogeneous storage cluster (e.g., physical ones of the storage controllers 110 of storage array 106-1 that is part of the heterogeneous storage cluster), on one or more embedded hypervisors running on one or more storage systems in the heterogeneous storage cluster (e.g., virtual ones of the storage controllers 110 of the storage array 106-1), combinations thereof, etc. The plurality of storage initiators may comprise one or more internal storage initiators running on the one or more embedded hypervisors, one or more external storage initiators running on one or more of the host devices 102 or one or more VMs running on the one or more embedded hypervisors, combinations thereof, etc. It should be noted that reconfiguration of the external storage initiators running on the host devices 102 may be automated at least in part utilizing the storage network reconfiguration logic 118.

In some embodiments, the given storage network comprises a public storage network associated with the heterogeneous storage cluster, and the heterogeneous storage cluster is also associated with an intra-cluster storage network providing automatic addressing of third network addresses to the plurality of storage targets and one or more internal storage initiators running on the one or more embedded hypervisors. The intra-cluster storage network provides the automatic addressing utilizing Unique Local Address (ULA) generation of the third network addresses for an Internet Protocol version 6 (IPv6) ULA subnet generated for the intra-cluster storage network. At least one of the plurality of storage targets may be associated with (i) at least one of the first network addresses in the given storage network for connection to the one or more external storage initiators and (ii) at least one of the third network addresses in the intra-cluster storage network for connection to the one or more external storage initiators.

The storage network reconfiguration logic 120 is also configured to generate a shadow storage network comprising second network addresses having the second configuration, and to assign ones of the second network addresses in the shadow storage network to at least a subset of a plurality of storage targets and storage initiators in the heterogeneous storage cluster affected by the request to change the given storage network from the first configuration to the second configuration. The storage network reconfiguration logic 120 is further configured to validate connectivity of the subset of the plurality of storage targets and storage initiators with one or more other ones of the plurality of storage targets and storage initiators utilizing the second network addresses in the shadow storage network and, responsive to validating the connectivity of the subset of the plurality of storage targets and storage initiators, to apply the requested change to the given storage network by unassigning ones of the first network addresses assigned to the subset of the plurality of storage targets and storage initiators.

At least portions of the storage network reconfiguration logic 118 and 120 may be implemented at least in part in the form of software that is stored in memory and executed by a processor.

It is to be understood that the particular set of elements shown in FIG. 1 for automatic reconfiguration of storage networks for heterogeneous storage clusters is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automatic reconfiguration of a storage network for a heterogeneous storage cluster will now be described in more detail with reference to the flow diagram of FIG. 2. It is to be understood that this particular process is only an example, and that additional or alternative processes for automatic reconfiguration of storage networks for heterogeneous storage clusters can be carried out in other embodiments.

In this embodiment, the process includes steps 200 through 208. These steps are assumed to be performed by the storage controllers of storage array 106 using storage network reconfiguration logic 120, possibly in conjunction with the MPIO drivers 114 of host devices 102 using storage network reconfiguration logic 118. The process begins with step 200, receiving a request to change a given storage network from a first configuration to a second configuration, the given storage network being associated with a heterogeneous storage cluster comprising a plurality of storage targets and storage initiators having first network addresses in the first configuration. The requested change received in step 200 may include: a request to change one or more of the first network addresses of one or more of the plurality of storage targets and storage initiators; a request to change a network address subnet utilized by the plurality of storage targets and storage initiators; where the first network addresses and the second network addresses comprise respective IP addresses, a request to change from a first IP version to a second IP version; a request to change a virtual local area network (VLAN) utilized by at least a subset of the plurality of storage targets and storage initiators; etc.

The plurality of storage targets may be implemented on one or more physical storage controllers of one or more storage systems in the heterogeneous storage cluster, on one or more virtual storage controllers running on one or more embedded hypervisors of the one or more storage systems in the heterogeneous storage cluster, combinations thereof, etc. The plurality of storage initiators may comprise one or more internal storage initiators running on the one or more embedded hypervisors, one or more external storage initiators running on one or more host devices external to the heterogeneous storage cluster or one or more VMs running on the one or more embedded hypervisors, combinations thereof, etc.

In some embodiments, the given storage network comprises a public storage network associated with the heterogeneous storage cluster, and the heterogeneous storage cluster is also associated with an intra-cluster storage network providing automatic addressing of third network addresses to the plurality of storage targets and one or more internal storage initiators running on the one or more embedded hypervisors. The intra-cluster storage network provides the automatic addressing utilizing ULA generation of the third network addresses for an IPv6 ULA subnet generated for the intra-cluster storage network. At least one of the plurality of storage targets may be associated with (i) at least one of the first network addresses in the given storage network for connection to the one or more external storage initiators and (ii) at least one of the third network addresses in the intra-cluster storage network for connection to the one or more external storage initiators.

The FIG. 2 process continues with step 202, generating a shadow storage network comprising second network addresses having the second configuration. In step 204, ones of the second network addresses in the shadow storage network are assigned to at least a subset of a plurality of storage targets and storage initiators in the heterogeneous storage cluster affected by the request to change the given storage network from the first configuration to the second configuration. Connectivity of the subset of the plurality of storage targets and storage initiators with one or more other ones of the plurality of storage targets and storage initiators is validated in step 206 utilizing the second network addresses in the shadow storage network. Responsive to validating the connectivity of the subset of the plurality of storage targets and storage initiators, the requested change to the given storage network is applied in step 208 by unassigning ones of the first network addresses assigned to the subset of the plurality of storage targets and storage initiators.

Step 204, in some embodiments, includes assigning ones of the second network addresses in the shadow storage network to any storage targets in the subset prior to assigning ones of the second network addresses in the shadow storage network to any storage initiators in the subset. Step 206, in some embodiments, includes validating that each of the storage initiators is able to reach each of the storage targets utilizing both the given storage network and the shadow storage network. Step 208, in some embodiments, includes unassigning ones of the first network addresses from any of the storage initiators in the subset prior to unassigning ones of the first network addresses from any of the storage targets in the subset.

Many hyper-converged infrastructure (HCI) and heterogeneous storage clusters use block protocols, with native multi-pathing support such as iSCSI or NVMeoF to provide storage resources to internal and external clients. In such storage clusters, physical and virtual storage controllers implement storage targets while embedded hypervisors and external hosts implement storage initiators. One of the challenges in such clustered systems is the support for storage network reconfiguration. Storage network reconfiguration may result from changed requirements, such as network re-addressing, merging, etc. Massive, cluster-wide network change operations must be fully automatic and non-disruptive to avoid (i) downtime of enterprise-critical applications running on the storage cluster and (ii) large maintenance windows.

Illustrative embodiments provide solutions to meet these and other needs. In some embodiments, techniques for fully automatic and transparent storage network configuration (and re-configuration) are provided which do not require the input of end-users. Such techniques are applicable to various use cases, including for pure HCI clusters, and may be viewed as a "reconfiguration avoidance" approach. In other embodiments, one or more "shadow" storage networks are used for a phased reconfiguration of the storage network, where storage initiators and storage targets are reconfigured automatically and non-disruptively. In still other embodiments, combinations of the above techniques are utilized to cover storage network reconfiguration in complex heterogeneous clusters with both internal and external storage initiators.

An example of a heterogeneous storage cluster will now be described with respect to FIGS. 3A-3E. As shown in FIG. 3A, the heterogeneous storage cluster includes a first hypervisor 301, a traditional bare metal storage controller 303, and a second hypervisor 305 which are coupled to a cluster-wide storage network 307. Also coupled to the cluster-wide storage network 307 is a set of external hosts 309-1, 309-2 and 309-3 (collectively, external hosts 309).

Figure 3B:
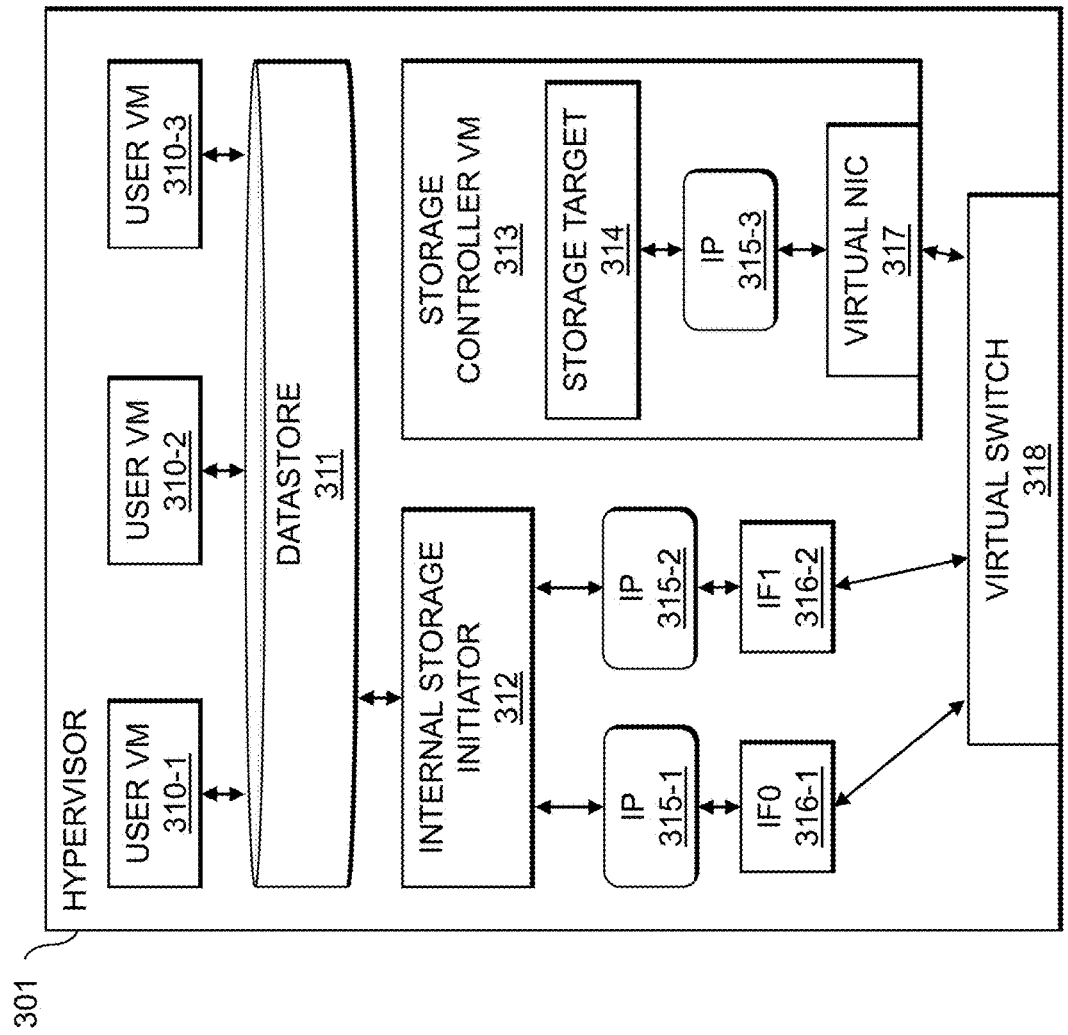

FIG. 3B shows a more detailed view of the hypervisor 301, which includes a set of user VMs 310-1, 310-2 and 310-3 (collectively, user VMs 310), a datastore 311, an internal storage initiator 312, and a storage controller VM 313 implementing a storage target 314. The internal storage initiator 312 is coupled via IP-based storage networks 315-1 and 315-2 to respective interfaces IF0 316-1 and IF1 316-2, which are coupled to a virtual switch 318. The storage target 314 is coupled via IP-based storage network 315-3 and a virtual network interface controller (NIC) 317 to the virtual switch 318. The IP-based storage networks 315-1, 315-2 and 315-3 (collectively, IP-based storage networks 315) are assumed to be part of the same IP-based storage network, and may represent different IP addresses in the same IP-based storage network. As will be described in further detail below, in other configurations one or more storage initiators (internal or external) and one or more storage target may be coupled to distinct IP-based storage networks. It should be appreciated that the particular number of the various components shown in FIG. 3B in the hypervisor 301 are shown by way of example only, and that other numbers and arrangements of such components may be used in hypervisors in other embodiments (including the configuration of hypervisor 305, described in further detail below with respect to FIG. 3D). For example, the hypervisor 301 may implement multiple storage initiators and multiple storage targets, rather than just a single storage initiator and a single storage target as shown. As another example, the particular number of user VMs may vary (e.g., more or less than three), as well as the particular number of storage controller VMs (e.g., more than one).

Figure 3C:
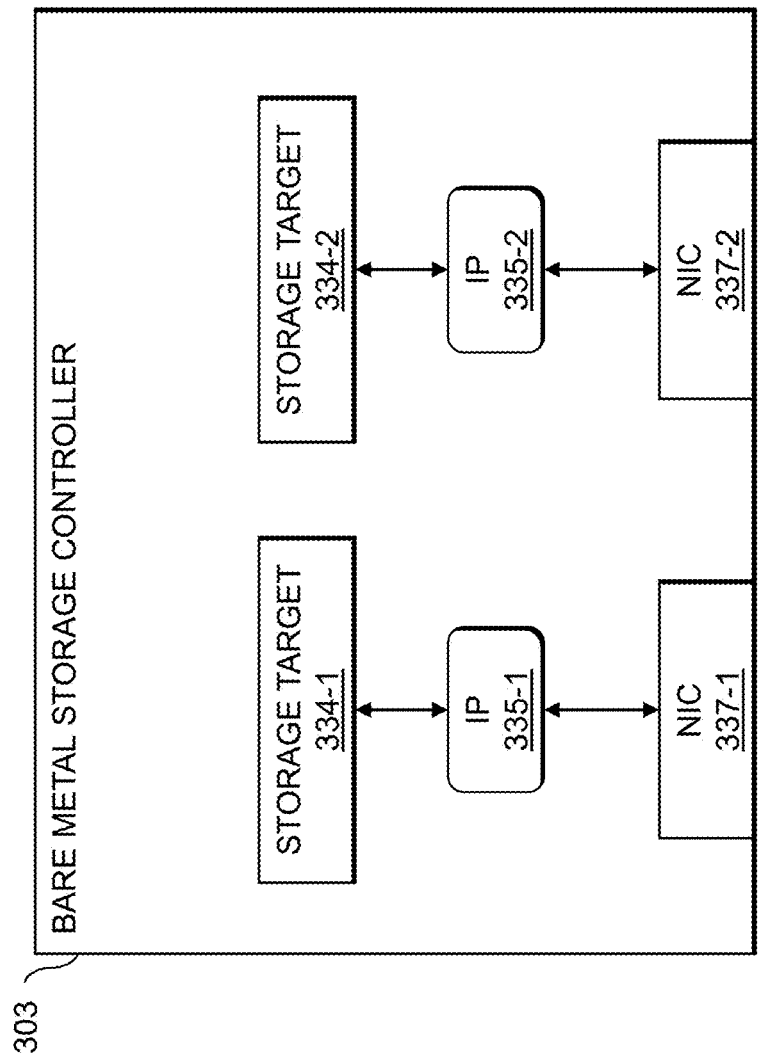

FIG. 3C shows a more detailed view of the bare metal storage controller 303, which includes two storage targets 334-1 and 334-2. The storage targets 334-1 and 334-2 (collectively, storage targets 334) are coupled via IP-based storage networks 335-1 and 335-2 (collectively, IP-based storage networks 335) to NICs 337-1 and 337-2 (collectively, NICs 337). The IP-based storage networks 335 are assumed to be part of a same IP-based storage network (which, in this embodiment, also includes the IP-based storage networks 315). Similar to FIG. 3B, the particular number and arrangements of components shown in FIG. 3C is presented by way of example only. The bare metal storage controller 303, for example, may implement more than two storage targets and NICs, or only a single storage target and NIC. Further, although FIG. 3A shows just a single instance of a bare metal storage controller 303 coupled to the cluster-wide storage network 307, embodiments are not so limited. In other embodiments, multiple bare metal storage controllers may be coupled to the cluster-wide storage network 307.

Figure 3D:
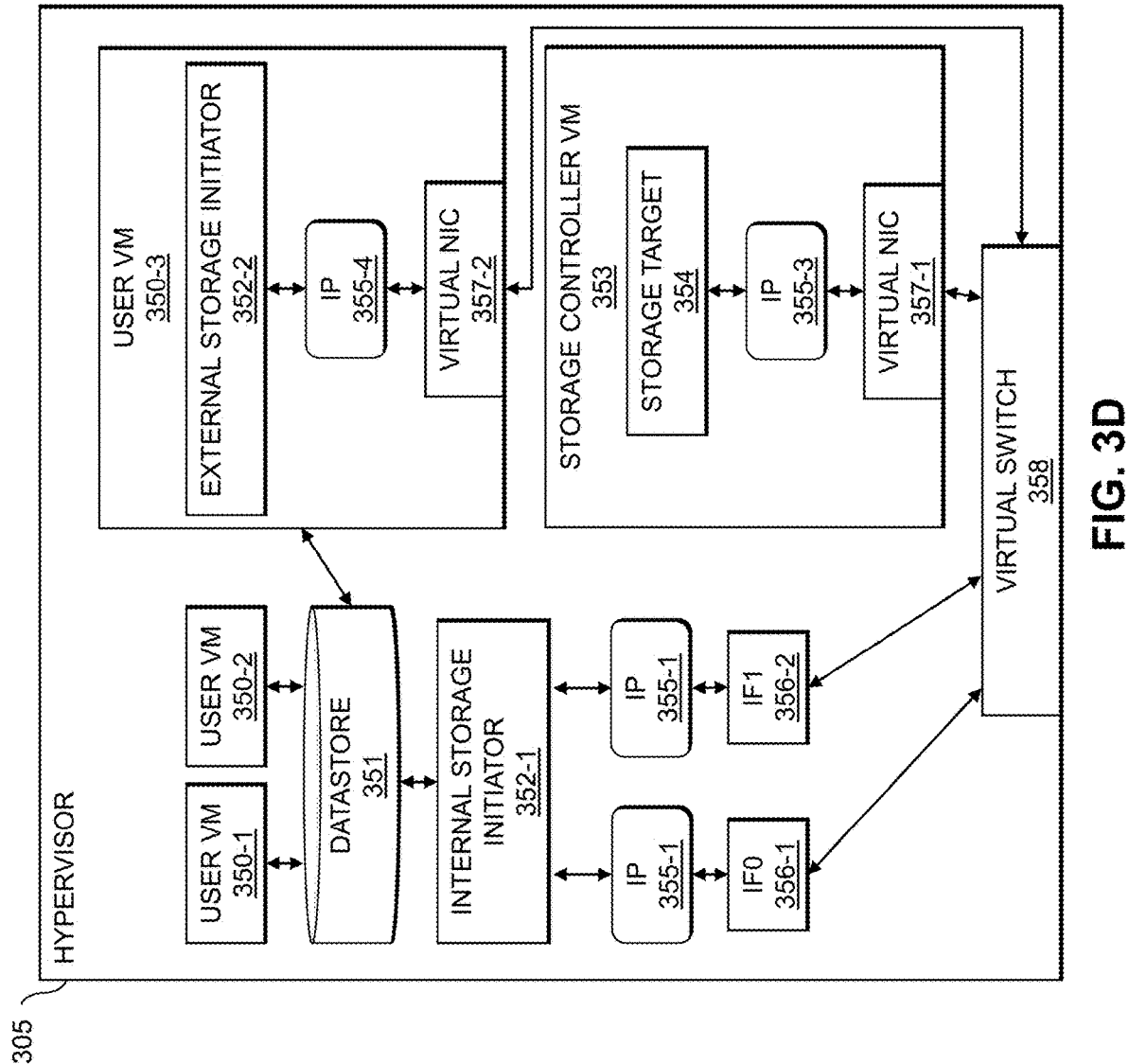

FIG. 3D shows a more detailed view of the hypervisor 305, which is configured in a manner similar to that of hypervisor 301, with a set of user VMs 350-1, 350-2, and 350-3 (collectively, user VMs 350), a datastore 351, an internal storage initiator 352-1, a storage controller VM 353, a storage target 354, IP-based storage networks 355-1, 355-2, 355-3, interfaces IF0 356-1 and IF1 356-2, virtual NIC 357-1, and virtual switch 358. In the hypervisor 305, however, one of the user VMs 350-3 implements an external storage initiator 352-2 that is coupled via IP-based storage network 355-4 to a virtual NIC 357-2 and virtual switch 358. Although FIG. 3D shows only a single one of the user VMs 350 in hypervisor 305 implementing an external storage initiator, in other embodiments multiple ones of the user VMs 350 may implement external storage initiators. Also, similar to hypervisor 301, the hypervisor 305 may include various other numbers and arrangements of other components, such as internal storage initiators, external storage initiators, storage targets, number of user VMs, number of storage controller VMs, etc. Further, although FIG. 3A shows just two hypervisors 301 and 305 coupled to the cluster-wide storage network 307, embodiments are not so limited. In other embodiments, just a single or more than two hypervisors may be coupled to the cluster-wide storage network 307. Further, the types of hypervisors coupled to the cluster-wide storage network 307 may vary (e.g., multiple hypervisors similar to those of hypervisor 301 or 305, only hypervisors similar to those of hypervisor 301, only hypervisors similar to those of hypervisor 305, etc.).

The hypervisors 301 and 305, in some embodiments, are assumed to comprise embedded hypervisors that are part of one or more storage arrays in the storage cluster. For example, the hypervisors 301 and 305 may be embedded hypervisors running on one or more of the storage arrays 106 in FIG. 1 that are part of a given storage cluster. The storage controller VMs 313 and 353 of the hypervisors provide storage controllers for an associated storage array on which the embedded hypervisor runs. Thus, the storage controller VM 313 or 353 may provide one of the storage controllers 110 on storage array 106-1 in FIG. 1 that is part of the given storage cluster. The bare metal storage controller 303 may also be viewed as one of the storage controllers 110 on the storage array 106-1 (or another one of the storage arrays 106 that is part of the given storage cluster).

Figure 3E:
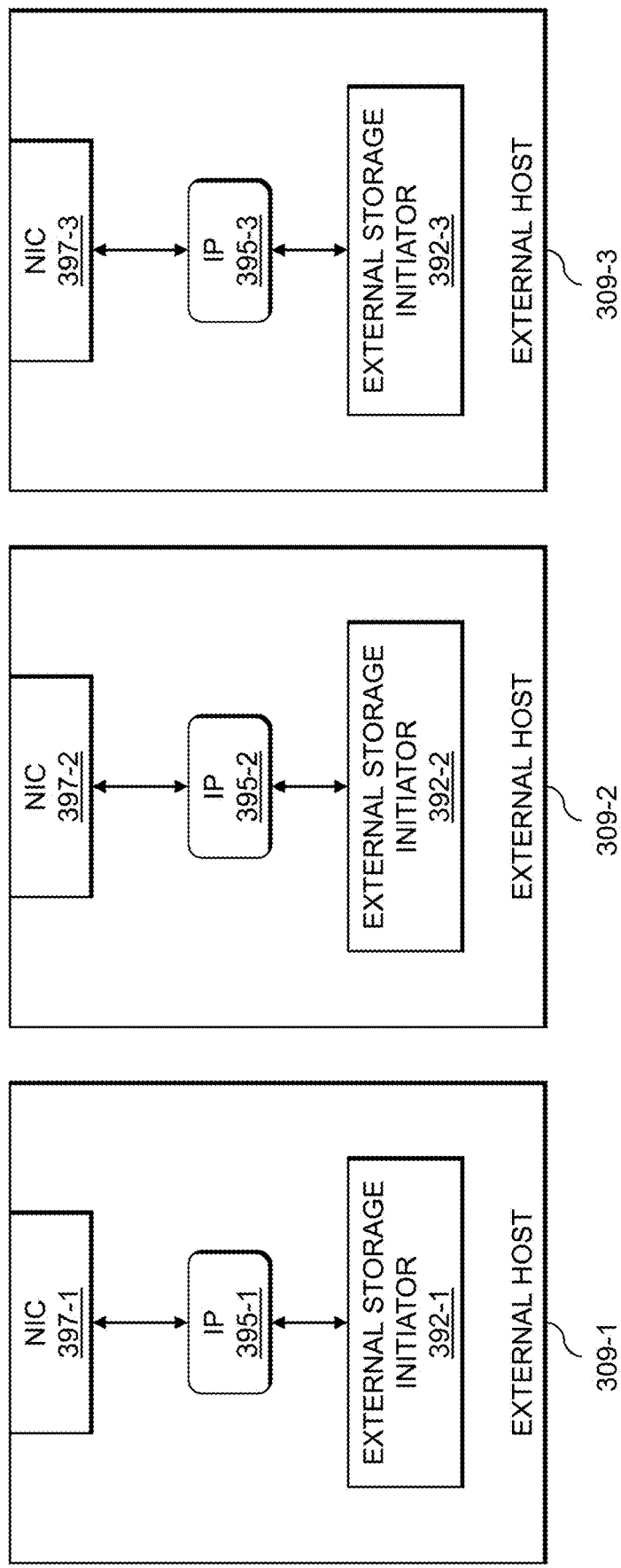

FIG. 3E shows a more detailed view of the external hosts 309. External host 309-1 implements an external storage initiator 392-1 that is coupled via IP-based storage network 395-1 to NIC 397-1, external host 309-2 implements an external storage initiator 392-2 that is coupled via IP-based storage network 395-2 to NIC 397-2, and external host 309-3 implements an external storage initiator 392-3 that is coupled via IP-based storage network 395-3 to NIC 397-3. The IP-based storage networks 395-1, 395-2 and 395-3 (collectively, IP-based storage networks 395) are assumed in this embodiment to be part of the same IP-based storage network that also includes the IP-based storage networks 315, 335 and 355. Although each of the external hosts 309 is shown in FIG. 3E as implementing only one external storage initiator, in other embodiments one or more of the external hosts 309 may implement multiple external storage initiators. Also, the particular number of external hosts 309 that are coupled to the cluster-wide storage network 307 may vary (e.g., there may be more than one or two external hosts, or more than three external hosts).

FIGS. 3A-3E illustrate a mix of storage controllers coupled to the cluster-wide storage network 307, including a traditional bare metal storage controller 303 as well as virtualized storage controllers (e.g., running as storage controller VMs 313 and 353 on hypervisors 301 and 305, respectively). It should be appreciated that the storage cluster building block in FIGS. 3A-3E may include a single storage controller or a dual-node storage controller with a shared backend.

In the embodiment of FIGS. 3A-3E, there are different storage clients consuming block storage from the storage cluster via IP-based block protocols (e.g., iSCSI, NVMeoF, etc.). User VMs 310 and 350 running directly on hypervisors 301 and 305, respectively, consume the storage from respective virtual datastores 311 and 351 as virtual disks. The user VMs 310 and 350 may not be aware of how the underlying block storage is architectured, and also may not be aware of the underlying storage access protocol. The storage cluster may expose one or more datastores representing the entire capacity of the cluster, or a part of the overall capacity. When one of the user VMs 310 or 350 performs I/O operations on the virtual disk, the hypervisor 301 or 305 handles such I/O operations and sends it to the underlying storage target via the block protocol. The user VMs 310 and 350 illustratively do so via an internal storage initiator (e.g., 312 or 352-1). The internal storage initiators 312 and 352-1 may be implemented as iSCSI initiators running on the hypervisors 301 and 305. The internal storage initiators 312 and 352-1 are able to reach storage targets 314 and 354 running on the local or remote storage controller VMs 313 and 353, as well as storage targets 334 running on the bare metal storage controller 303. In this scenario, the internal storage initiators 312 and 352-1 are considered a part of the storage cluster.

Another class of storage clients are implemented on the external hosts 309, which may be physical or virtual, and which run software for external storage initiators 392-1, 392-2 and 392-3 (collectively, external storage initiators 392). Such external storage initiators 392 do not belong to the storage cluster. As described above, it is also possible for one or more of the user VMs 310 and 350 hosted directly on the storage cluster to have storage initiators running inside a guest operating system (OS). External storage initiator 352-2 running on user VM 350-3 is an example of such a storage initiator, which is considered external even though the user VM 350-3 runs locally inside the storage cluster. External clients access block volumes via various protocols, such as iSCSI and NVMeoF. It should be noted that the external clients only communicate with storage targets, and may be completely unaware of the internal storage initiators of the storage cluster.

The storage cluster provides one or more cluster-wide storage networks 307. In some embodiments (e.g., for pure HCI clusters), it may be common to have a single storage network as such an approach requires fewer IP addresses and less configuration on the network fabric (e.g., in cases where VLANs are used). Further, in such approaches, storage initiators on various hypervisors may not work well with multiple networks unless full-mesh connectivity is provided (e.g., which requires extra configuration on the network fabric, such as routing between subnets). One example is an iSCSI initiator on a VMware ESXi™ hypervisor. While various embodiments are described below in the context of an ESXi hypervisor, it should be appreciated that the techniques described herein may be used with various other types of hypervisors including other native or bare metal (e.g., embedded) hypervisors, hosted hypervisors, etc. In other embodiments, multiple storage networks may be used to simplify configuration on the host side, and to avoid using policy-based routing (PBR) or bonding. Some external hosts, including external hypervisors, may prefer to use only one storage network for all paths though.

The cluster-wide storage network 307 is configured during the initial deployment of the storage cluster. The network parameters, such as a pool of IP addresses, routing information, and VLAN identifier (ID), are provide by a storage administrator, and the cluster automatically configures storage targets (e.g., iSCSI target portals) and storage initiators running on the internal hypervisors (e.g., iSCSI initiator portals). The cluster-wide storage network 307 must support reconfiguration, because the storage cluster plugs into an enterprise (e.g., a customer's) network fabric and the enterprise's requirements may change over time. For example, an enterprise network may merge and require re-addressing. Because storage clusters are often horizontally scalable, the initially provided storage subnet may be too small for the cluster expansion, and the enterprise may need to change it to a larger subnet before expanding the storage cluster. Another example is a switchover, such as from IPv4 to IPv6. Such storage cluster reconfigurations traditionally require a maintenance window, and may lead to downtime of enterprise-critical applications running on the storage cluster.

Techniques are needed for supporting fully automatic and non-disruptive storage network reconfiguration, including in large HCI or heterogeneous storage clusters such as the storage cluster illustrated in FIGS. 3A-3E. Some conventional storage clusters do not support automatic storage network changes at all (e.g., even in a disruptive manner), and require tedious and error-prone per-node reconfiguration. Other conventional storage clusters automate a change of a storage network, but require taking the entire storage cluster into a maintenance or service mode with all data services disabled. Still other conventional storage clusters automate a change of a storage network without bringing down the entire storage stack, but still require all user VMs running on the storage cluster to be powered off during the change. Such conventional approaches lead to large maintenance windows, downtime of enterprise-critical applications, and extra upfront coordination between storage, network and virtualization teams. Everything should be ready and compatible at the time the change is planned, and if something fails, then either rollback to the old configuration is required or the maintenance window needs to be extended until the problem is triaged and fixed.

Illustrative embodiments provide techniques for cluster storage network organization and non-disruptive reconfiguration, including for storage clusters with both internal and external storage clients.

In some embodiments, a storage cluster is enabled to fully automatically generate IP addresses for all internal storage initiators and targets, rather than relying on end-users to provide a public storage network for the storage cluster. To do so, an IPv6 ULA subnet is generated for the entire storage cluster, and then IPv6 interface identifiers are generated fully automatically using procedures for ULA address generation. Such techniques provide a number of benefits. For example, the ULA addresses may be generated fully automatically and fully transparently for the end-users, and the probability of collisions even in large layer-2 (L2) broadcast domains is practically zero. In addition, there is large address space (e.g., $2^{64}$) within one ULA prefix, which can easily generate any number of IP addresses to cover various possible cluster expansion scenarios.

Figure 4A:
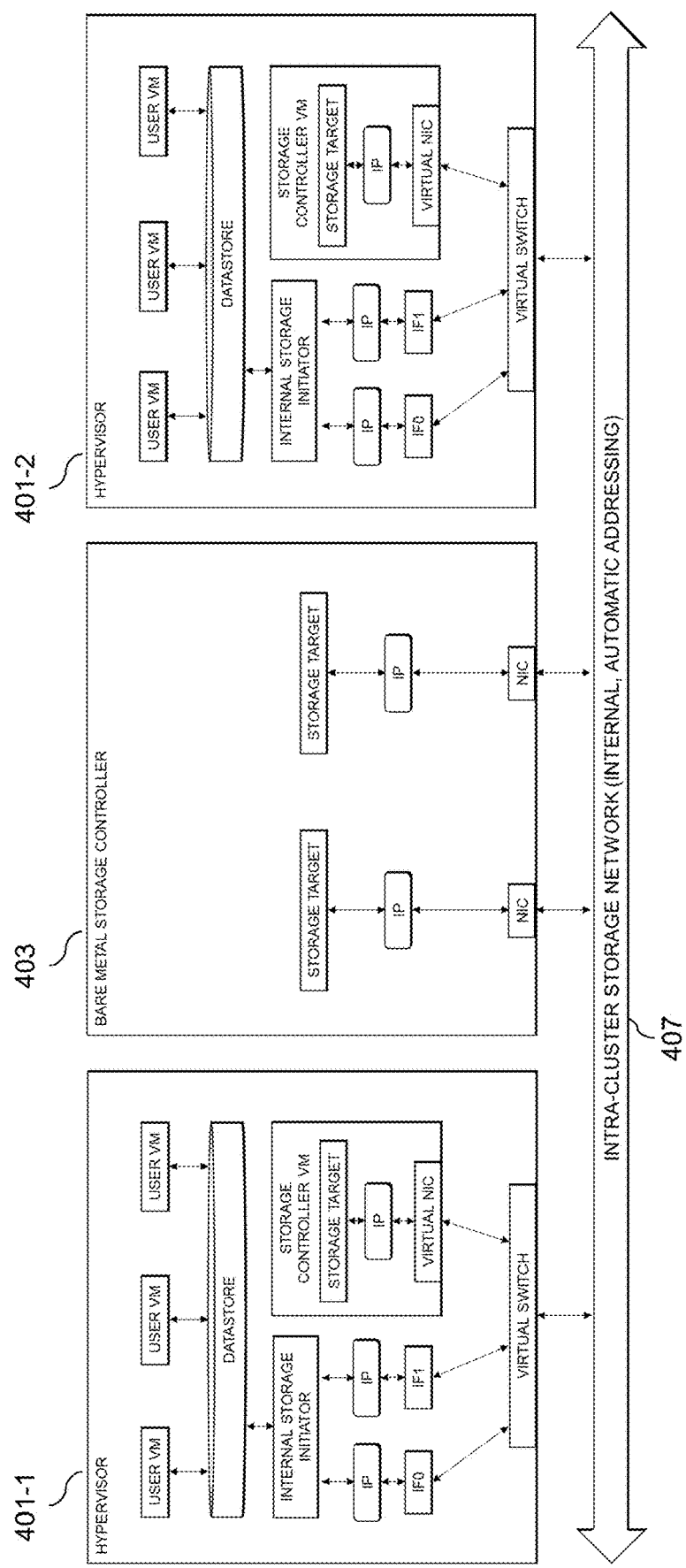
FIGS. 4A-4C illustrate use of an internal intra-cluster storage network for automatic storage network configuration in an illustrative embodiment.
Figure 4B:
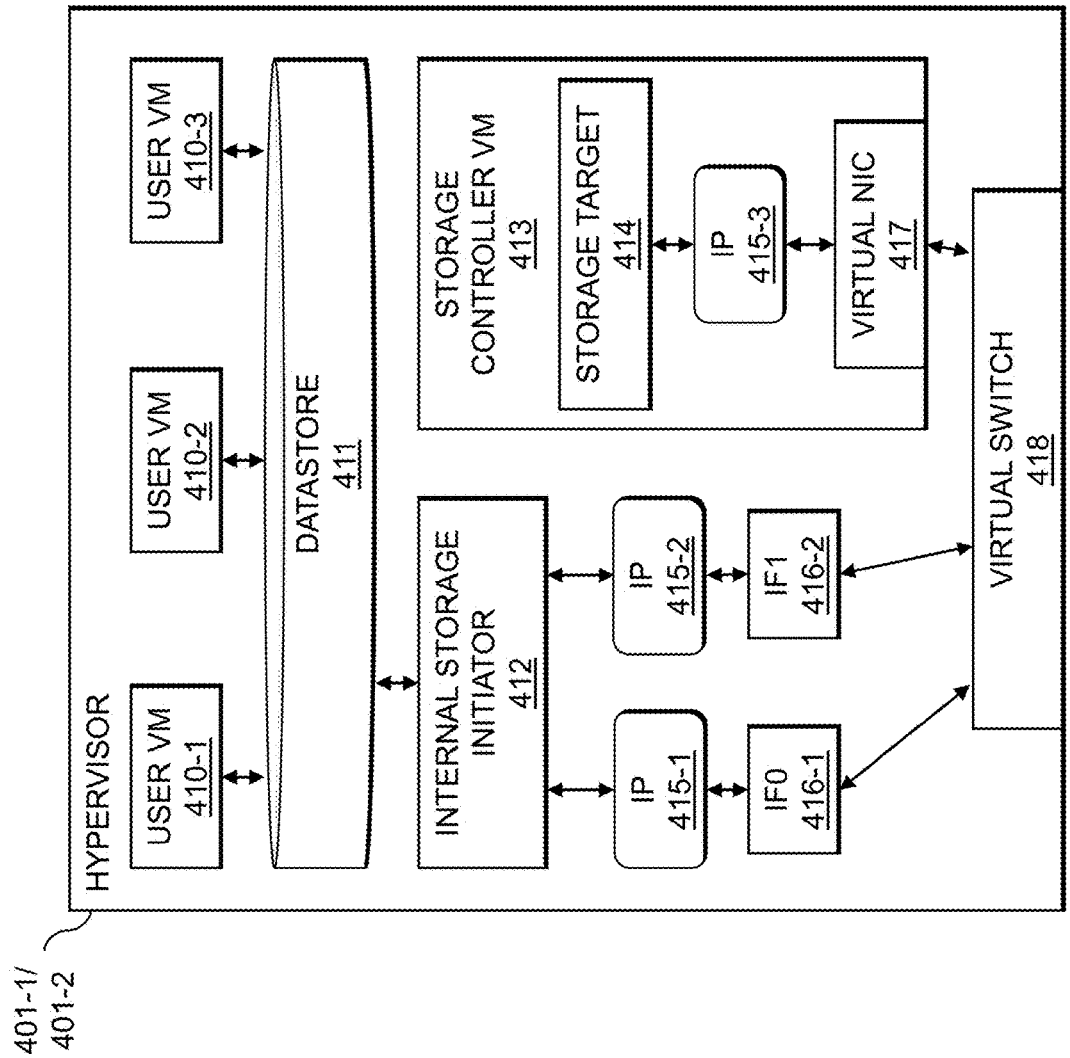
Figure 4C:
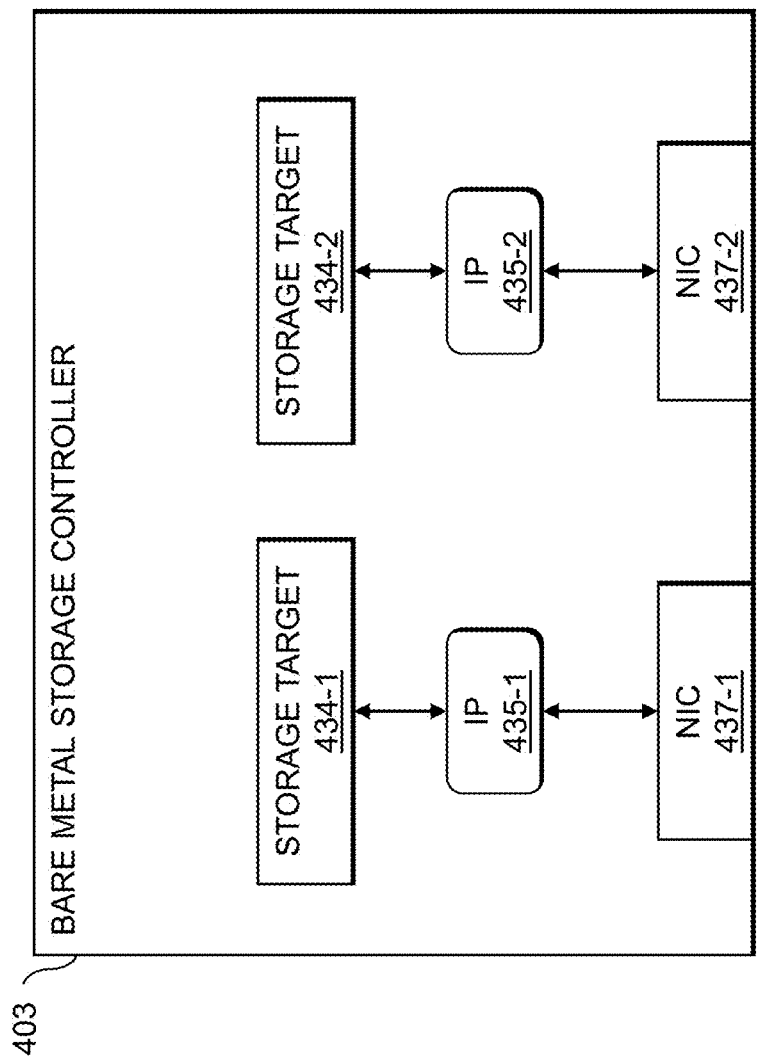

It should be noted that such techniques for fully automatically generating IP addresses for all internal storage initiators and targets provides a reconfiguration avoidance scheme, as there is no need to reconfigure what has not been asked for. In a pure HCI cluster, the reconfiguration avoidance scheme may be implemented as shown in FIGS. 4A-4C. As shown in FIG. 4A, the heterogeneous storage cluster includes first and second hypervisors 401-1 and 401-2 as well as a traditional bare metal storage controller 403 that are coupled to an intra-cluster storage network 407 providing internal, automatic addressing. Note that the heterogeneous cluster shown in FIG. 4A does not include external hosts, as it is assumed that all initiators and targets are part of the intra-cluster storage network 407.

FIG. 4B shows a more detailed view of the hypervisors 401-1 and 401-2 (collectively, hypervisors 401), which may be configured in manner similar to that described above with respect to hypervisor 301 in FIG. 3B. Each of the hypervisors 401 includes a set of user VMs 410-1, 410-2 and 410-3 (collectively, user VMs 410), a datastore 411, an internal storage initiator 412, and a storage controller VM 413 implementing a storage target 414. The internal storage initiator 412 is coupled via IP-based storage networks 415-1 and 415-2 to respective interfaces IF0 416-1 and IF1 416-2 to a virtual switch 418. The storage target 414 is coupled via IP-based storage network 415-3 and a virtual NIC 417 to the virtual switch 418. The IP-based storage networks 415-1, 415-2 and 415-3 (collectively, IP-based storage networks 415) are assumed to be part of a same IP-based storage network, which is implemented internally to the storage clusters as the intra-cluster storage network 407 with internal and automatic addressing. It should be appreciated that the particular number of the various components shown in FIG. 4B in the hypervisors 401 are shown by way of example only, and that other numbers and arrangements of such components may be used in hypervisors in other embodiments. For example, the hypervisors 401 may implement multiple internal storage initiators and multiple storage targets, rather than just a single storage initiator and storage target as shown. As another example, the particular number of user VMs may vary (e.g., more or less than three), as well as the particular number of storage controller VMs (e.g., more than one). Further, the particular number of hypervisors that are coupled to the intra-cluster storage network 407 may vary (e.g., just one, more than two, etc.).

FIG. 4C shows a more detailed view of the bare metal storage controller 403, which is configured in a manner similar to that described above with respect to the bare metal storage controller 303 of FIG. 3C. The bare metal storage controller 403 includes two storage targets 434-1 and 434-2 (collectively, storage targets 434), which are coupled via IP-based storage networks 435-1 and 435-2 (collectively, IP-based storage networks 435) to NICs 437-1 and 437-2 (collectively, NICs 437). The IP-based storage networks 435 are assumed to be part of the same IP-based storage network as the that of the IP-based storage networks 415. Similar to FIG. 4B, the particular number and arrangements of components shown in FIG. 4C is presented by way of example only. The bare metal storage controller 403, for example, may implement more than two storage targets and NICs, or only a single storage target and NIC. Further, although FIG. 4A shows just a single instance of a bare metal storage controller 403 coupled to the intra-cluster storage network 407, embodiments are not so limited. In other embodiments, multiple bare metal storage controllers may be coupled to the intra-cluster storage network 407.

In the storage cluster shown in FIGS. 4A-4C, all of the user VMs 410 consume storage directly from storage cluster provided datastore 411, and the same network is used for all the internal storage targets and initiators. The entire configuration of storage interconnections within the storage cluster is fully automatic and fully transparent for the end-users. The IPv6 ULA network is usually not routable, and is limited to a single L2 broadcast domain (e.g., native, emulated via layer-3 (L3), etc.). Note that, from the storage administrator point of view, the storage cluster does not have any explicitly defined storage networks (e.g., the internal or intra-cluster storage network 407 may not even be exposed to the end-users, or may be exposed in a read-only mode).

In cases where external clients need to be able to access the storage cluster, a storage administrator can add the public storage network used by the external clients, and the storage cluster will extend the public storage network to some or all of the storage targets, but not internal storage initiators. FIGS. 5A-5E illustrate such an arrangement.

Figure 5A:
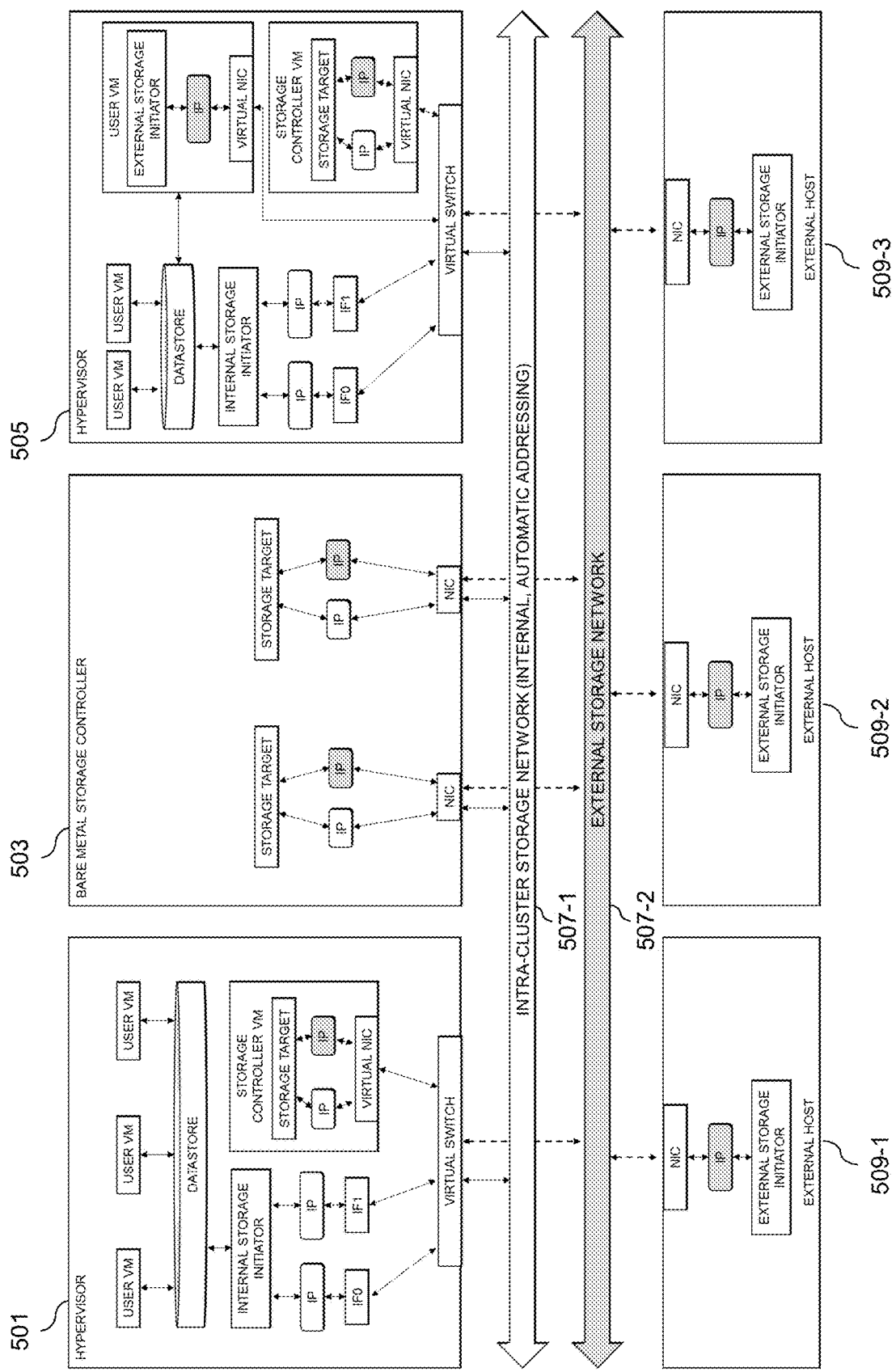
FIGS. 5A-5E illustrate use of an internal intra-cluster storage network and an external storage network with automatic storage network configuration in an illustrative embodiment.

As shown in FIG. 5A, the heterogeneous storage cluster includes a first hypervisor 501, a traditional bare metal storage controller 503, and a second hypervisor 505 which are coupled to both an intra-cluster storage network 507-1 providing internal and automatic addressing, as well as an external or public storage network 507-2. A set of external hosts 509-1, 509-2 and 509-3 (collectively, external hosts 509) are coupled to the external storage network 507-2 but not the intra-cluster storage network 507-1. For clarity of illustration, different shading is used for the intra-cluster storage network 507-1 and the external storage network 507-2, as well as for IP-based storage networks that are parts thereof as described in further detail below. The coupling of the entities to the intra-cluster storage network 507-1 and the external storage network 507-2 also use different lines for clarity (e.g., solid lines for coupling to the intra-cluster storage network 507-1 and dashed lines for coupling to the external storage network 507-2).

Figure 5B:
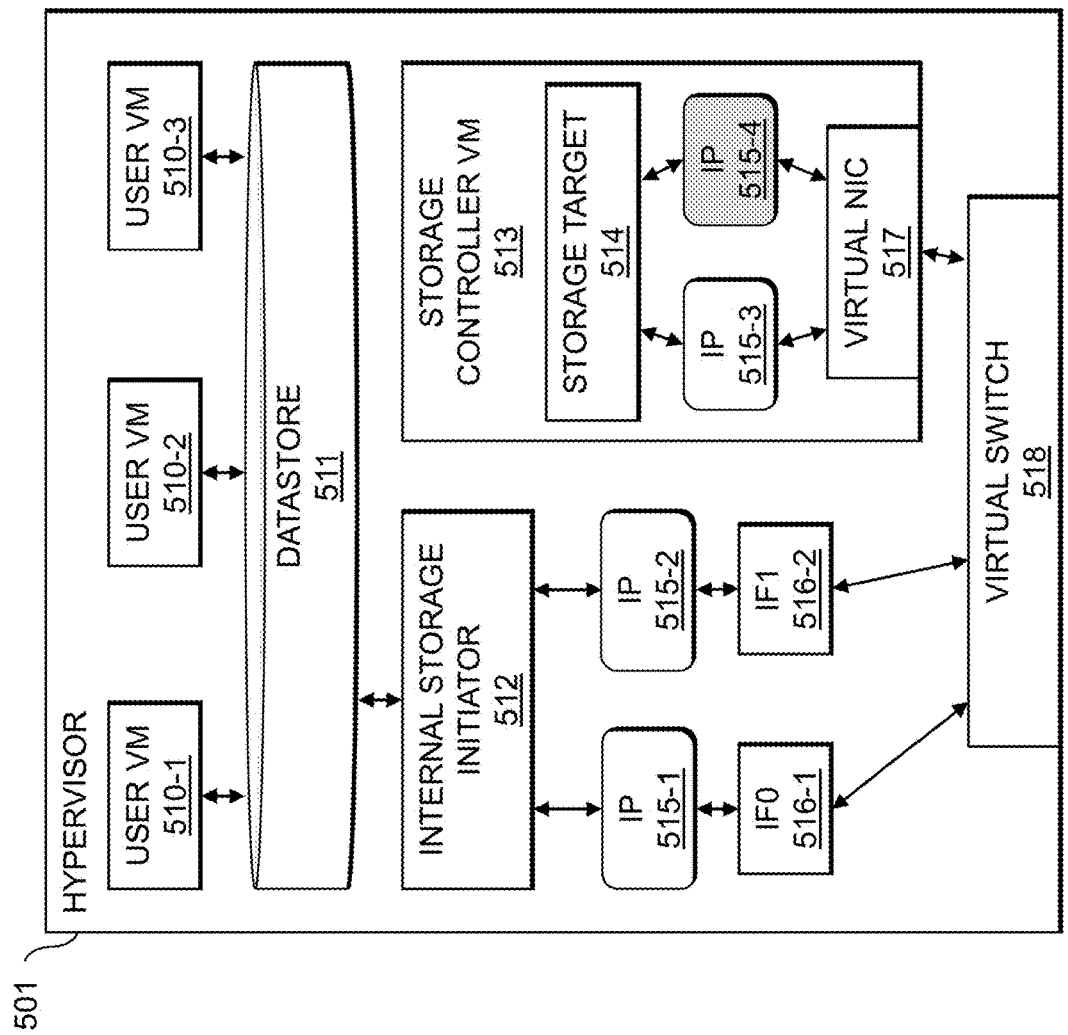

FIG. 5B shows a more detailed view of the hypervisor 501, which includes a set of user VMs 510-1, 510-2 and 510-3 (collectively, user VMs 510), a datastore 511, an internal storage initiator 512, and a storage controller VM 513 implementing a storage target 514. The internal storage initiator 512 is coupled via IP-based storage networks 515-1 and 515-2 to respective interfaces IF0 516-1 and IF1 516-2, which are coupled to a virtual switch 518. The storage target 514 is coupled via IP-based storage network 515-3 and IP-based storage network 515-4 to a virtual NIC 517 coupled to the virtual switch 518. The IP-based storage networks 515-1, 515-2 and 515-3 are assumed to be part of the same logical storage network provided by the intra-cluster storage network 507-1. The IP-based storage network 515-4 is part of a different logical storage network associated with the external storage network 507-2 (e.g., a public storage network utilized by the external hosts 509). Internal storage initiators (e.g., internal storage initiator 512) access the storage target 514 via IP-based storage network 515-3, while external storage initiators (e.g., external storage initiators 592-1, 592-2, 592-3 associated with external hosts 509) access the storage target 514 via IP-based storage network 515-4. It should be appreciated that the particular number of the various components shown in FIG. 5B in the hypervisor 501 are shown by way of example only, and that other numbers and arrangements of such components may be used in hypervisors in other embodiments. For example, the hypervisor 501 may implement multiple storage initiators and multiple storage targets, rather than just a single storage initiator and a single storage target as shown. As another example, the particular number of user VMs may vary (e.g., more or less than three), as well as the particular number of storage controller VMs (e.g., more than one).

Figure 5C:
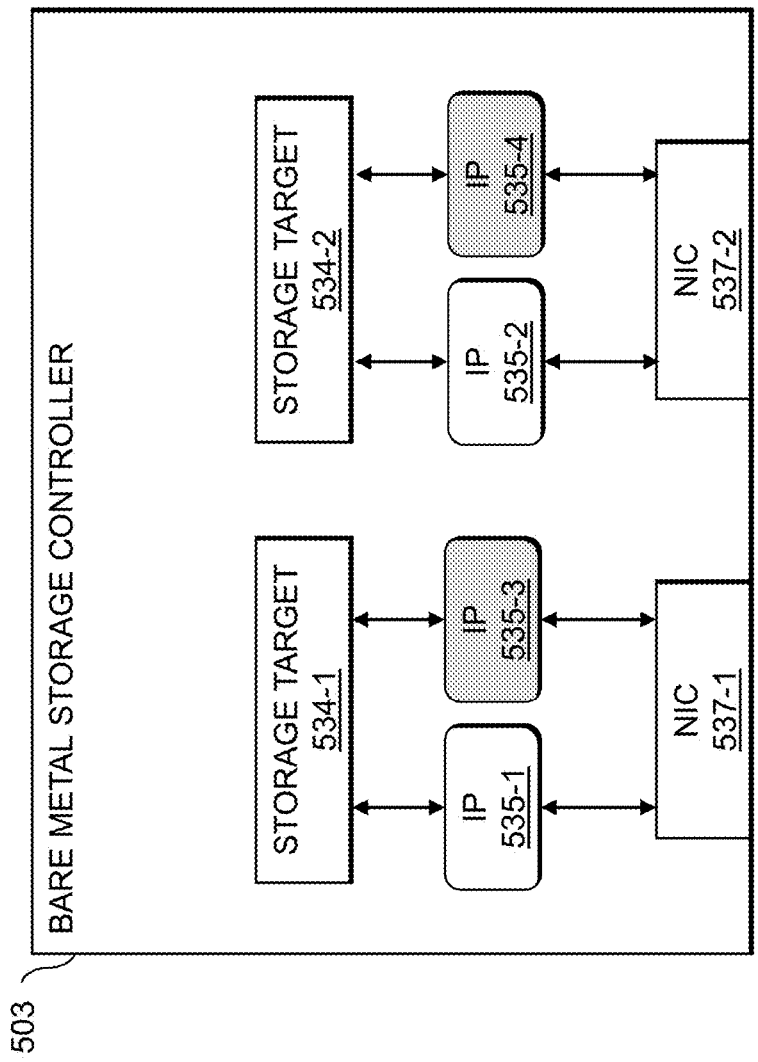

FIG. 5C shows a more detailed view of the bare metal storage controller 503, which includes two storage targets 534-1 and 534-2. The storage targets 534-1 and 534-2 (collectively, storage targets 534) are coupled via IP-based storage networks 535-1 and 535-2 associated with the intra-cluster storage network 507-1 to NICs 537-1 and 537-2 (collectively, NICs 537). The storage targets 534-1 and 534-2 are also coupled via IP-based storage networks 535-3 and 535-4 associated with the external storage network 507-2 to the NICs 537-1 and 537-2. The particular number and arrangements of components shown in FIG. 5C is presented by way of example only. The bare metal storage controller 503, for example, may implement more than two storage targets and NICs, or only a single storage target and NIC. Further, although FIG. 5A shows just a single instance of a bare metal storage controller 503 coupled to the intra-cluster storage network 507-1 and the external storage network 507-2, embodiments are not so limited. In other embodiments, multiple bare metal storage controllers may be coupled to the intra-cluster storage network 507-1 and the external storage network 507-2. In some cases, a given bare metal storage controller may be coupled to the intra-cluster storage network 507-1 but not the external storage network 507-2 (e.g., such as where the storage targets that are part of the given bare metal storage controller are not made accessible to external storage initiators).

Figure 5D:
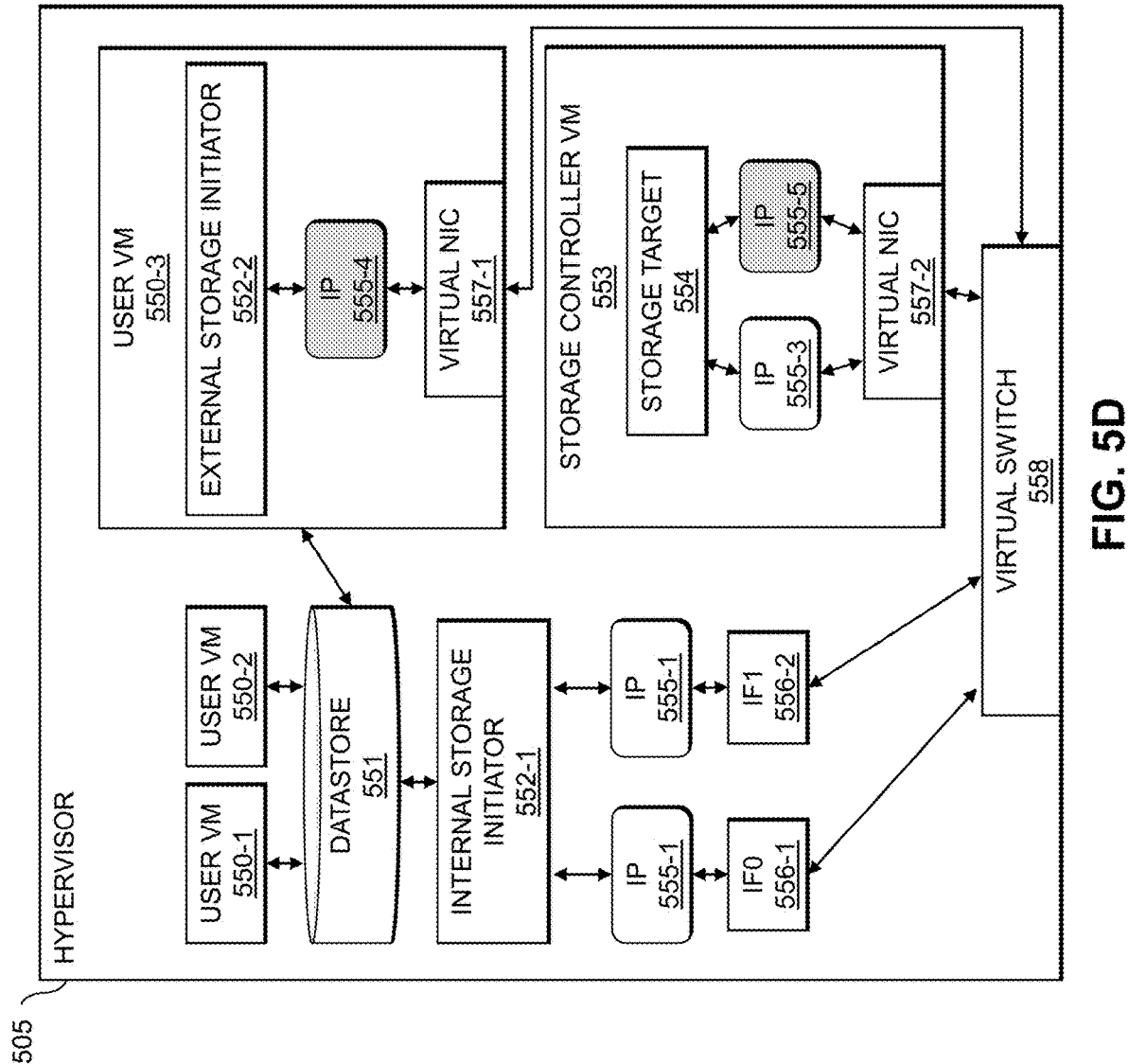

FIG. 5D shows a more detailed view of the hypervisor 505, which is configured in a manner similar to that of hypervisor 501, with a set of user VMs 550-1, 550-2, and 550-3 (collectively, user VMs 550), a datastore 551, an internal storage initiator 552-1, a storage controller VM 553, a storage target 554, IP-based storage networks 555-1, 555-2, and 555-3, interfaces IF0 556-1 and IF1 556-2, virtual NIC 557-1, and virtual switch 558. In the hypervisor 505, however, one of the user VMs 550-3 implements an external storage initiator 552-2 that is coupled via IP-based storage network 555-4 to a virtual NIC 557-2, which is coupled to the virtual switch 558. Although FIG. 5D shows only a single one of the user VMs 550 in hypervisor 505 implementing an external storage initiator, in other embodiments multiple ones of the user VMs 550 may implement external storage initiators. The IP-based storage networks 555-1, 555-2 and 555-3 are associated with the intra-cluster storage network 507-1. The IP-based storage network 555-4 coupled to the external storage initiator 552-2, as well as IP-based storage network 555-5 coupled to storage target 554, are associated with the external storage network 507-2. Also, similar to hypervisor 501, the hypervisor 505 may include various other numbers and arrangements of other components, such as internal storage initiators, external storage initiators, storage targets, number of user VMs, number of storage controller VMs, etc. Further, although FIG. 5A shows just two hypervisors 501 and 505 coupled to the intra-cluster storage network 507-1 and the external storage network 507-2, embodiments are not so limited. In other embodiments, just a single or more than two hypervisors may be coupled to the intra-cluster storage network 507-1 and the external storage network 507-2. Further, in some cases a given hypervisor may be coupled to the intra-cluster storage network 507-1 but not the external storage network 507-2 (e.g., such as where the storage targets that are part of one or more storage controller VMs on the given hypervisor are not made accessible to external storage initiators). Further, the types of hypervisors coupled to the intra-cluster storage network 507-1 and the external storage network 507-2 may vary (e.g., multiple hypervisors similar to those of hypervisor 501 or 505, only hypervisors similar to those of hypervisor 501, only hypervisors similar to those of hypervisor 505, etc.).

Figure 5E:
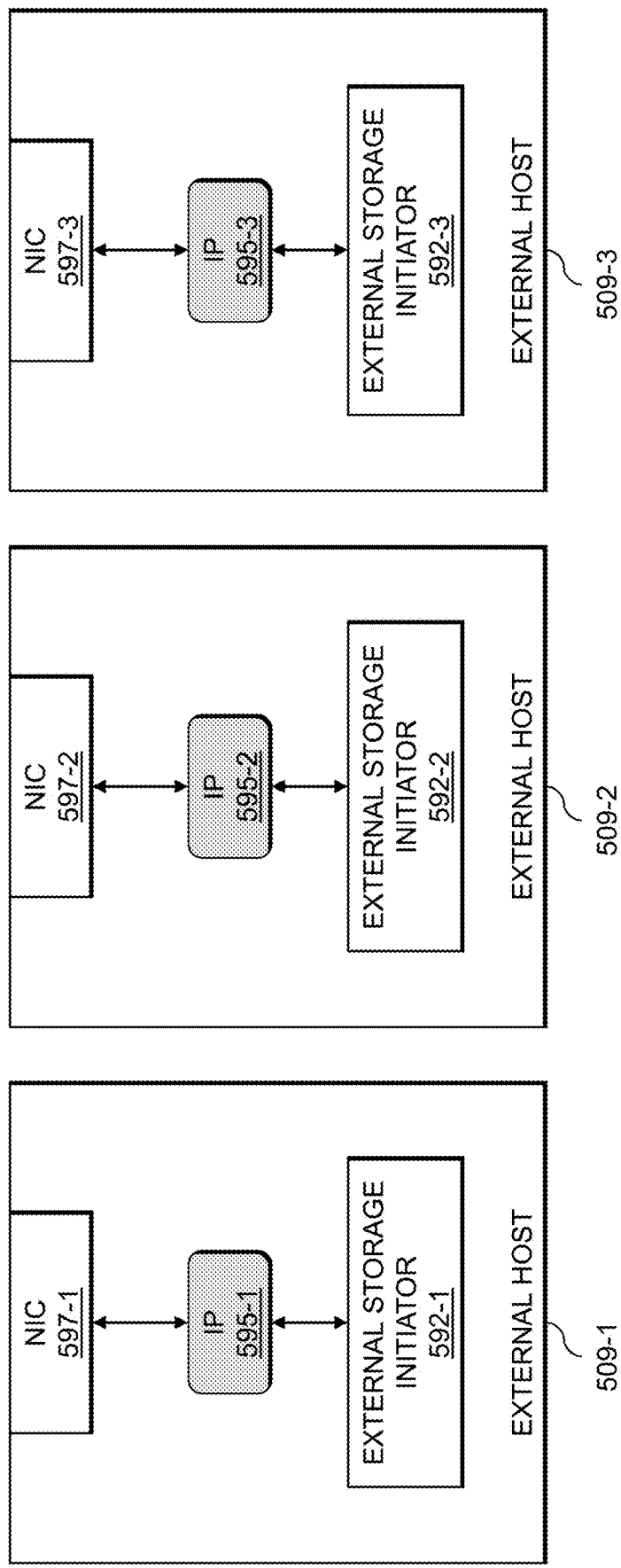

FIG. 5E shows a more detailed view of the external hosts 509. External host 509-1 implements an external storage initiator 592-1 that is coupled via IP-based storage network 595-1 to NIC 597-1, external host 509-2 implements an external storage initiator 592-2 that is coupled via IP-based storage network 595-2 to NIC 597-2, and external host 509-3 implements an external storage initiator 592-3 that is coupled via IP-based storage network 595-3 to NIC 597-3. The IP-based storage networks 595-1, 595-2 and 595-3 are associated with the external storage network 507-2. Although each of the external hosts 509 is shown in FIG. 5E as implementing only one external storage initiator, in other embodiments one or more of the external hosts 509 may implement multiple external storage initiators. Also, the particular number of external hosts 509 that are coupled to the external storage network 507-2 may vary (e.g., there may be only one or two external hosts, or more than three external hosts).

It should be noted that reconfiguration of the public or external storage network 507-2, even if implemented naively, will not impact the intra-cluster storage network 507-1, and hence all user VMs running on the storage cluster will have reliable access to the storage resources. The storage clusters shown in FIGS. 4A-4C and 5A-5E solve the problem of reliable storage access for user VMs hosted on storage clusters, as well as all other intra-cluster storage access and data mobility use cases. Such storage clusters, however, do not address other problems. For example, such storage clusters do not make external or public storage network reconfiguration (e.g., of external storage network 507-2 in FIGS. 5A-5E) non-disruptive for the external clients (e.g., external hosts 509 in FIGS. 5A-5E). This may not be a concern in some instances, as the change of a public storage network may not be made non-disruptive without at least some coordination with the external clients (e.g., such as switching to another subnet and VLAN, where an old configuration on external initiators will not work without external routing). Such processes, however, may be made as easy as possible for storage administrators as described in further detail below.

Another issue is that internal storage initiators on the hypervisors belonging to such storage clusters are only joined to a non-routable internal storage network. As such, the hypervisors are unable to reach any external iSCSI or NVMeoF storage systems. End-users may need to perform extra configuration on hypervisors to bypass the storage cluster management interface in order to provide connectivity to the external block storage. Such out-of-band configuration changes may break or degrade the operation of the internal storage initiators, and are error-prone in general. A solution to this issue is described in further detail below.

To overcome the above-noted issues, in some embodiments a storage cluster uses one or more public storage networks (e.g., provided by a storage administrator). Note, however, that end-users may still take advantage of the fully automatic and transparent cluster storage network configurations described above if certain use-cases are not yet required (e.g., an end-user anticipates that migration from an external iSCSI storage system is going to be needed only at some point in the future, such as in three months) or are not required anymore (e.g., the migration has completed and a public storage network is not required so IP addresses may be reclaimed). At the time the storage cluster is deployed, the end-user may be given a choice to provide network parameters, or to generate the network automatically. This is illustrated in the process flow of FIG. 6. The FIG. 6 process flow begins in step 601, with determining whether a cluster storage network is to be configured automatically. If the result of the step 601 determination is no, the process flow moves to step 603 where a client or end-user is prompted to provide network parameters. If the result of the step 601 determination is yes, the process flow moves to step 605 where the network is generated automatically (e.g., automatic generation of an IPv6 ULA subnet and addresses). After steps 603/605, the process flow moves to step 607 where network objects are created and internal storage targets and initiators are configured.

Figure 6:
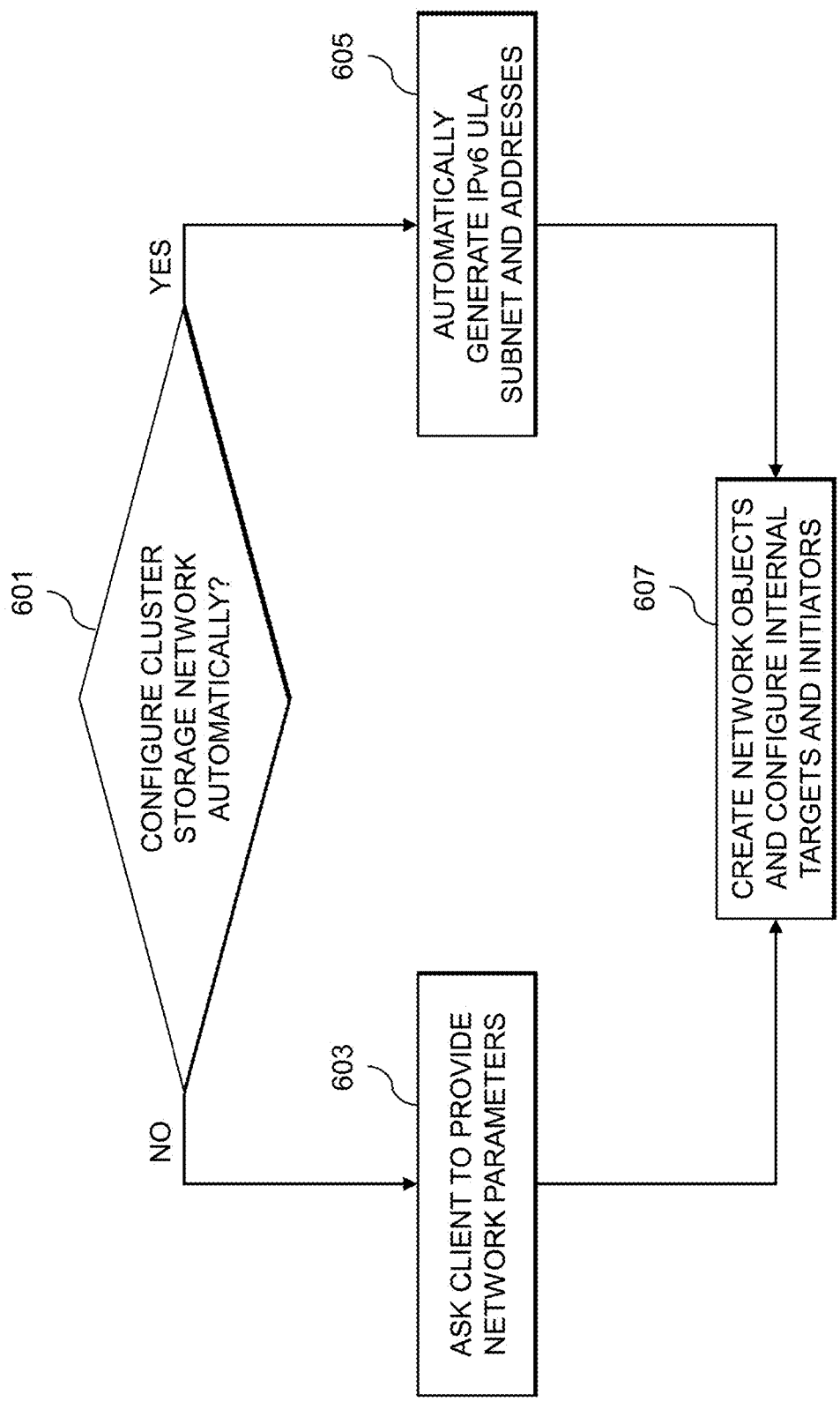
FIG. 6 is a flow diagram of an exemplary process for automatic storage network configuration using a public storage network and a shadow storage network in an illustrative embodiment.

An important difference related to the automatic network generation schemes described above (e.g., where the internal network is not exposed to the end-user at all) and the FIG. 6 process flow is that the network object gets created and has an associated name and ID. Advantageously, it is also possible to reconfigure the IPv6 ULA subnet to any public subnet and vice versa. This encompasses various reconfiguration scenarios, including from automatic IPv6 ULA configuration to an IPv4/IPv6 public configuration, from one IPv4/IPv6 public configuration to another IPv4/IPv6 public configuration, and from an IPv4/IPv6 public configuration to an automatic IPv6 ULA configuration.

The logical cluster-wide storage network representation will differ depending on the capabilities of the particular storage cluster solution. The logical cluster-wide storage network representation, in some embodiments, is represented as an IP address pool and associated network parameters, as well as protocols available for the storage network. FIG. 7 shows an example logical cluster-wide storage network representation 701, including parameters such as an ID, name, type or purpose, IP address range, IP version, network prefix, optional routing information such as a routing gateway and static routes, an optional VLAN ID, maximum transmission unit (MTU), and optional protocol information such as whether particular protocols are enabled or not. FIG. 7 also shows a storage network representation 703 with actual values for such parameters.

An automatically generated IPv6 ULA network fits well into the general representation 701 shown in FIG. 7, as illustrated in the example representation 703. The storage system should support storage network reconfiguration at any granularity level, from changing a single IP address belonging to a storage initiator or storage target, to changing the entire subnet VLAN and IP version at once (e.g., which affects all storage initiators and storage targets within the storage cluster), or anything in between. FIG. 8 shows an example reconfiguration, where values of all the parameters, with the exception of the ID, name, and type/purpose, are changed from storage network configuration 801 to storage network configuration 803.

It should be noted that the storage cluster architecture is not restricted to a single cluster-wide storage network. The internal storage initiators will usually use a single logical storage network, although a given internal storage initiator may use more than one as long as its associated hypervisor storage initiator implementation supports this. The external storage initiators may use more than one logical storage network. FIGS. 9A-9E illustrate a storage cluster that uses three cluster-wide storage networks.

Figure 9A:
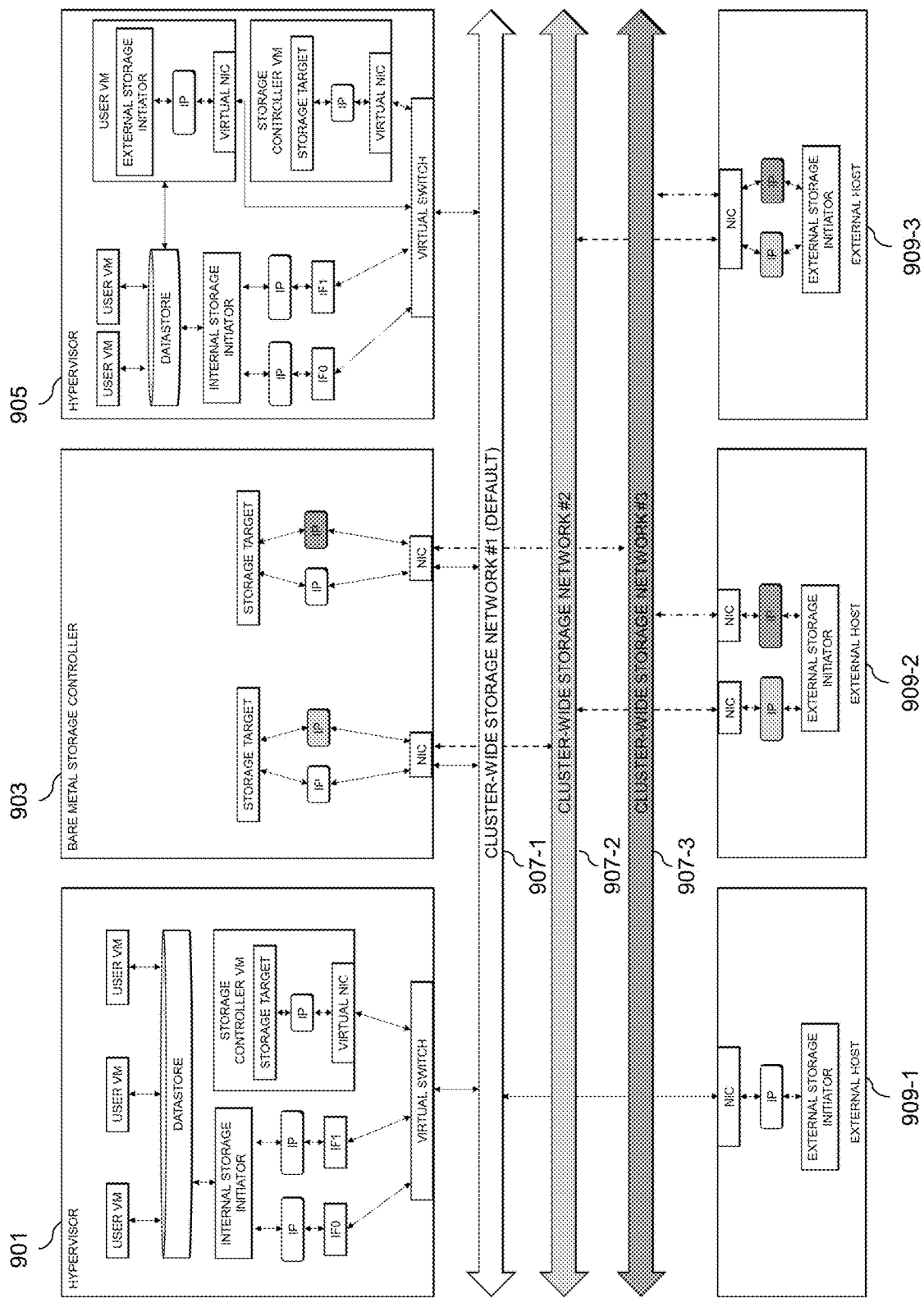
FIGS. 9A-9E illustrate use of multiple cluster-wide storage networks in an illustrative embodiment.

As shown in FIG. 9A, the heterogeneous storage cluster includes a first hypervisor 901, a traditional bare metal storage controller 903, and a second hypervisor 905 which are coupled to a first or default cluster-wide storage network 907-1. The bare metal storage controller 903 is also coupled to a second cluster-wide storage network 907-2 and a third cluster-wide storage network 907-3. A set of external hosts 909-1, 909-2 and 909-3 (collectively, external hosts 909) are also coupled to the cluster-wide storage networks. For example, the external host 909-1 is coupled to the first or default cluster-wide storage network 907-1. The external hosts 909-2 and 909-3 are coupled to both the second cluster-wide storage network 907-2 and the third cluster-wide storage network 907-3. For clarity of illustration, different shading is used for the first cluster-wide storage network 907-1, the second cluster-wide storage network 907-2, and the third cluster-wide storage network 907-3, as well as for IP-based storage networks that are parts thereof as described in further detail below. The coupling of the entities to the first cluster-wide storage network 907-1, the second cluster-wide storage network 907-2, and the third cluster-wide storage network 907-3 also use different lines for clarity (e.g., solid lines for coupling to the first cluster-wide storage network 907-1, dashed lines for coupling to the second cluster-wide storage network 907-2, and dash-dot lines for coupling to the third cluster-wide storage network 907-3).

Figure 9B:
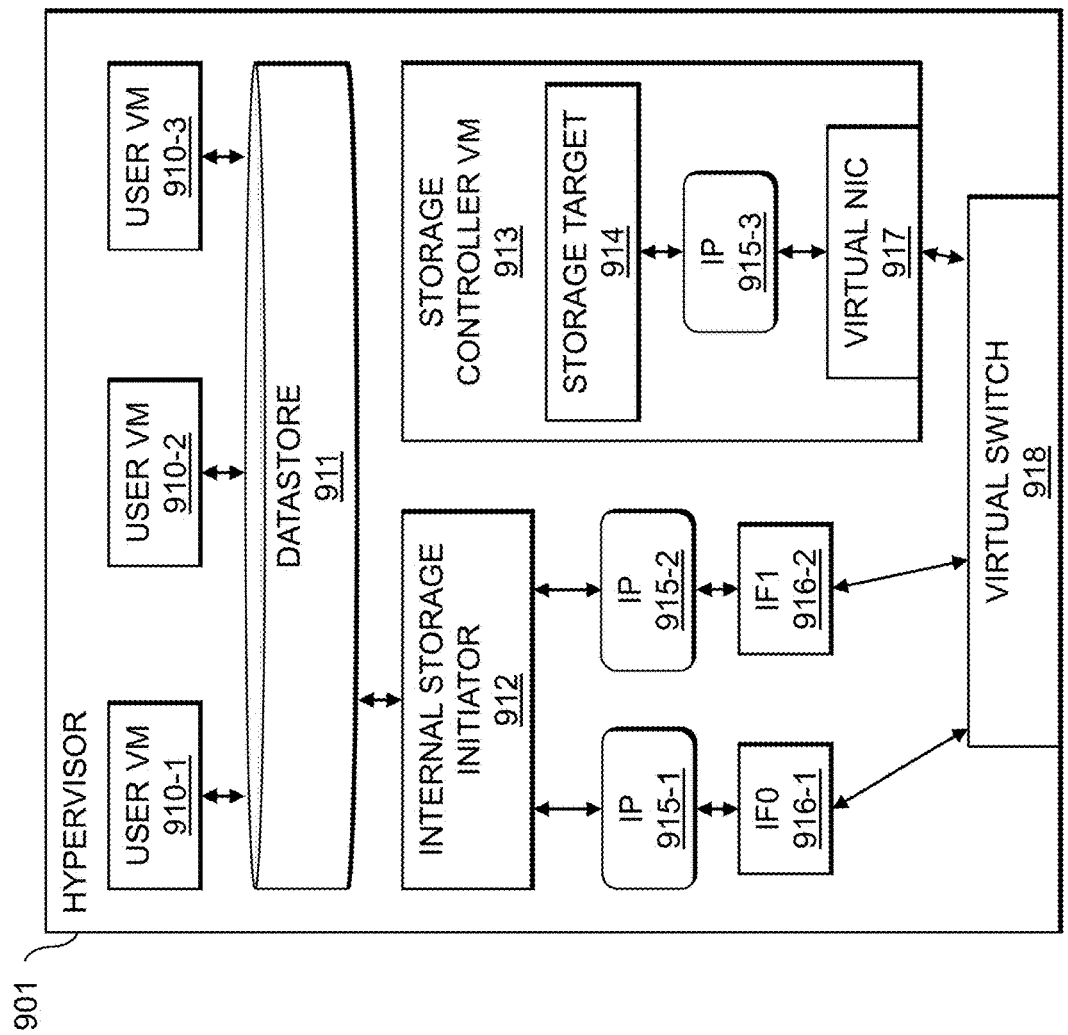

FIG. 9B shows a more detailed view of the hypervisor 901, which includes a set of user VMs 910-1, 910-2 and 910-3 (collectively, user VMs 910), a datastore 911, an internal storage initiator 912, and a storage controller VM 913 implementing a storage target 914. The internal storage initiator 912 is coupled via IP-based storage networks 915-1 and 915-2 to respective interfaces IF0 916-1 and IF1 916-2, which are coupled to a virtual switch 918. The storage target 914 is coupled via IP-based storage network 915-3 and a virtual NIC 917 to the virtual switch 918. The IP-based storage networks 915-1, 915-2 and 915-3 are assumed to be part of the same IP-based storage network provided by the first cluster-wide storage network 907-1. It should be appreciated that the particular number of the various components shown in FIG. 9B in the hypervisor 901 are shown by way of example only, and that other numbers and arrangements of such components may be used in hypervisors in other embodiments (including the configuration of hypervisor 905, described in further detail below with respect to FIG. 9D). For example, the hypervisor 901 may implement multiple storage initiators and multiple storage targets, rather than just a single storage initiator and a single storage target as shown. As another example, the particular number of user VMs may vary (e.g., more or less than three), as well as the particular number of storage controller VMs (e.g., more than one).

Figure 9C:
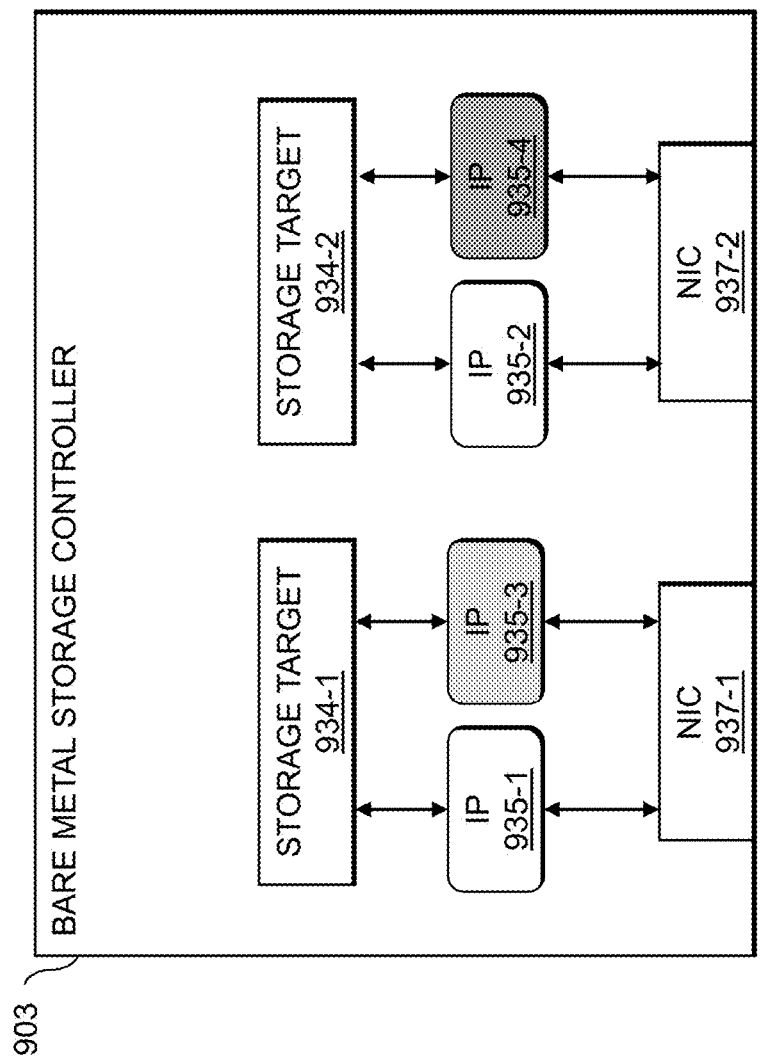

FIG. 9C shows a more detailed view of the bare metal storage controller 903, which includes two storage targets 934-1 and 934-2. The storage targets 934-1 and 934-2 (collectively, storage targets 934) are coupled via IP-based storage networks 935-1 and 935-2 associated with the first cluster-wide storage network 907-1 to NICs 937-1 and 937-2 (collectively, NICs 937). The storage target 934-1 is also coupled via an IP-based storage network 935-3, associated with the second cluster-wide storage network 907-2, to NIC 937-1. The storage target 934-2 is also coupled via an IP-based storage network 935-4, associated with the third cluster-wide storage network 907-3, to NIC 937-2. The particular number and arrangements of components shown in FIG. 9C is presented by way of example only. The bare metal storage controller 903, for example, may implement more than two storage targets and NICs, or only a single storage target and NIC. Further, although FIG. 9A shows just a single instance of a bare metal storage controller 903 coupled to first cluster-wide storage network 907-1, the second cluster-wide storage network 907-2, and the third cluster-wide storage network 907-3, embodiments are not so limited. In other embodiments, multiple bare metal storage controllers may be coupled to any desired combination of the first cluster-wide storage network 907-1, the second cluster-wide storage network 907-2, and the third cluster-wide storage network 907-3. A particular storage target within a given bare metal storage controller is also not limited to being coupled to only two of the first cluster-wide storage network 907-1, the second cluster-wide storage network 907-2, and the third cluster-wide storage network 907-3 like the storage targets 934. A given storage target, for example, may be coupled to all three of first cluster-wide storage network 907-1, the second cluster-wide storage network 907-2, and the third cluster-wide storage network 907-3.

Figure 9D:
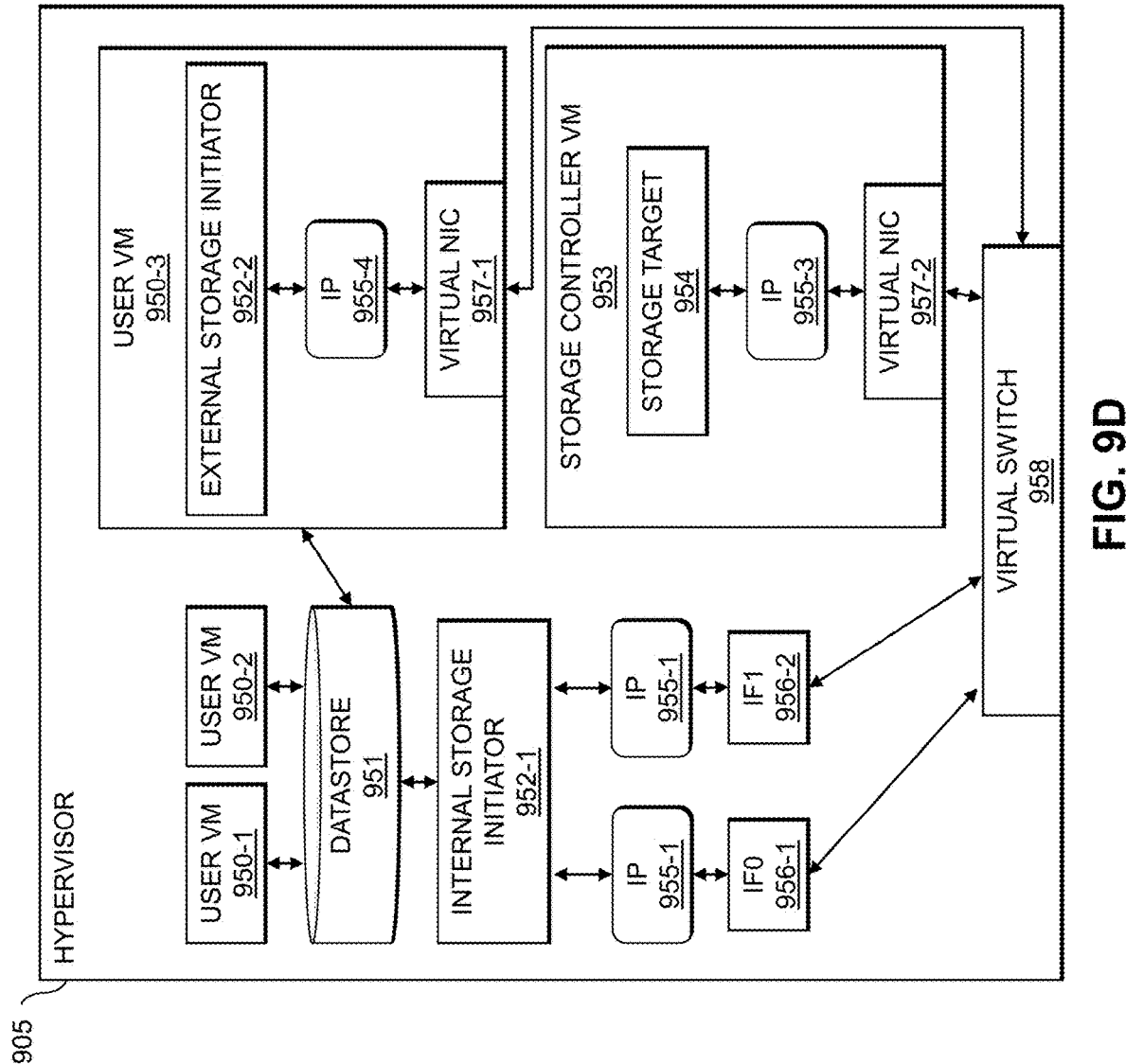

FIG. 9D shows a more detailed view of the hypervisor 905, which is configured in a manner similar to that of hypervisor 901, with a set of user VMs 950-1, 950-2, and 950-3 (collectively, user VMs 950), a datastore 951, an internal storage initiator 952-1, a storage controller VM 953, a storage target 954, IP-based storage networks 955-1, 955-2, 955-3, interfaces IF0 956-1 and IF1 956-2, virtual NIC 957-1, and virtual switch 958. In the hypervisor 905, however, one of the user VMs 950-3 implements an external storage initiator 952-2 that is coupled via IP-based storage network 955-4 to a virtual NIC 957-2 and virtual switch 958.

The IP-based storage networks 955-1, 955-2, 955-3 and 955-4 are all assumed to be a part of the same logical storage network for coupling to the first cluster-wide storage network 907-1. Although FIG. 9D shows only a single one of the user VMs 950 in hypervisor 905 implementing an external storage initiator, in other embodiments multiple ones of the user VMs 950 may implement external storage initiators. Also, similar to hypervisor 901, the hypervisor 905 may include various other numbers and arrangements of other components, such as internal storage initiators, external storage initiators, storage targets, number of user VMs, number of storage controller VMs, etc. Further, although FIG. 9A shows just two hypervisors 901 and 905 coupled to the first cluster-wide storage network 907-1, embodiments are not so limited. In other embodiments, just a single or more than two hypervisors may be coupled to the first cluster-wide storage network 907-1, or to combinations of the first cluster-wide storage network 907-1, the second cluster-wide storage network 907-2, and the third cluster-wide storage network 907-3. Further, the types of hypervisors coupled to the first cluster-wide storage network 907-1, the second cluster-wide storage network 907-2, and the third cluster-wide storage network 907-3 may vary (e.g., multiple hypervisors similar to those of hypervisor 901 or 905, only hypervisors similar to those of hypervisor 901, only hypervisors similar to those of hypervisor 905, etc.).

Figure 9E:
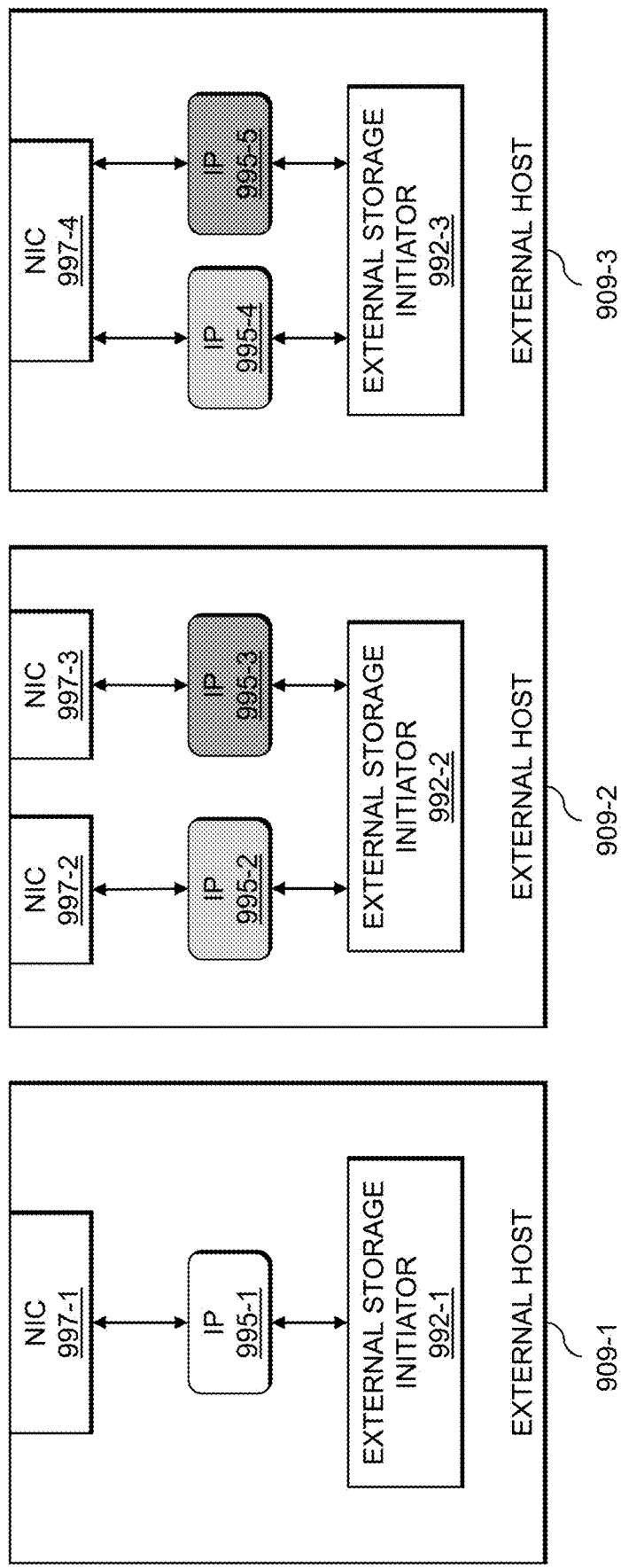

FIG. 9E shows a more detailed view of the external hosts 909. External host 909-1 implements an external storage initiator 992-1 that is coupled via IP-based storage network 995-1 to NIC 997-1, where the IP-based storage network 995-1 is part of a logical storage network for coupling to the first cluster-wide storage network 907-1. External host 909-2 implements an external storage initiator 992-2 that is coupled via IP-based storage network 995-2 to NIC 997-2, and via IP-based storage network 995-3 to NIC 997-3. The IP-based storage network 995-2 is part of the logical storage network for coupling to the second cluster-wide storage network 907-2, and the IP-based storage network 995-3 is part of the logical storage network for coupling to the third cluster-wide storage network 907-3. External host 909-3 implements an external storage initiator 992-3 that is coupled via IP-based storage network 995-4 and IP-based storage network 995-5 to NIC 997-4. The IP-based storage network 995-4 is part of the logical storage network for coupling to the second cluster-wide storage network 907-2, and the IP-based storage network 995-5 is part of the logical storage network for coupling to the third cluster-wide storage network 907-3. Although each of the external hosts 909 is shown in FIG. 9E as implementing only one external storage initiator, in other embodiments one or more of the external hosts 909 may implement multiple external storage initiators each coupled via IP-based storage networks to different NICs or a same NIC. Also, the particular number of external hosts 909 that are coupled to the first cluster-wide storage network 907-1, the second cluster-wide storage network 907-2, and the third cluster-wide storage network 907-3 may vary (e.g., there may be more than one or two external hosts, or more than three external hosts connected to any combination of the first cluster-wide storage network 907-1, the second cluster-wide storage network 907-2, and the third cluster-wide storage network 907-3).

In some embodiments, a "shadow" network is utilized to support storage network reconfiguration. When a storage network (e.g., one of the first cluster-wide storage network 907-1, the second cluster-wide storage network 907-2, and the third cluster-wide storage network 907-3 in the storage cluster of FIGS. 9A-9E) needs to be reconfigured, a hidden shadow network is created with new network parameters. The shadow network does not have a name or ID like the other cluster-wide storage networks, as the shadow network only exists during the reconfiguration. Use of a shadow network for facilitating storage network reconfiguration will now be described with respect to FIGS. 10A-10E.

Figure 10A:
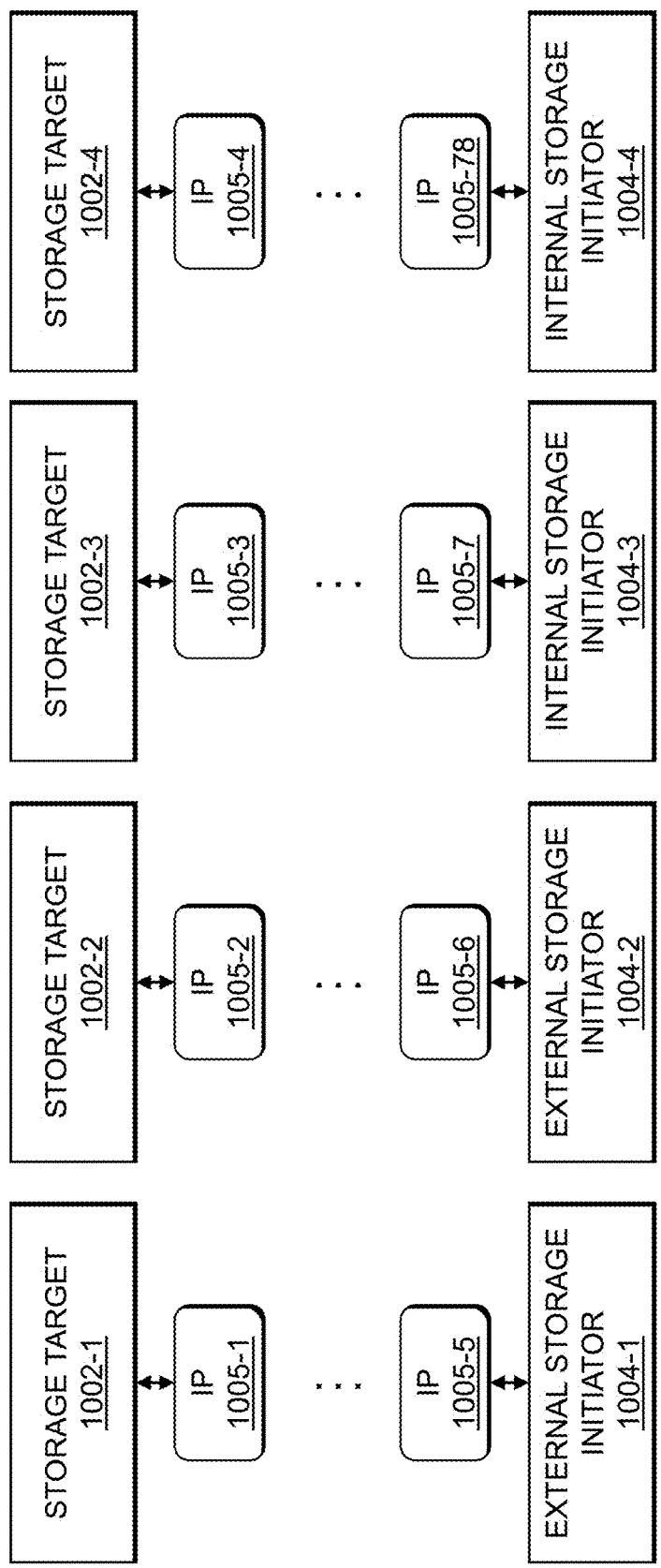
FIGS. 10A-10E illustrate a process flow for cluster wide storage network reconfiguration using a shadow storage network in an illustrative embodiment.

FIG. 10A shows a set of storage targets 1002-1, 1002-2, 1002-3, and 1002-4 (collectively, storage targets 1002) and a set of storage initiators including external storage initiator 1004-1, external storage initiator 1004-2, internal storage initiator 1004-3, and internal storage initiator 1004-4 (collectively, storage initiators 1004). It should be appreciated that the particular number of storage targets 1002 and storage initiators 1004 may vary as desired for a particular implementation, including the particular numbers of internal and external storage initiators that are part of the storage initiators 1004. The storage targets 1002-1, 1002-2, 1002-3 and 1002-4 are coupled to a given cluster-wide storage network via respective IP-based storage networks 1005-1, 1005-2, 1005-3 and 1005-4. The external storage initiator 1004-1, external storage initiator 1004-2, internal storage initiator 1004-3, and internal storage initiator 1004-4 are coupled to the given cluster-wide storage network via respective IP-based storage networks 1005-5, 1005-6, 1005-7, and 1005-8. The given cluster-wide storage network is assumed to be a "first" cluster-wide storage network configuration that is to be reconfigured to a "second" cluster-wide storage network configuration using a shadow network.

Figure 10B:
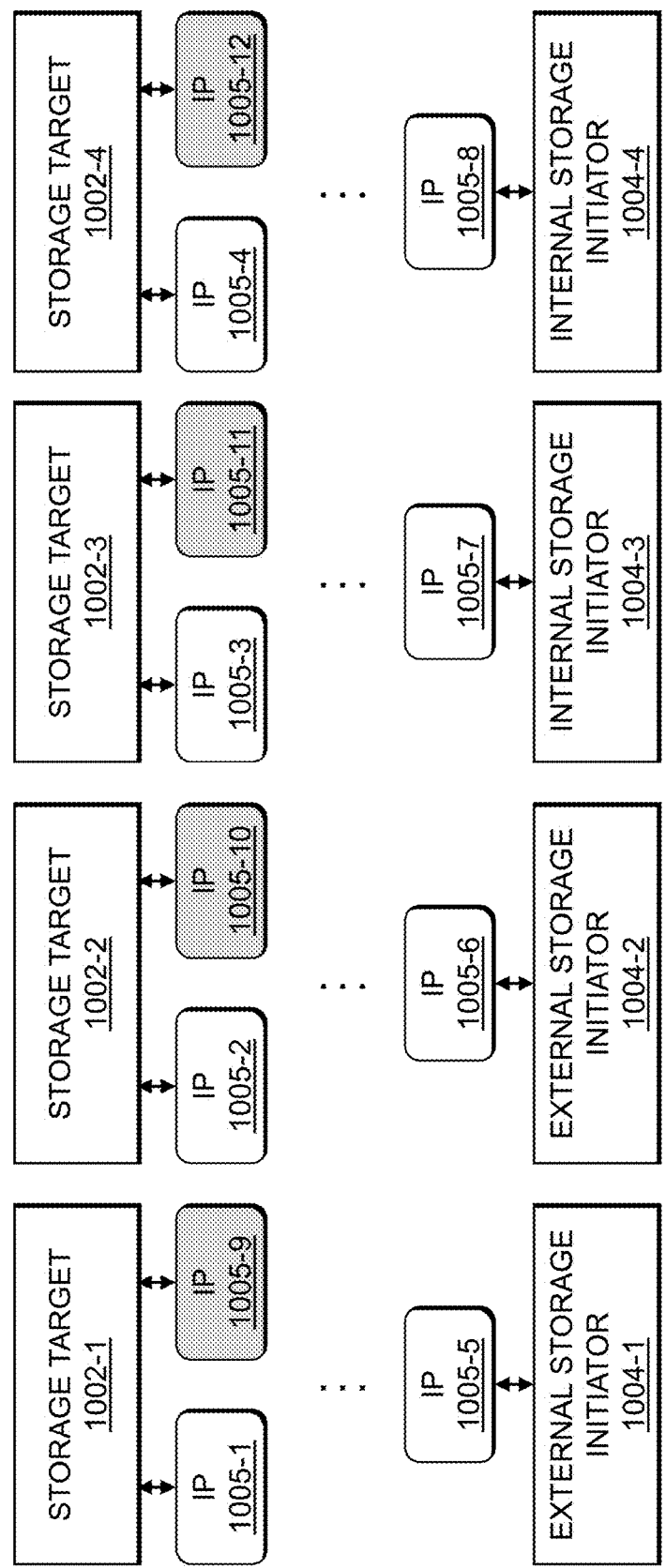

A first phase of the storage network reconfiguration is illustrated in FIG. 10B. As shown in FIG. 10B, the new or second cluster-wide storage network configuration is first applied to the storage targets 1002-1, 1002-2, 1002-3, and 1002-4 via respective IP-based storage networks 1005-9, 1005-10, 1005-11 and 1005-12. At this point, each of the storage targets 1002 is available via the old storage network configuration via IP-based storage networks 1005-1 through 1005-4, and via the new storage network configuration via IP-based storage networks 1005-9 through 1005-12. The storage initiators 1004 (both internal and external) using the old network are not disrupted by the first phase of the storage network reconfiguration. It should be noted that the order in which the shadow network is extended to the storage targets 1002, in some embodiments, is not important. A management and orchestration layer of the storage cluster may extend the shadow network to the storage targets sequentially, in parallel, or any other desired order.

Figure 10C:
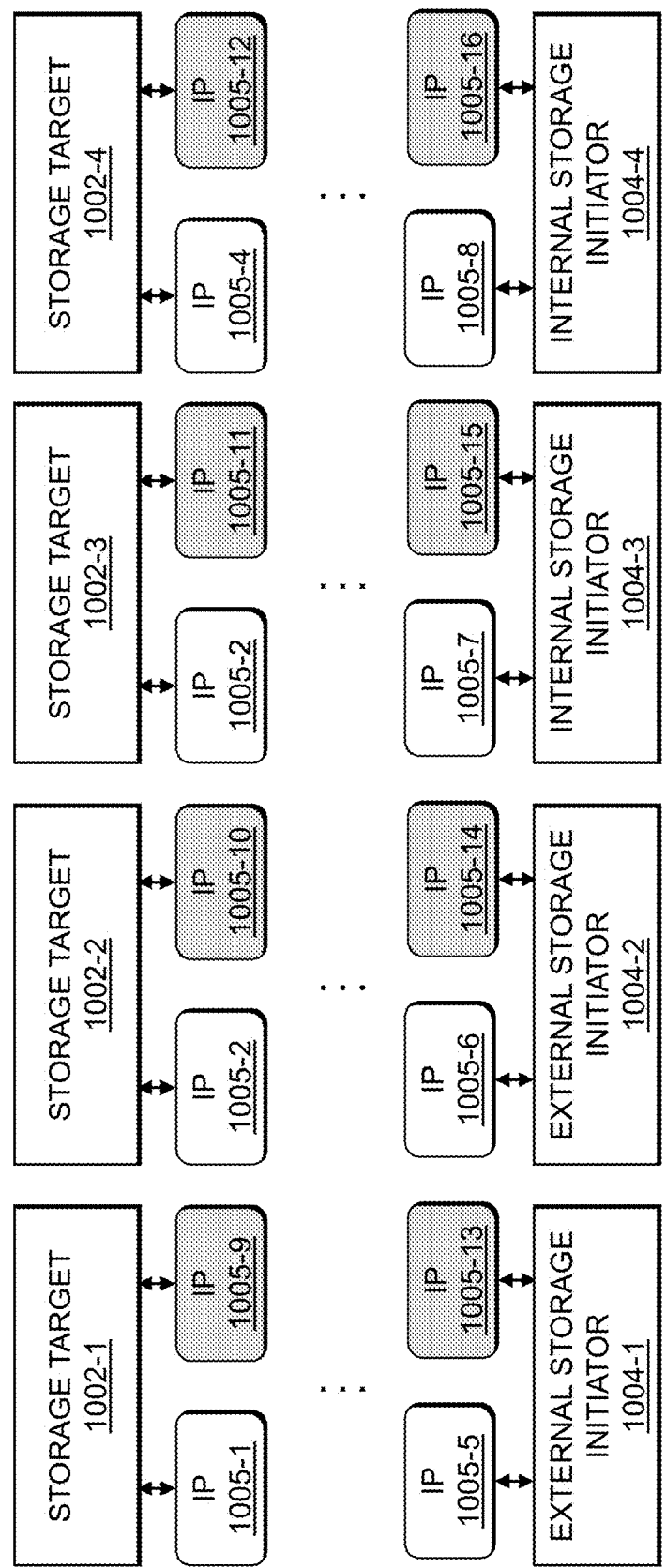
Figure 10D:
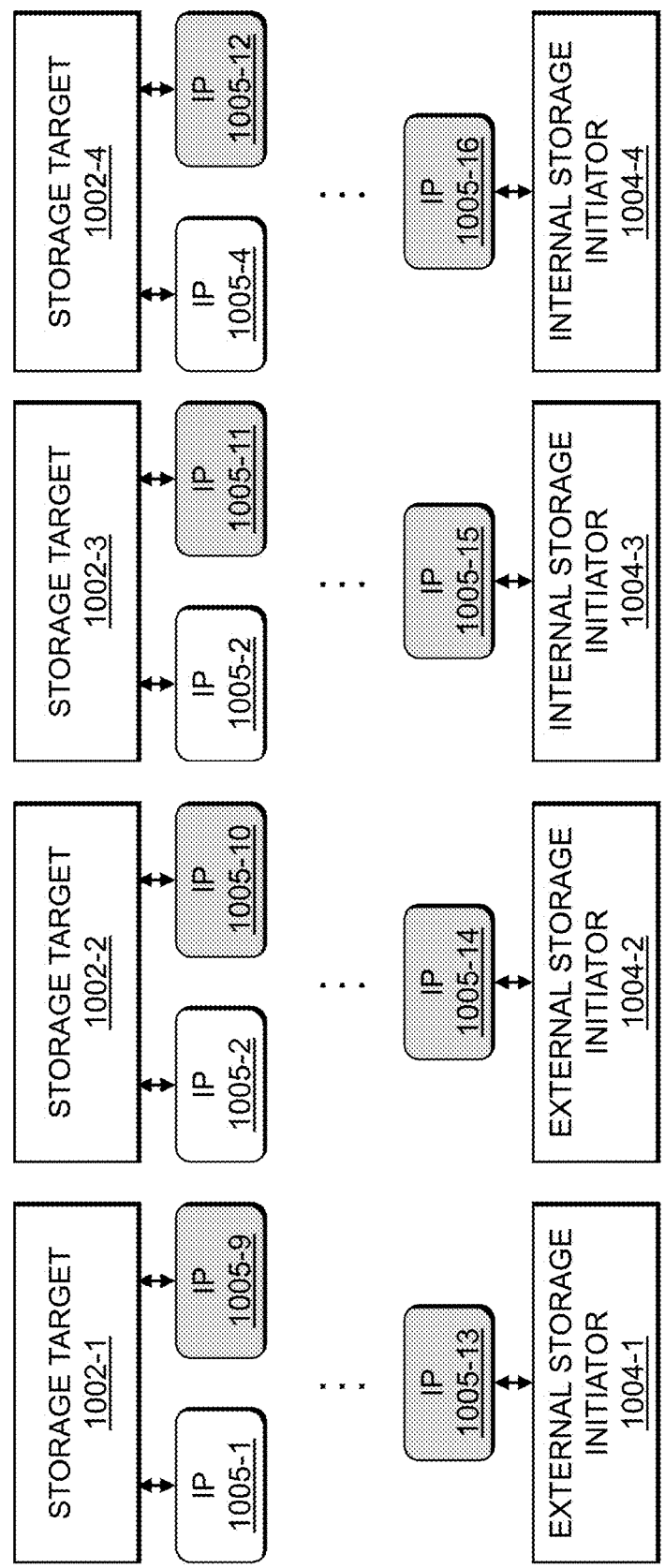

A second phase of the storage network reconfiguration is illustrated in FIGS. 10C and 10D. As shown in FIG. 10C, the new or second cluster-wide storage network configuration is applied to the external storage initiator 1004-1, external storage initiator 1004-2, internal storage initiator 1004-3, and internal storage initiator 1004-4 via respective IP-based storage networks 1005-13, 1005-14, 1005-15 and 1005-16. It should be noted that the reconfiguration of the storage initiators 1004 may take an arbitrarily long time, and similar to reconfiguration of the storage targets 1002 may be performed in any desired order. In some embodiments, the internal storage initiators 1004-3 and 1004-4 may be switched first (e.g., automatically), followed by switching the external storage initiators 1004-1 and 1004-2 (e.g., which may involve some storage administrator or other user input or assistance). The internal storage initiators 1004-3 and 1004-4 are assumed to be reconfigured fully automatically by the management and orchestration layer of the storage cluster, while the external storage initiators 1004-1 and 1004-2 are reconfigured at least partially manually or with user assistance (e.g., of the storage administrator).

The second phase further includes un-configuring the old network configuration on the storage initiators 1004 as shown in FIG. 10D. The switchover from the old network configuration to the new network configuration involves un-configuring or removing the IP-based storage networks 1005-5 through 1005-8 from the storage initiators 1004. The switchover on the storage initiator side is done in such a way that at least one alive path always exists between each of the storage initiators 1004 and the storage targets 1002 at any moment (e.g., via either the old network using IP-based storage networks 1005-5 through 1005-8, or via the new network using IP-based storage networks 1005-13 through 1005-16). Eventually, all the storage initiators 1004 are switched to the new network configuration (e.g., of the shadow network, represented via the IP-based storage networks 1005-13 through 1005-16).

Figure 10E:
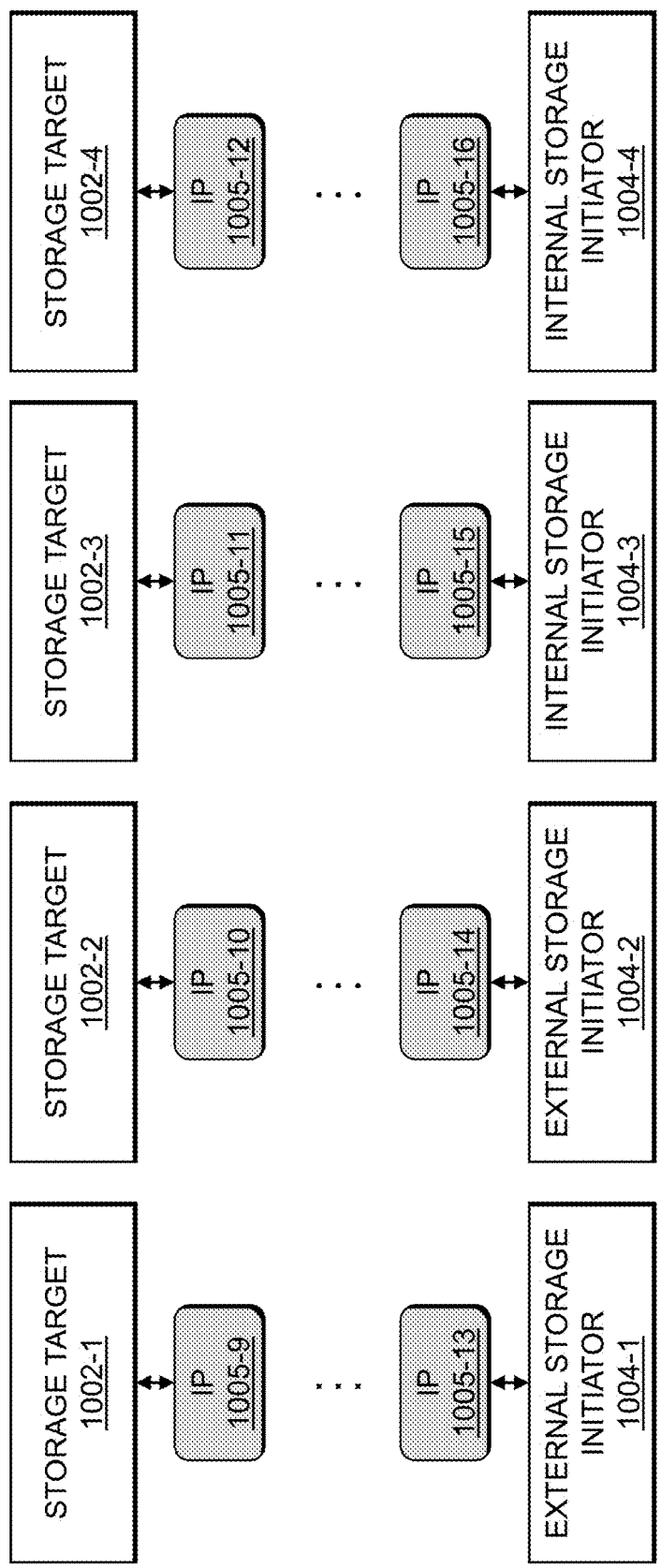

A third phase of the storage network reconfiguration is illustrated in FIG. 10E. As shown in FIG. 10E, once all the storage initiators 1004 have transitioned to the new network configuration (e.g., represented by the IP-based storage networks 1005-9 through 1005-12), the old network configuration (e.g., represented by the IP-based storage networks 1005-1 through 1005-4) may be removed from the storage targets 1002 leaving only the new network configuration. The storage network object is finally updated (e.g., the configuration is swapped with the shadow network, and the shadow network object is removed). This concludes the third phase of the storage network reconfiguration.

Figure 11:
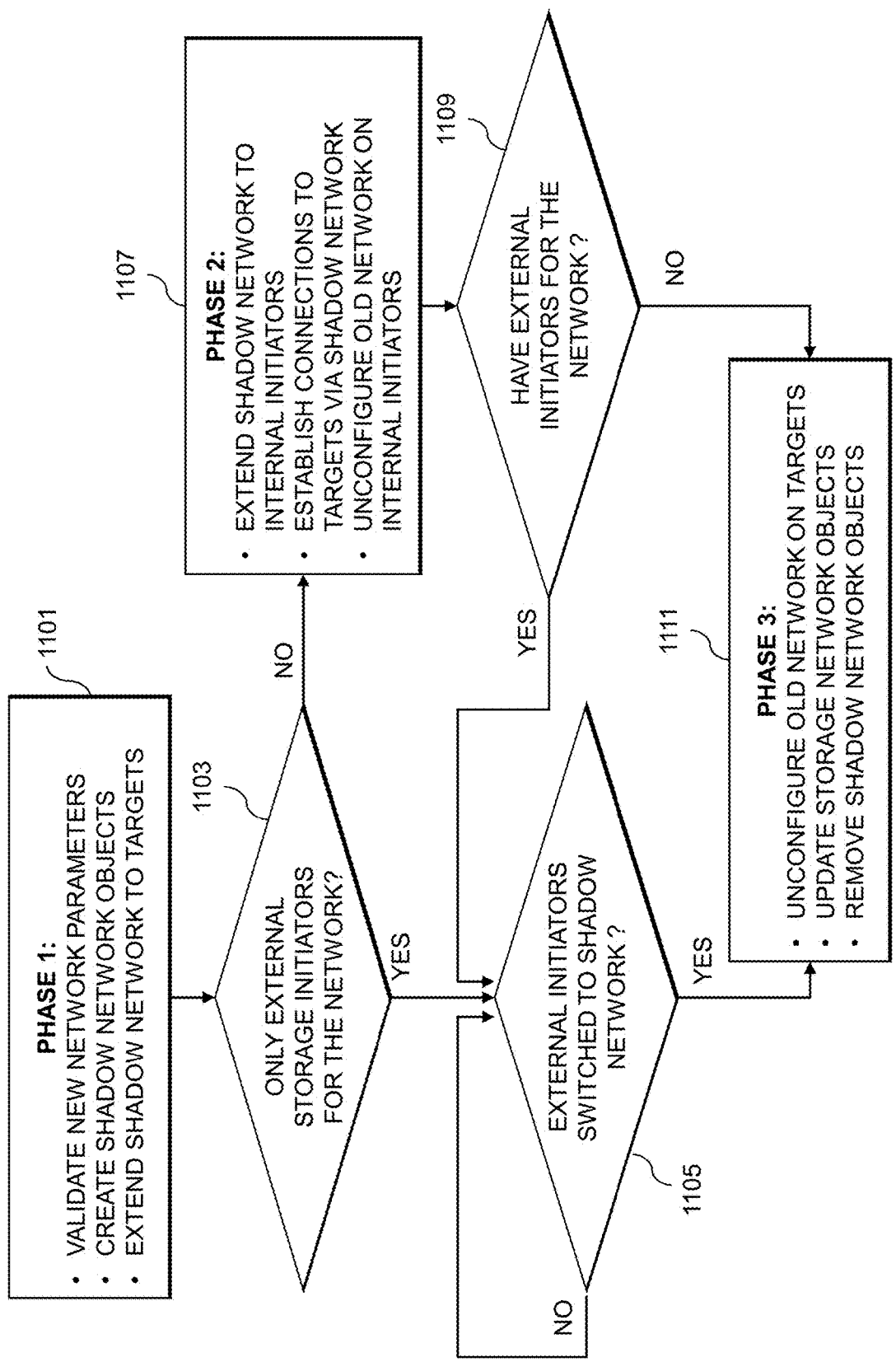
FIG. 11 is a flow diagram of an exemplary process for automatic storage network reconfiguration using a shadow storage network in an illustrative embodiment.

FIG. 11 shows a process flow for non-disruptive storage network reconfiguration. The FIG. 11 process flow may be used for reconfiguring the external storage network 507-2 in the storage cluster illustrated in FIGS. 5A-5E (e.g., the external storage initiators thereof). The FIG. 11 process flow may also be used for reconfiguring the first cluster-wide storage network 907-1 in the storage cluster illustrated in FIGS. 9A-9E (e.g., both the internal and external storage initiators thereof), or for the second cluster-wide storage network 907-2 or the third cluster-wide storage network 907-3 in the storage cluster illustrated in FIGS. 9A-9E (e.g., used by the external storage initiators).

The FIG. 11 process flow may be initiated by a storage administrator that wants to reconfigure a storage network, such as via an associated storage cluster management interface. On receiving such a request, the parameters of the new storage network configuration are requested and obtained, and the first phase is performed in step 1101. The first phase includes validating the new network parameters, creating the shadow network object or objects, and extending the shadow network to the storage targets (e.g., as illustrated in FIG. 10B). The process flow then moves to the determination step 1103, where a determination is made as to whether there are only external storage initiators for the network. If the result of the step 1103 determination is yes, the process flow moves to step 1105 where the storage administrator switches the external storage initiators to the shadow network (e.g., as illustrated in FIGS. 10C and 10D).

If the result of the step 1103 determination is no, the process flow moves to step 1107 where the second phase is performed. The second phase includes extending the shadow network to the internal storage initiators (e.g., as illustrated in FIG. 10C), connections are established to the storage targets via the shadow network, and the old network is un-configured on the internal storage initiators (e.g., as illustrated in FIGS. 10C and 10D). After step 1107, the process flow moves to step 1109, where a determination is made as to whether there are any external storage initiators for the network. If the result of the step 1109 determination is yes, the process flow moves to step 1105. If the result of the step 1109 determination is no, or if there are no external storage initiators left to be switched to the shadow network in a latest iteration of step 1105, the process flow moves to the third phase in step 1111. The third phase includes unconfiguring the old network on the storage targets (e.g., as illustrated in FIG. 10E), updating the storage network object or objects to the new (shadow) network, and removing the shadow network object or objects.

It should be noted that in the FIG. 11 process flow, the second phase (step 1107) is applied to the internal storage initiators only (e.g., to the default or first cluster-wide storage network 907-1 in the storage cluster shown in FIGS. 9A-9E). After the second phase, all the internal storage initiators have been switched to the paths via the shadow network.

The storage cluster has the following information for every external storage initiator that is connected to its storage targets: a block storage protocol identifier, such as an iSCSI initiator iSCSI Qualified Name (IQN); and the IP address or multiple IP addresses belonging to the external storage initiator. The storage cluster may use this information, possibly along with user input, to decide when to transition to the third phase in step 1111. For example, if only internal initiators exist (e.g., a pure HCI cluster use case, such as the storage cluster illustrated in FIGS. 4A-4C), then the entire process is fully automatic (e.g., the first phase in step 1101, the second phase in step 1107, and the third phase in step 1111). However, if external storage initiators exist, then the transition to the third phase in step 1111 can only happen after all the external storage initiators have transitioned to the shadow network (e.g., the result of the step 1105 determination is yes). In some embodiments, the reconfiguration of the external storage initiators is performed at least in part with user assistance, as the external storage initiators are outside the control of the storage cluster. It should be noted that the user assistance in this context may itself be automated, just not by the storage cluster on its own. The storage cluster may transition to the third phase in step 1111 automatically once it detects that all storage initiators have switched to the shadow network and stopped using the old one, or after explicit confirmation by the user. After the third phase is complete, the old network configuration has been fully removed from the storage targets, the storage network object has been updated, and the shadow network object has been removed.

The FIG. 11 algorithm describes the most complicated scenario (e.g., when storage targets, internal storage initiators, and external storage initiators are all affected by the storage network reconfiguration). In less complicated scenarios some steps of each phase may be skipped. For example, if only a subset of the IP address range is changed, and storage target IP addresses are not affected, then the changes on the storage target side are not required at all.

Additional details regarding shadow network reconfiguration algorithms, as well as sub-algorithms required for handling various edge cases, will be described in further detail below. Details regarding integration of storage network reconfiguration with changes of storage targets and storage initiators (e.g., using iSCSI as an example) will also be described in further detail below. Transparent intra-cluster routing between the existing storage network and its shadow network may also be implemented to increase the speed of reconfiguration and avoid dead paths as described in further detail below.

In the description below, it is assumed that the heterogeneous storage cluster includes a VMware ESXi-based HCI, or a mixed storage cluster. It is further assumed that CoreOS Linux-based storage controller VMs (CVMs) are utilized. It should be appreciated, however, that embodiments are not limited solely to use with ESXi hypervisors or Linux-based CVMs.

From a user or customer point of view, a HCI storage cluster is a single (potentially very large) system. The user may be provided a single management interface for the entire storage cluster, and a single storage container may be created that spans across all appliances in the HCI storage cluster. The user may be asked to provide a network configuration for the entire HCI storage cluster. This means that the user should be able to easily reconfigure the HCI storage cluster from the management interface. The user should be able to change all aspects of the storage network configuration (e.g., IP address ranges, subnet masks, gateways, VLAN IDs, Domain Name System (DNS)/Network Time Protocol (NTP) servers, etc.).

Reconfiguration of a HCI storage cluster, however, is a challenging task as complex orchestration flows need to be implemented involving various objects (e.g., server management software-level objects like virtual distributed switches, ESXi nodes, a storage cluster stack running inside a CoreOS VM, etc.). Several layers of persistence also need to be dealt with to make sure that cluster background activities are not affected by the cluster storage network reconfiguration, to support pre- and post-validation, to implement viable rollback support, to properly deal with simultaneous reconfiguration requests, to let users reconfigure clusters where not all nodes are in a good state, to survive failures of any nodes during reconfiguration, etc. In some embodiments, however, an important requirement is that user VMs must not be affected by cluster storage network reconfiguration (including compute, network and storage). Compute resources and tenant networking are not explicitly affected by cluster storage network reconfiguration, but techniques are designed to ensure they are not implicitly affected (e.g., virtual distributed switch reconfiguration, host uplink reconfiguration, VM failures/failovers due to node reboots, etc.). Storage network reconfiguration may seriously impact user VMs, and thus implementation of the storage network reconfiguration is orchestrated in some embodiments to be non-disruptive for user VMs.

Storage network reconfiguration, as described above, may include various changes. Some solutions support a single storage overlay network for the entire storage cluster. The single storage overlay network may define a range of IPv4 addresses (which may be non-contiguous), a subnet mask, an optional gateway IP and optional VLAN ID, etc. IP addresses from the range are used by iSCSI initiator portals on the hypervisor (e.g., ESXi) side and by iSCSI target portals on the storage cluster side (subnet mask and gateway are associated with them). VLAN is set on target and initiator distributed port groups (DPGs) created in virtual distributed switches. The following reconfiguration options are supported: change of an individual IP (either storage target or storage initiator), such as 10.5.5.10/24→10.5.5.11/24; change of a range of IPs within the same subnet (affecting storage initiators, storage targets or both), such as 10.5.5.10/24-10.5.5.30/24→10.5.5.10/24-10.5.5.20/24, 10.5.5.50/24→10.5.5.60/24; change of a range of IPs with the change of subnet, such as 10.5.5.10/24-10.5.5.30/24→10.7.7.10/24-10.7.7.30/24 or 10.5.5.10/24-10.5.5.30/24→10.5.5.10/23-10.5.5.30/23; change of a VLAN ID, such as 0 (none)→100, or 100→200; change of a subnet and VLAN ID consistently at the same time, such as 10.5.5.10/24-10.5.5.30/24 VLAN=5→10.7.7.10/24-10.7.7.30/24 VLAN=7; etc.

There are significant differences between bare-metal storage clusters and HCI storage clusters. In the case of a bare-metal storage cluster, all of a user's storage clients are outside of the storage cluster, and the storage cluster generally has no control over those clients (e.g., iSCSI initiators). If a user decides to reconfigure the storage overlay network (e.g., change IP subnet, gateway, VLAN, etc.), the storage cluster generally cannot do anything with the storage initiators. For example, portals cannot be changed on the storage initiator side, and re-login requests may not work depending on the change, user network and routing configuration, etc. Thus, a bare-metal cluster configuration is an easier case, as only the reconfiguration of iSCSI target portals is handled, and the user may deal with the iSCSI initiators. As a usability enhancement, in some embodiments the user may be provided with a list of storage initiators that may be affected by the change of the storage target portals. This will help the user find all the storage initiators and reconfigure them. In the case of a HCI storage cluster, both storage targets and storage initiators are managed and all complexity may be hidden from the user. This involves reconfiguring the storage network on both sides in a non-disruptive fashion.

Due to the desire to scale compute and storage resources independently, a storage cluster architecture may support different types of HCI storage clusters, including: homogeneous HCI clusters, where the storage clusters include only HCI appliances; and heterogeneous HCI clusters, where in addition to HCI appliances the storage cluster may have bare-metal appliances, compute-only appliances, or appliances of both types. Bare-metal appliances contribute their storage to the storage container, but cannot host VMs which means that they only have storage targets and not storage initiators. Compute-only appliances do not have storage to contribute to the storage container but can host VMs consuming storage from it. Compute-only appliances thus only have storage initiators and not storage targets. There are different types of compute-only appliances, those that are part of the storage cluster (e.g., are managed by the storage cluster) and those that are third-party (e.g., commercial off-the-shelf (COTS) servers with a hypervisor such as ESXi installed, where the third-party COTS servers are external clients which just use storage from a virtual volume (VVol) datastore and the storage cluster does not control the network or iSCSI configuration on these nodes). The storage cluster, using the techniques described herein, is able to reconfigure all types of HCI clusters non-disruptively, with the exception of third-party COTS compute-only nodes outside the control of the storage cluster.

Figure 12:
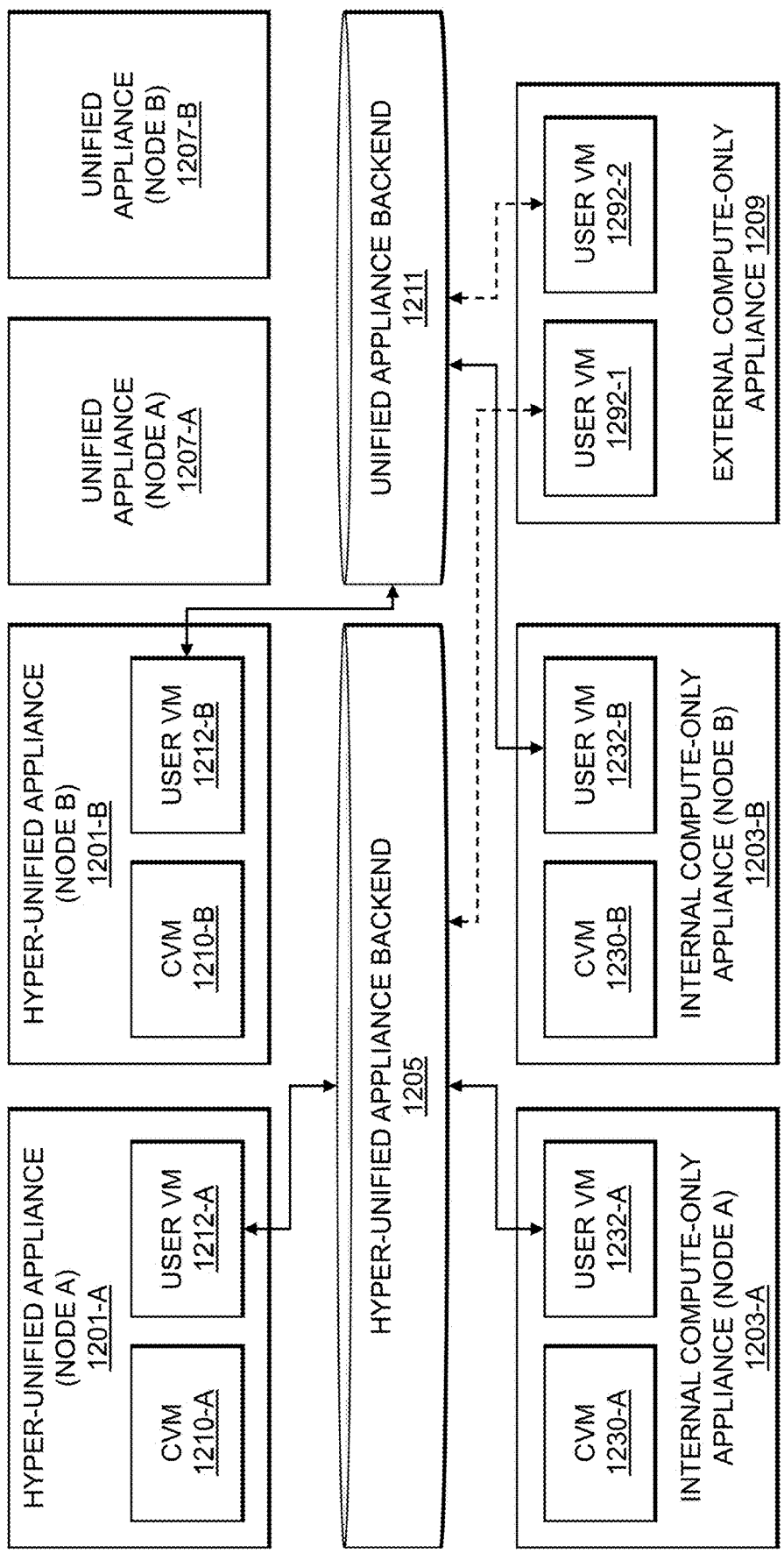
FIG. 12 illustrates a heterogeneous storage cluster in an illustrative embodiment.

FIG. 12 shows an example of a heterogeneous HCI storage cluster, including HCI appliances 1201-A and 1201-B, internal compute-only appliances 1203-A and 1203-B, HCI appliance backend 1205, bare-metal appliances 1207-A and 1207-B, external compute-only appliance 1209, and bare-metal appliance backend 1211. The HCI appliance 1201-A implements a storage controller VM (CVM) 1210-A and user VM 1212-A, the HCI appliance 1201-B implements a CVM 1210-B and user VM 1212-B, the internal compute-only appliance 1203-A implements a CVM 1230-A and user VM 1232-A, the internal compute-only appliance 1203-B implements a CVM 1230-B and user VM 1232-B, and the external compute-only appliance 1209 implements user VMs 1292-1 and 1292-2. The particular numbers of HCI appliances, bare-metal appliances, internal and external compute-only appliances, controller and user VMs implemented thereon, etc., may vary.

In some HCI storage clusters, user VMs consume storage from a VVol datastore as virtual SCSI disks. When a user VM does I/O, it goes through the guest OS kernel stack and then via a hypervisor storage stack which ends with an iSCSI initiator. Each node in the HCI storage cluster has an iSCSI initiator configured to reach any iSCSI targets. Normally, but not always, user VMs access storage via a local storage controller VM, which means that the I/O never leaves the node but it still works via an iSCSI protocol.

Storage network reconfiguration doesn't technically affect iSCSI initiators and targets. Instead, it affects initiator and target portals and underlying virtual and physical infrastructure on all appliances of the storage cluster. There is thus a need to make sure that storage network configuration changes: do not cause I/O failures at the hypervisor level which could lead to freezing of the VMs (e.g., I/O latency spikes that exceed hypervisor-defined thresholds); do not cause I/O failures at the guest OS kernel-level that are propagated up to the filesystem and/or application level inside guests (e.g., I/O latency spikes exceed guest kernel thresholds); and ideally do not cause noticeable latency spikes at all. This basically means that the switch from the old storage network to the new one should be as fast as possible so that VMs cannot even distinguish it from a random I/O latency spike (e.g., a latency spike that does not exceed a few seconds, and ideally not exceeding several hundreds of milliseconds).

In some embodiments, techniques are provided that design a non-disruptive storage network reconfiguration algorithm that supports various types of HCI storage clusters and various kinds of storage network reconfiguration. Before discussing various approaches to non-disruptive storage network reconfiguration, a general explanation of initiators implemented by ESXi will be provided.

Each ESXi host (e.g., a server or data storage device on which an ESXi hypervisor is installed) has a number of VMkernel network interfaces (VMKs) intended to be used for iSCSI traffic. Each VMK is created on a compatible port group and may have IPv4, IPv6 or mixed configuration. Unfortunately, it's not possible to have custom TCP/IP stack for iSCSI or per iSCSI VMK. This means that all iSCSI VMKs must belong to the default TCP/IP stack. Some hypervisor versions (e.g., ESXi 6.5), however, enable setting the gateway directly on the VMK. If a gateway is specified on a VMK, then it has higher priority than the gateway specified for the TCP/IP stack and will be used to route traffic directed to a non-local subnet. Because iSCSI VMKs have to be in the default TCP/IP stack, which is also used by a management VMK, the storage network gateway should not be set in the stack itself. Instead, gateways are set on each iSCSI VMK. In this way, management and iSCSI traffic will always use the right gateway if both networks have gateways. If the storage network does not have a gateway, but an iSCSI initiator for some reason needs to access a non-local host, then an incorrect gateway may be used.

Initiator DPGs configuration will now be described. Two initiator DPGs may be used on a virtual distributed switch, which are configured identically except for the load balancing and failover (LBFO) configuration which is asymmetric in that DPG1: Uplink1 active, Uplink2 unused and DPG2: Uplink1 unused, Uplink2 active. This is a requirement for port binding, and if it is not met the DPG is not compatible and the VMK created on top of it cannot be bound. The storage network may have an associated VLAN, which is configured on iSCSI initiator DPGs. The same VLAN is configured for both DPGs. In some embodiments, the DGPs have to be in virtual switch VLAN tagging (VST) mode because VMKs cannot deal with tagged traffic.

Each ESXi host may have only one iSCSI software adapter, which is used to define the set of targets and a list of bound VMK adapters. The iSCSI software adapter may be implemented fully in software, and hence may use ESXi networking. In some cases, network port binding (NPB) features are used, where each VMK uses only one uplink and is bound to the iSCSI software adapter. The IP address of each VMK is used for the iSCSI initiator portal. ESXi, however, will not allow binding of a VMK which is not configured on a compatible DPG (e.g., if there is more than one active uplink, etc.). After the VMK is bound to the iSCSI adapter, nothing may happen from the iSCSI protocol point of view. ESXi will start using the new VMK only after rescan of the adapter is performed. Unbinding of the VMK happens instantly, and causes a shutdown of all iSCSI sessions involving IP of that VMK. This property is beneficial, because it forces ESXi to immediately switch paths as opposed to the case when the active path becomes unavailable and ESXi needs to wait for some time before claiming it as dead. Note that after unbind of the VMK, ESXi suggests doing the rescan. It is important in some embodiments that there can be more than one DPG using a particular uplink as "active" and have more than one VMK bound to this uplink. This allows having VMKs with different IP configuration and different VLAN on top of the same uplinks.

The iSCSI software adapter may maintain two lists of targets, dynamic and static. The dynamic list is populated manually and is not updated automatically (despite the name "dynamic"). The targets in the dynamic list are used during rescan processes (e.g., ESXi does log in, SendTargets (ST), report LUNs, etc.). When a new entry is added to the dynamic list, the partial discovery process is initiated automatically and then ESXi asks to perform a rescan. Removal from the dynamic list triggers a partial discovery process. Note that removal from the dynamic list does not cause removal from the static list if the target is still reported by ST via a different target from the dynamic list. In some embodiments, there is no way to modify an entry in the dynamic list. Instead, the entry to be modified is removed and a new one is added. This also applies to the static list in some embodiments.

Targets are usually added to the static list automatically via ST discovery during the rescan. Rescan will remove items from the static list if they are no longer seen via ST. It is also possible to manually remove the targets from the static list. This will cause a shutdown of sessions involving this target which is a beneficial property. Note that manually removed targets will re-appear in the static list after performing a rescan if such targets are still reported via ST.

The iSCSI software adapter, in some embodiments, uses some form of full mesh iSCSI topology where there is an iSCSI session between each iSCSI initiator portal and each iSCSI target portal (e.g., from a static list). Those connections are permanent and are generally not re-established until failures or external events happen. For a particular target, there will be TCP connections to the target portal from each initiator. If there is no I/O or rescan operations in progress, then only iSCSI pings over those connections will be seen (e.g., NOP-OUT/NOP-IN Protocol Data Units (PDUs)). ESXi sends NOP-Outs via all VMKs to all targets every 15 seconds by default. ESXi may support per-VMK gateways, and use separate gateways to reach targets in different subnets. In some embodiments, a single subnet or multiple subnets with port binding are used. Because ESXi uses full mesh iSCSI topology, a single subnet guarantees that each initiator can reach each target. For multiple subnets to work, each VMK adapter should have a gateway configured in its subnet via which any non-local target can be reached. As long as external routing is configured, this will work as desired.

HBA rescan behavior will now be described. During iSCSI software adapter rescan, ESXi tries to log into each target from the dynamic list, sends a SendTargets command and then logs out. Those commands are sent via each bound VMK to each known target. The text command may include an ST command, and the text response may include a list of known targets, including targets configured in different subnets. All previously unknown targets are added to the static list for the iSCSI software adapter. In some cases, the same commands may be sent twice to the same target, though this will generally happen only on one VMK rather than all of them. This is due to some implementations that send commands to each target via VMK1 and VMK2, but in addition to that, the commands are also sent via a "default" interface. One of each bound VMK (e.g., usually the first one) acts as the default interface via which duplicate packets are sent. If there are no bound VMKs, then VMK0 (e.g., a management VMK) may be chosen as the "default" interface. This is not desirable, however, because iSCSI commands may be sent via the management network.

After ST discovery is done for all targets from the dynamic list, already known targets are skipped. However, for newly discovered targets, ESXi tries to perform a login. If new targets are in the different subnet and routing is not configured between them, then logins will time out and no sessions will be established. Similarly, if we have bound VMKs in different subnets, then some targets will not be reachable and login will timeout. Normally, without routing between subnets configured, 50% of possible sessions will be established (e.g., all S1 initiators to all S1 targets and all S2 initiators to all S2 targets). If routing between subnets is configured, then all initiators will have sessions to all targets.

Figure 13:
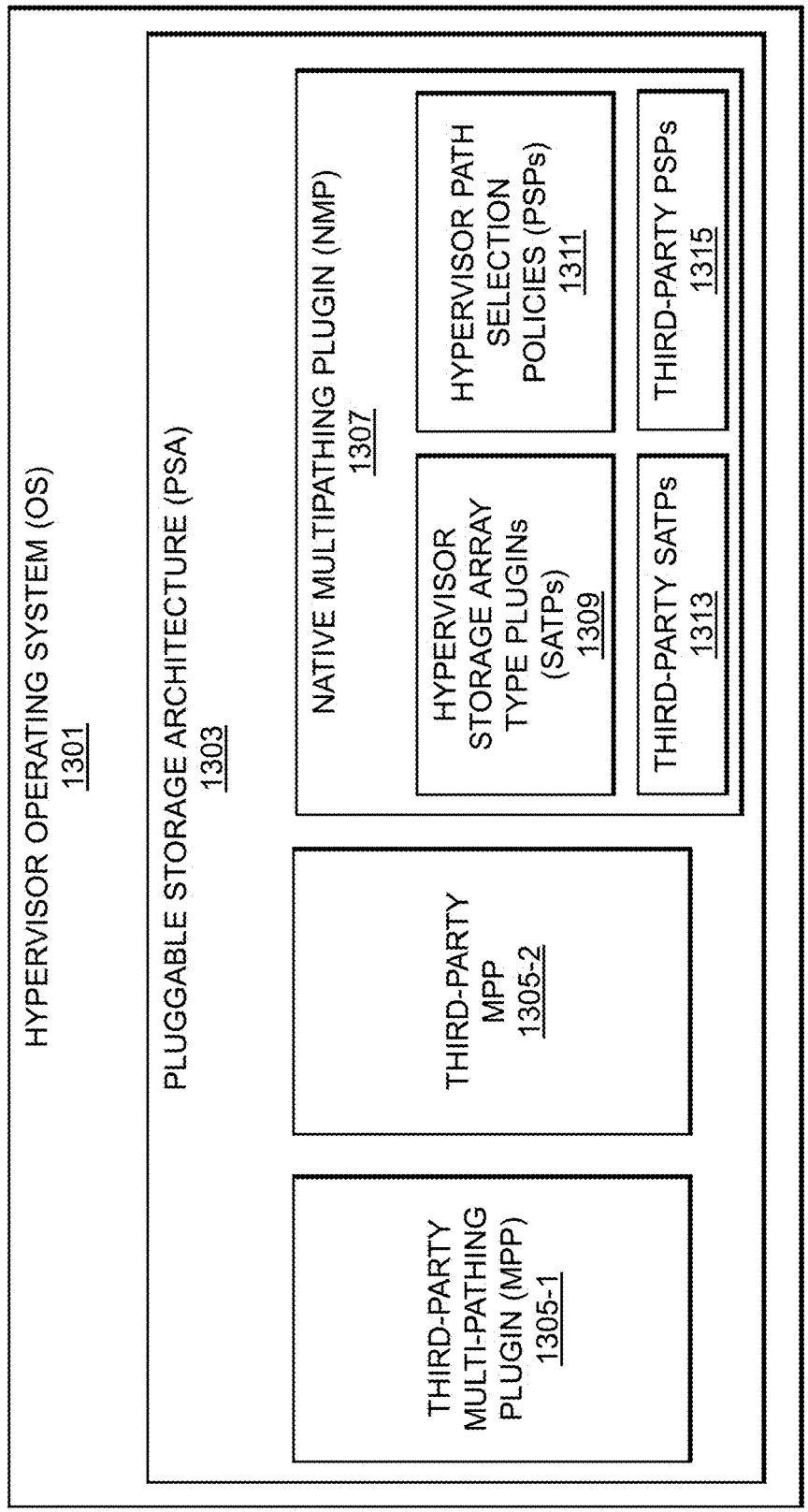
FIG. 13 illustrates a hypervisor operating system implementing a pluggable storage architecture in an illustrative embodiment.

Multipathing features will now be described. In the pluggable storage architecture of ESXi, multipathing is managed via multipathing plugins. VMware provides a native multipathing plugin called native multipathing plugin or NMP. It manages two types of sub-plugins, path selection policy (PSP) and storage array type plugins (SATP). Vendors may also supply their own multipathing plugins to be used instead of NMP (they fully replace NMP if installed) or provide custom PSPs and SATPs if native ones provided by NMP are not applicable for some reason. FIG. 13 shows an example of a hypervisor OS 1301 (e.g., VMware VMkernel) implementing a pluggable storage architecture (PSA) 1303 with two third-party multipathing plugins (MPPs) 1305-1 and 1305-2, as well as NMP 1307 providing one or more hypervisor (e.g., VMware) SATPs 1309 and PSPs 1311, as well as one or more third-party SATPs 1313 and PSPs 1315 (e.g., for the third-party MPPs 1305-1 and 1305-2).

The PSA 1303 is configured to load and unload MPPs (e.g., both native such as NMP 1307 and third-party such as third-party MPPs 1305-1 and 1305-2). The PSA 1303 is also configured to route I/Os from particular devices to the corresponding MPP, to handle I/O queuing and bandwidth sharding for logical devices, to handle I/O queuing to physical HBAs and physical path discovery, and to provide I/O statistics for logical devices and physical paths. The MPPs (e.g., NMP 1307 and third-party MPPs 1305-1 and 1305-2) are configured to perform physical path claiming and un-claiming (e.g., every unclaimed path may be evaluated every five minutes to find the appropriate MPP which would claim it). The MPPs are also configured to perform creation, registration, and deregistration of logical devices, to perform association between physical paths and logical devices, to perform path failure detection and remediation, to process I/Os to logical devices (e.g., including selection of an optimal physical path), and to perform management operations such as reset of logical devices. The SATPs (e.g., hypervisor or native SATPs 1309 and third-party SATPs 1313) are responsible for array-specific operations, for performing path state detection and activation of inactive paths, for monitoring the health of each physical path, and for reporting changes in state for each physical path. The NMP 1307 provides a generic SATP (e.g., hypervisor SATPs 1309 for ALUA arrays) as well as a number of array-specific SATPs (e.g., third-party SATPs 1313 for arrays from HCL). The PSPs (e.g., native or hypervisor PSPs 1311 and third-party PSPs 1315) are responsible for choosing the physical path for I/O requests. A PSP is assigned to a logical device based on the SATP associated with physical paths for that logical device. The NMP 1307 supports various PSPs, including but not limited to most recently used (MRU), fixed, round robin (RR), etc.

With the iSCSI software adapter and NPB, each iSCSI VMK becomes a different path which may be used by the iSCSI stack and MPP. In some embodiments, ALUA SATP is used. In NMP 1307, the default PSP for generic ALUA arrays is MRU. With MRU PSP, there will be only one current path, and it is marked as the "Active I/O" in an associated graphical user interface (GUI) (e.g., the vSphere GUI). The GUI, however, may not explicitly distinguish between optimized versus non-optimized paths. Various commands (e.g., ESXi command line interface (CLI) commands, or "esxcli") may be used to obtain more information such as: which group is active optimized, active unoptimized or dead; which path belongs to which group; which path is current; which RTP is associated with a path; SATP and AULA configuration such as implicit versus explicit; target port group (TPG) states; etc. MRU is unable to utilize more than one path, but RR PSPs can. By default, RR submits 1000 I/Os via one path before switching to another one. With ALUA arrays RR will only iterate over "active/optimized" paths by default. There is a way to change this behavior. For example, it is possible to specify the number of I/Os between switching the paths (–I switch). It is also allowed to specify the value of 1 which means that the path is switched after each I/O. In addition to that, it is possible to enable round-robin policy over all paths (e.g., both active/optimized and active/unoptimized using (–U switch)).

It should be noted that with MRU and RR default configurations, active/unoptimized paths will not be used until a working active/optimized path exists. Failback only happens from active/unoptimized to active/optimized, but not between paths of the same state. When VVols are in use, multipathing is configured for protocol endpoints (PEs). Note that if many VMs have VVols bound to the same PE, then they all will use active path(s) of that PE. This means that: with MRU PSP all VMs will use only one path; with RR PSP in the default configuration, all VMs will use all available active/optimized paths (N I/O submissions via each path before path switch); and with RR PSP in a custom configuration, all VMs will use all paths (N I/O submissions via each path before path switch). MRU PSP in some cases will not allow utilization of more than one uplink on the iSCSI target side because only one path is being used (e.g., not considering the use of bonding in HCI cases, though even with bonding a single TCP connection will not span across multiple uplinks due to the nature of distribution functions and impact on TCP performance). As a result, some embodiments utilize RR PSP instead of a default MRU PSP.

Modification of iSCSI initiators and iSCSI targets will impact I/O operations. Tools like iptables may be used to drop iSCSI traffic for a particular node or particular target. The following observations are made by introducing iSCSI traffic loss during different periods of time (e.g., configuration of iSCSI initiator and target portals was the same): if the non-current path is blocked, there is no impact on I/O at all, with both MRU and normal RR PSPs; if the current path is blocked for a short period of time, then I/O has frozen for that period of time and then resumed on the same path; if the current path is blocked for a long period of time (e.g., >35 seconds), then ESXi detected this, marked path as dead and failed over to another path; if failover to active/non-optimized path happened and then active/optimized path becomes available, then there will be failback; there won't be failback from active/optimized to active/optimized; if all paths to all targets are blocked, then I/O has frozen completely. Blocking all paths to all targets was done for 120 seconds, and during that time the VMs were accessible via the VMware console, all programs that had data in page cache could be started, and an attempt to run a new program led to a freezing of that command because all root FS I/O got stuck. For 120 second I/O pause, there was nothing bad observed in dmesg for Linux tenant VMs. VMware documentation indicates that Windows guests will crash for long I/O timeouts and recommends tuning the registry and setting SCSI timeout to 60 seconds. Windows guests were not tried, but latency sensitive applications running inside guests may start failing. VMware suspending VMs was not observed after detecting long I/O timeouts.

The following observations are made by changing the IP of the target portal or initiator portal (e.g., VMK on ESXi side). In both cases, IP was used by the current path with MRU PSP. First, the target portal was modified, and I/O stopped for 36 seconds. NOP-OUT timeouts were observed in the logs and the path switched to a non-optimized path via peer node. Until rescan was done, I/O was going via peer node (e.g., there was no auto failback in the reconfiguration case). During rescan there was an attempt to reach old I/O because it was in the dynamic list. Then I/O was switched to the new IP (e.g., from non-optimized→optimized). The initiator portal IP was then modified via changing the VMK IP configuration, and I/O stopped for 26 seconds. The I/O then resumed on the same VMK (e.g., MRU PSP didn't change the path). Then it was switched back to the old IP and the same behavior was observer. It should be noted that modification of iSCSI portals used by current paths will lead to high latency spikes before paths are claimed as dead. In some embodiments, some iSCSI software adapter timeout values may be tuned to decrease latency spikes. This may not be desired with certain hypervisor implementations (e.g., such as VMware hypervisors like ESXi).

Figure 14A:
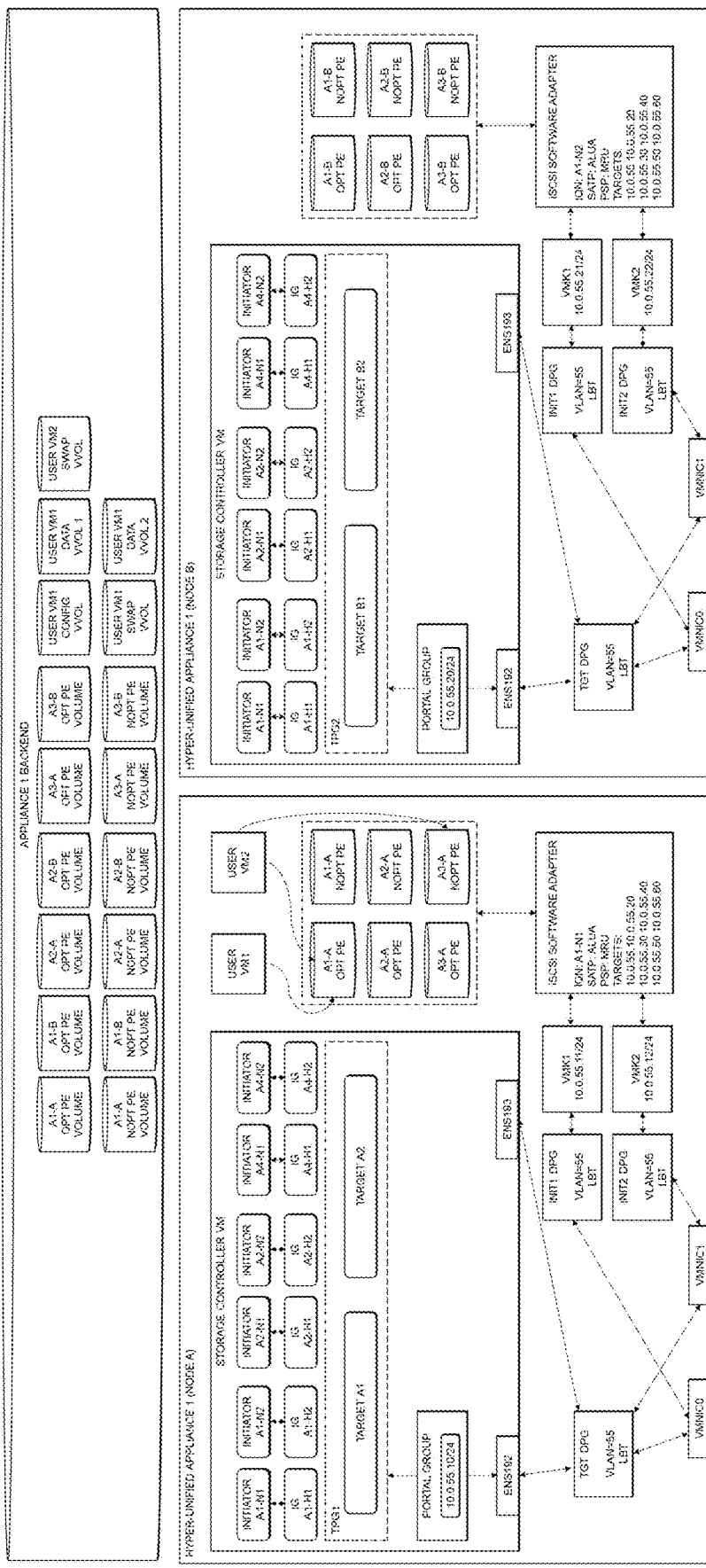
FIGS. 14A-14O illustrate a storage network configuration for a heterogeneous storage cluster in an illustrative embodiment.
Figure 14B:
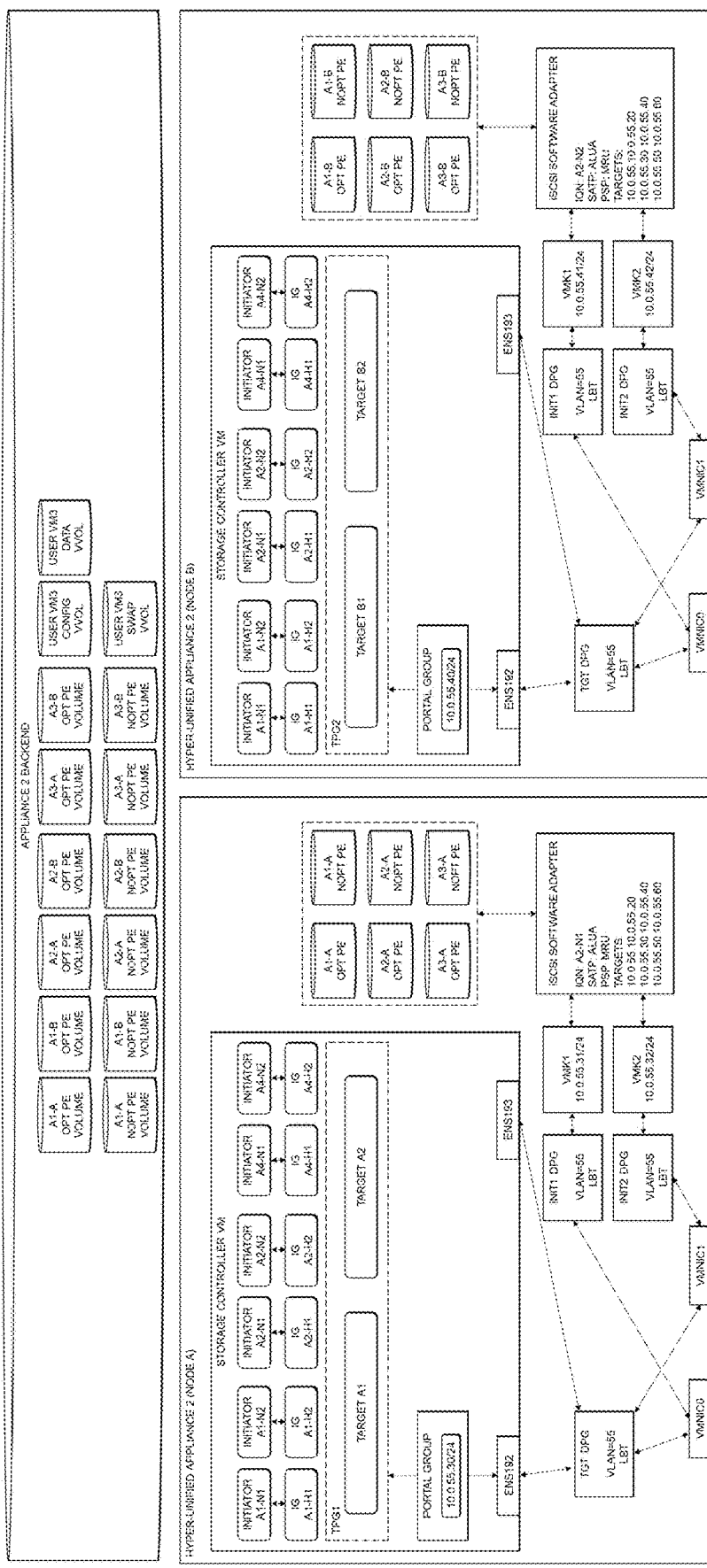
Figure 14D:
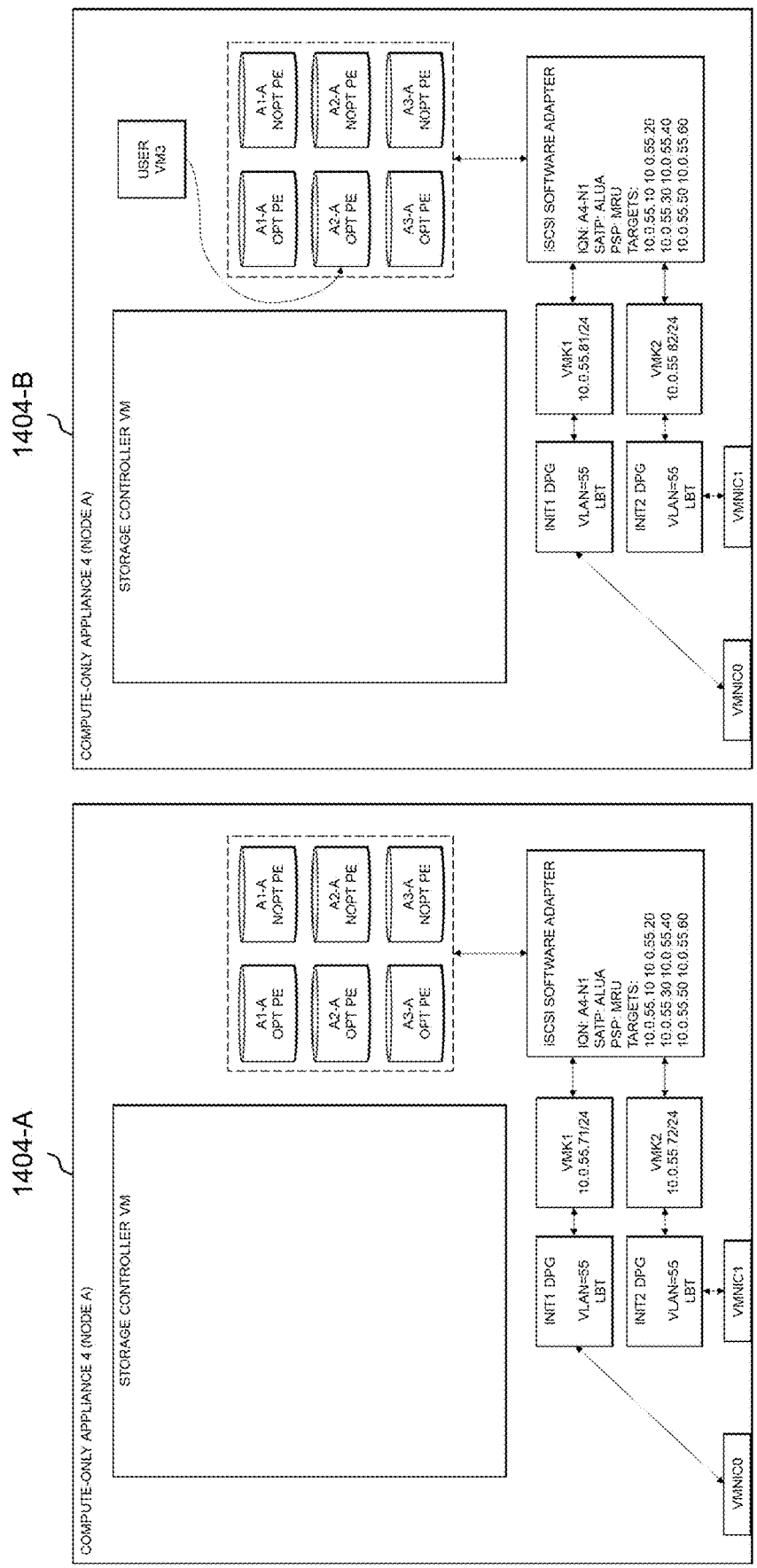
Figure 14E:
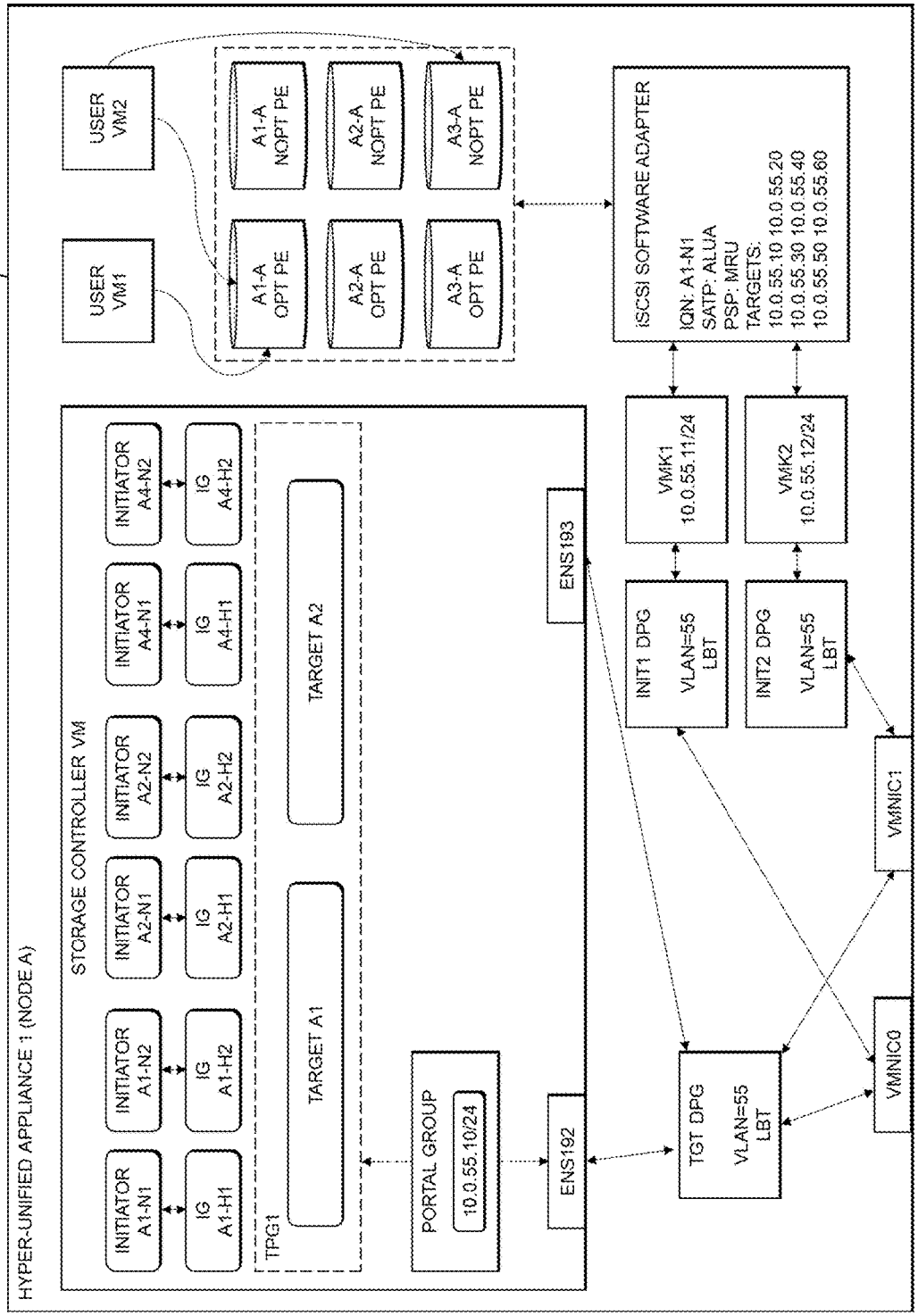
Figure 14F:
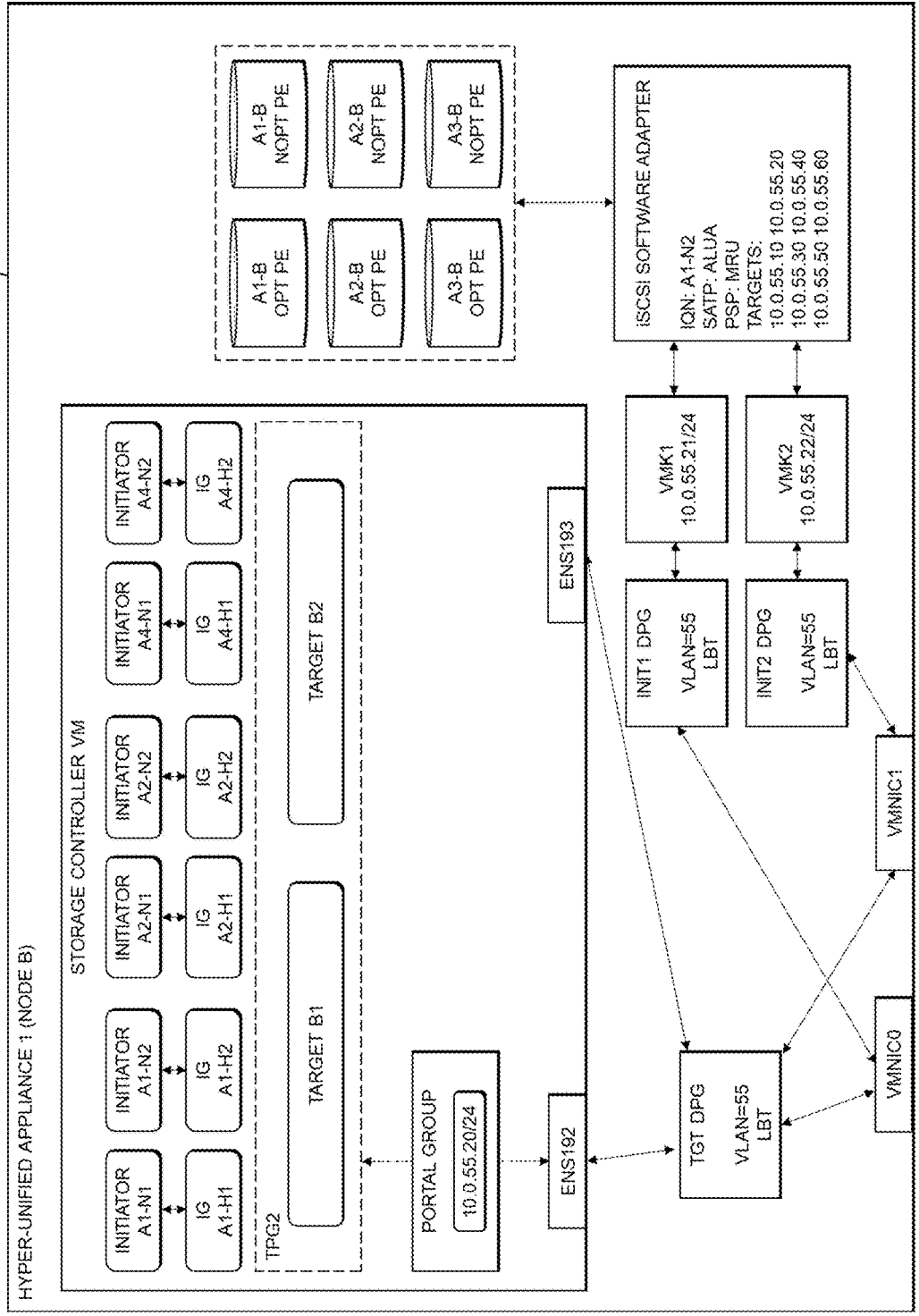
Figure 14G:
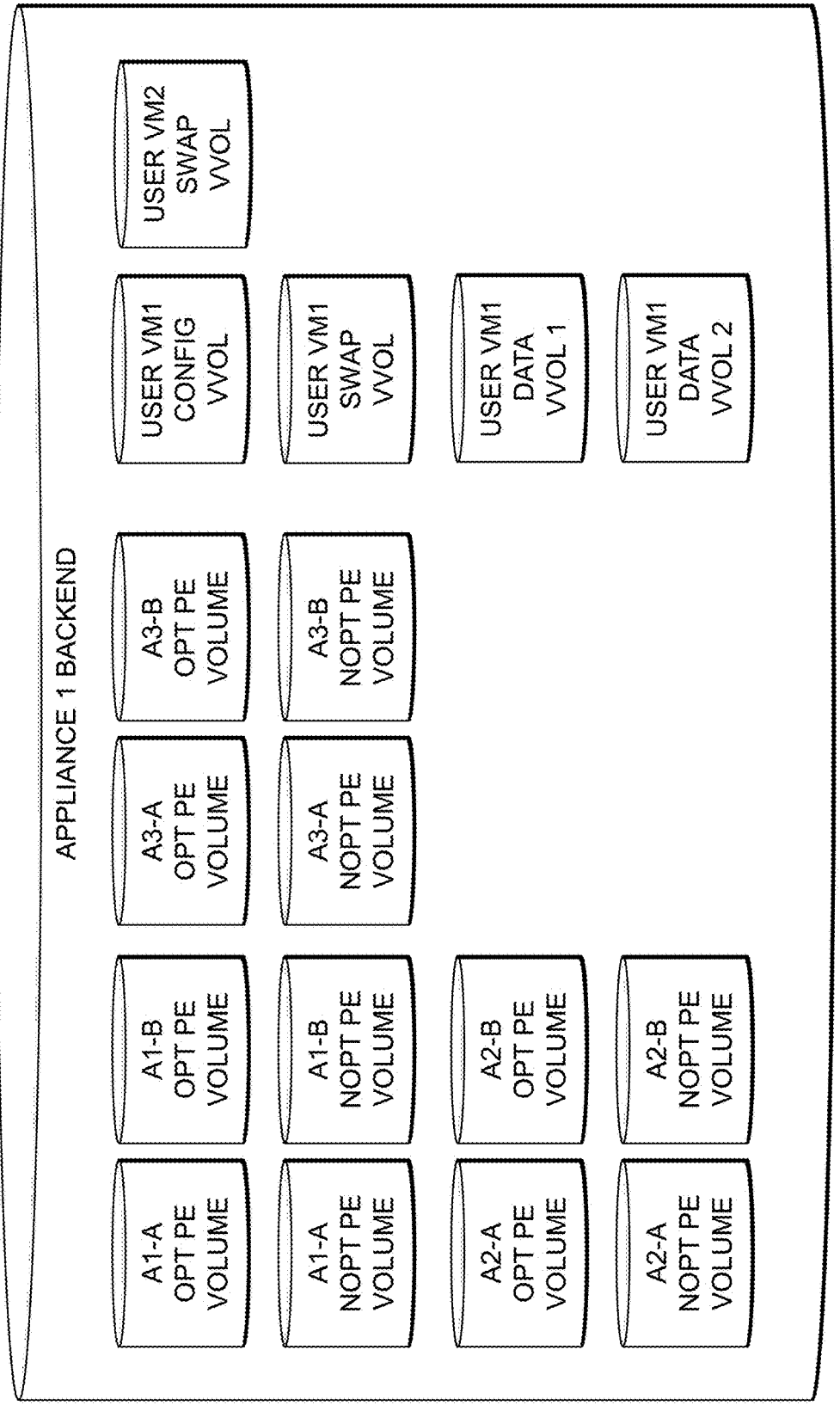
Figure 14H:
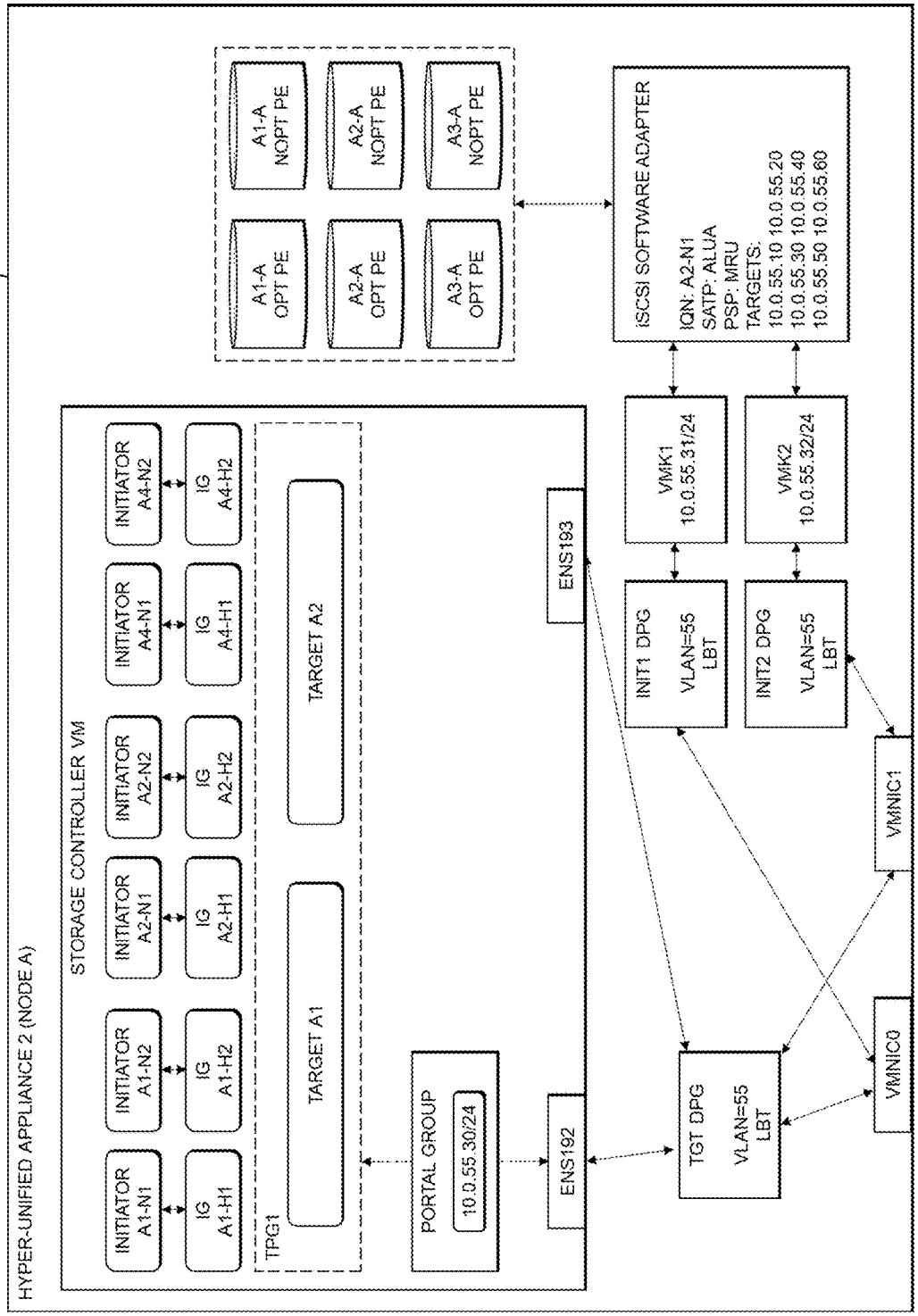
Figure 14I:
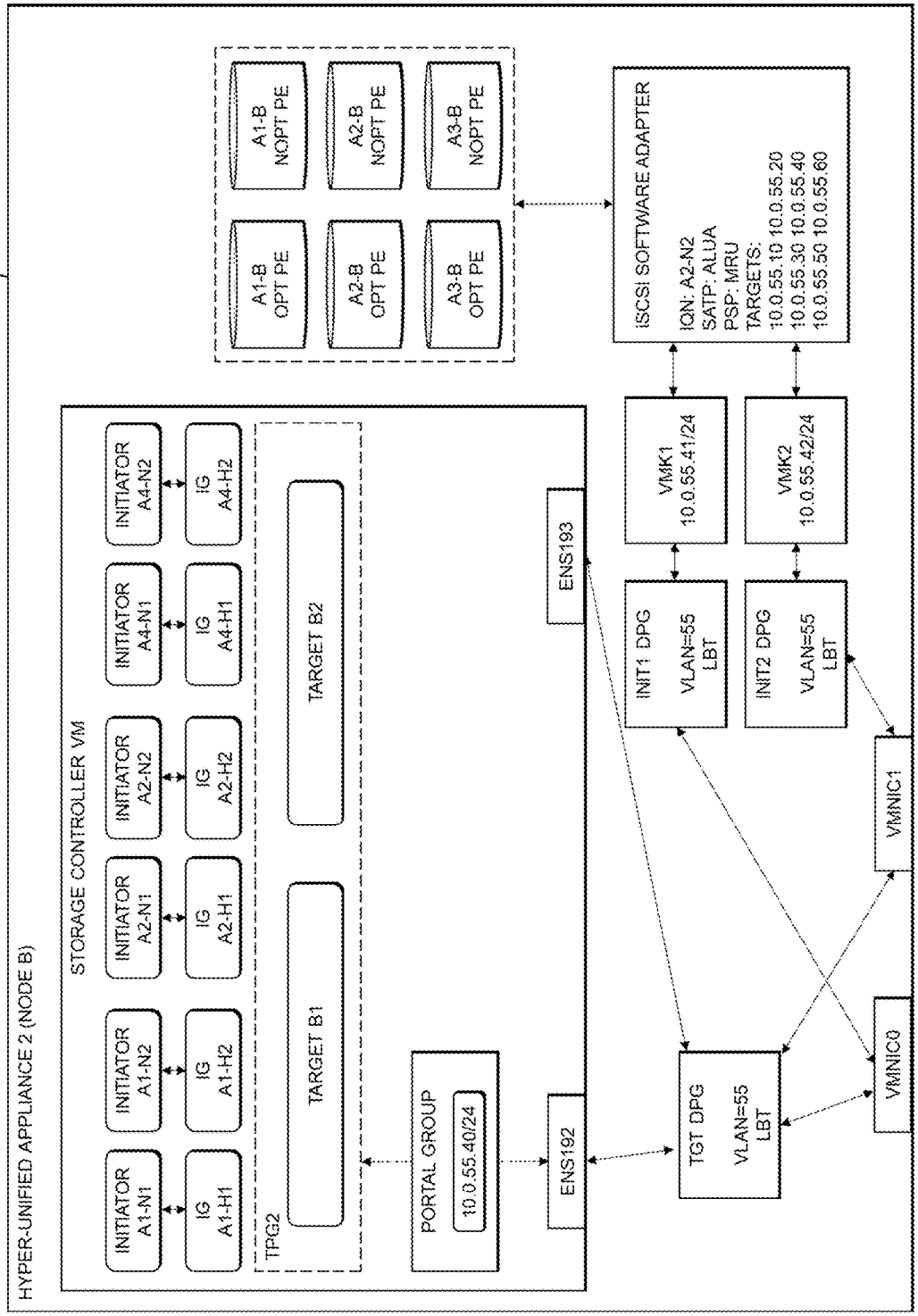
Figure 14J:
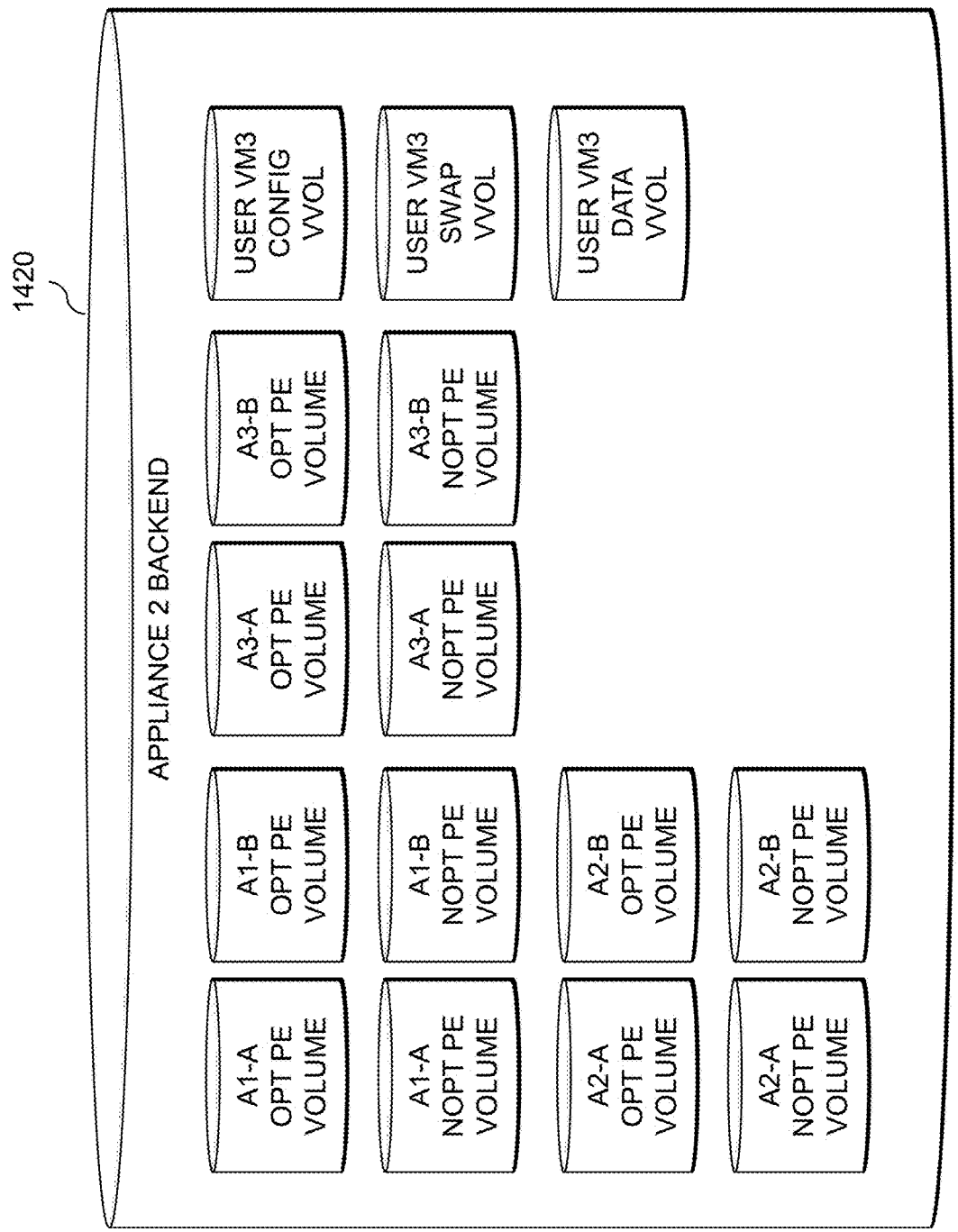
Figure 14K:
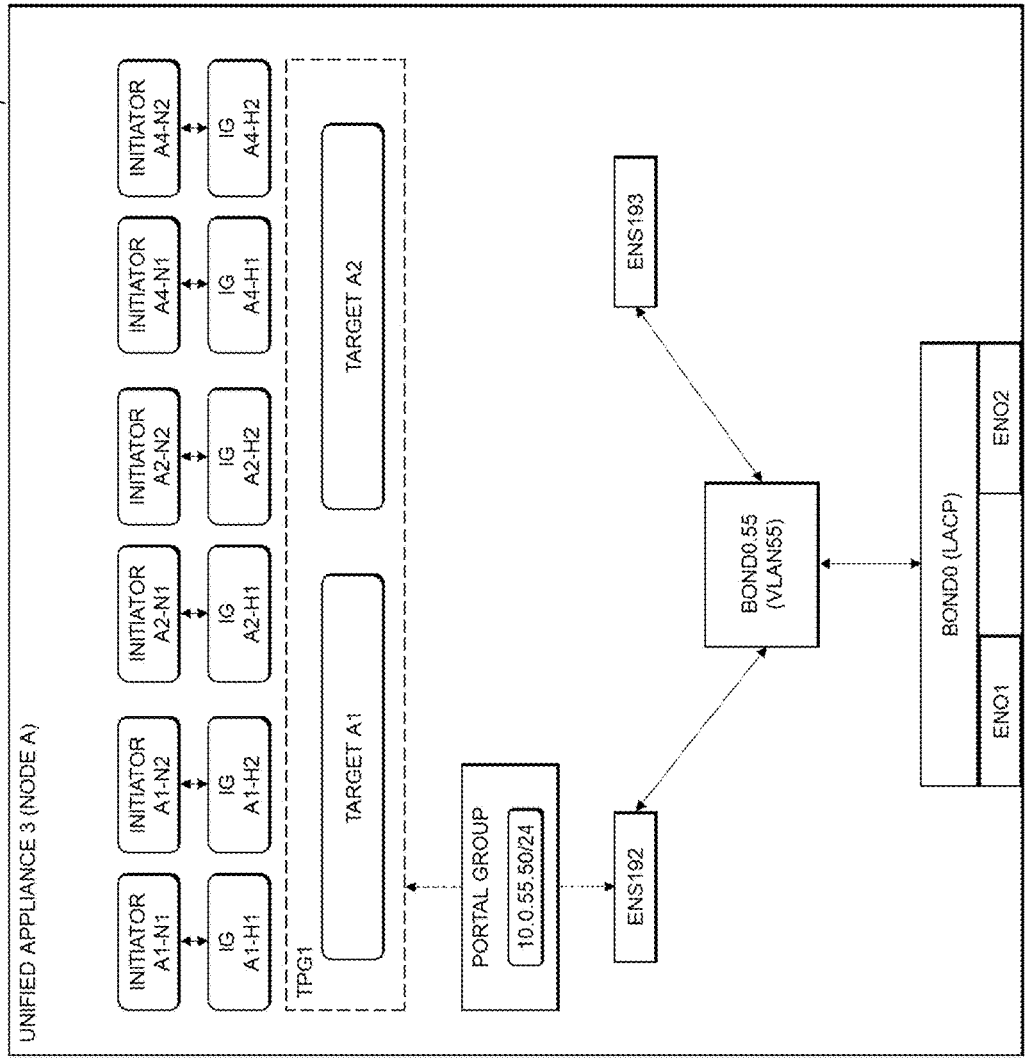
Figure 14L:
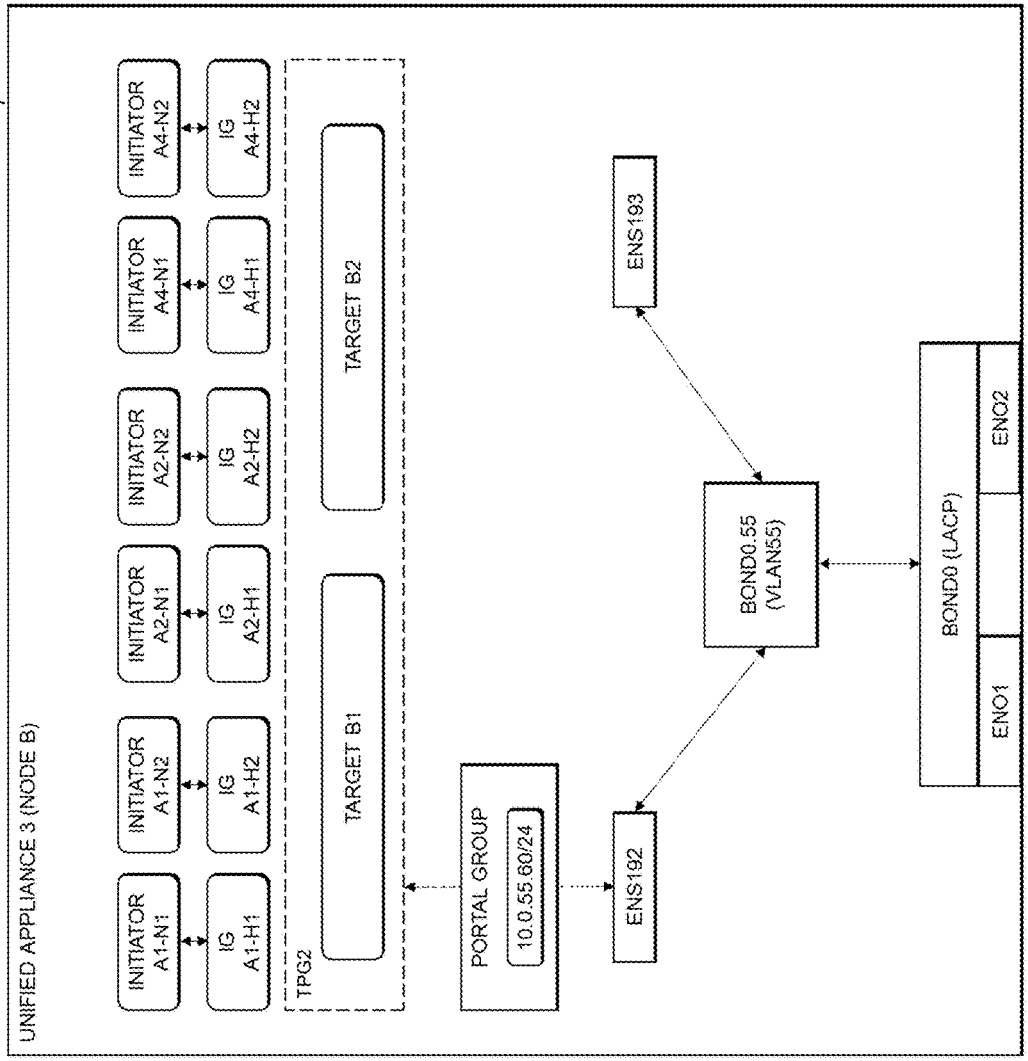
Figure 14M:
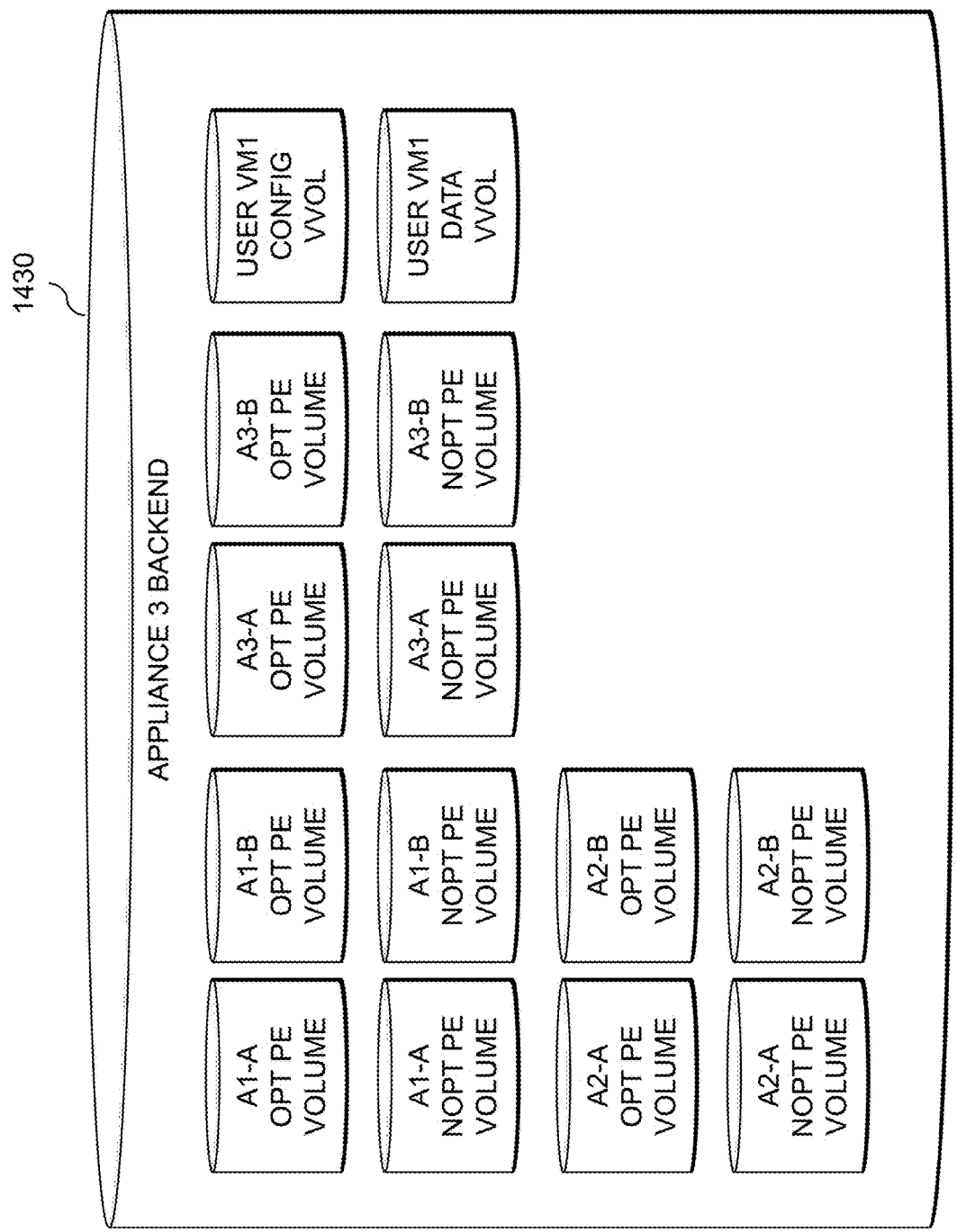
Figure 14N:
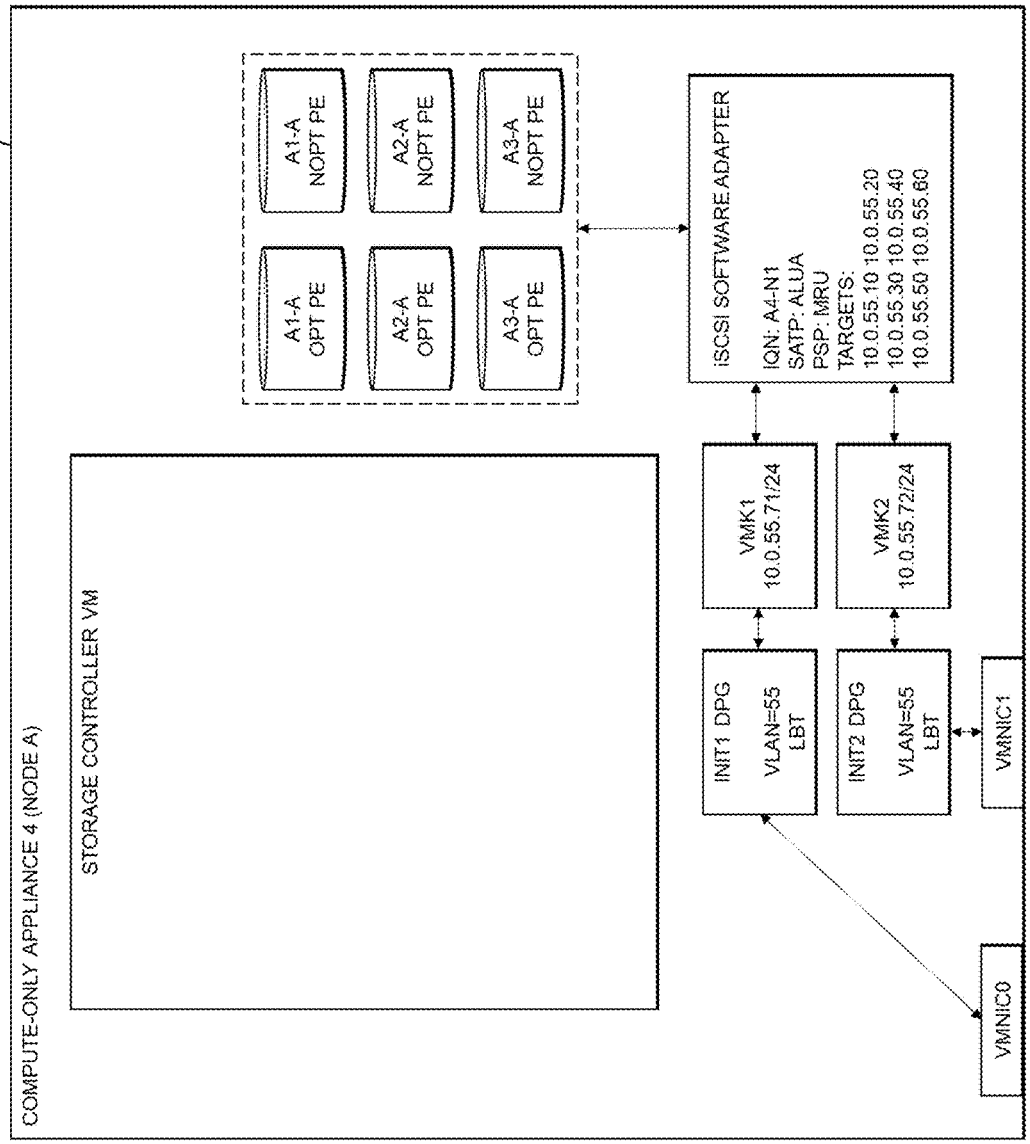
Figure 14O:
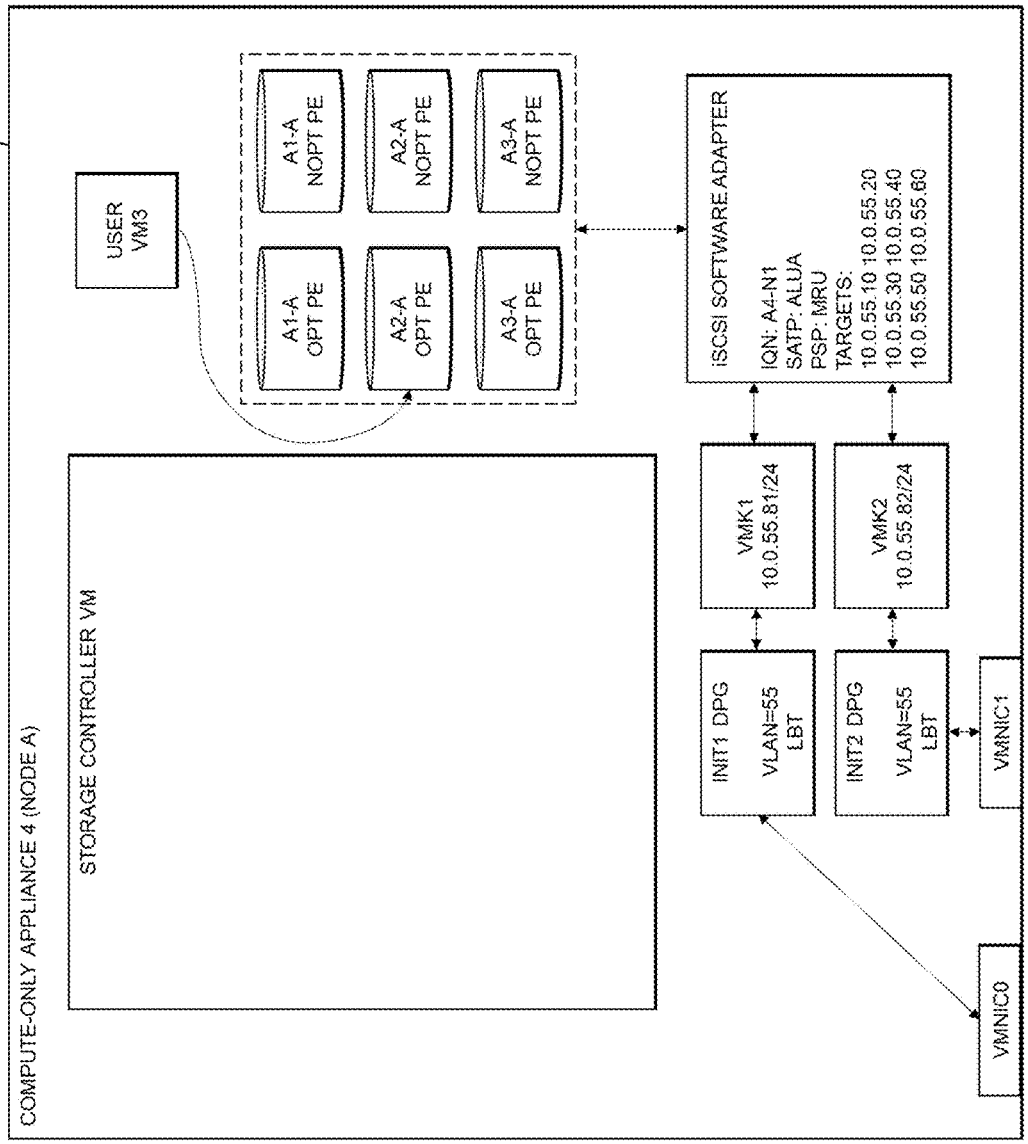

An example iSCSI storage network configuration for a heterogeneous cluster with HCI appliances, bare-metal appliances, and compute-only appliances is shown in FIGS. 14A-14O. FIG. 14A more particularly shows a first HCI appliance with nodes A and B, denoted 1401-A and 1401-B, and an associated backend 1410 (detailed views of these components are shown in FIGS. 14E-14G, respectively). FIG. 14B shows a second HCI appliance with nodes A and B, denoted 1402-A and 1402-B, respectively, and an associated backend 1420 (detailed views of these components are shown in FIGS. 14H-14J, respectively). FIG. 14C shows a third bare-metal appliance with nodes A and B, denoted 1403-A and 1403-B, respectively, and an associated backend 1430 (detailed views of these components are shown in FIGS. 14K-14M, respectively). FIG. 14D shows a fourth compute-only appliance with nodes A and B, denoted 1404-A and 1404-B, respectively (more detailed views of these components are shown in FIGS. 14N and 14O, respectively).

Each of the HCI appliance nodes has two targets (e.g., targets A1 and A2 in HCI appliance nodes 1401-A and 1402-A and bare-metal appliance node 1403-A, targets B1 and B2 in HCI appliance nodes 1401-B and 1402-B and bare-metal appliance node 1403-B), with only one target having an iSCSI in a portal group (e.g., targets A1 and B1). It should be noted that this may be viewed as a default minimal configuration, but as part of port scaling the nodes may create more targets and more iSCSI portals. All targets belong to one target group, with all targets of the "A" nodes (e.g., 1401-A, 1402-A, 1403-A) belonging to one target port group (TPG1) and all targets of the "B" nodes (e.g., 1401-B, 1402-B, 1403-B) belonging to another target port group (TPG2). Each of the HCI and bare-metal appliances has four protocol endpoints (PEs) for each appliance in the cluster (e.g., there are 4 PEs for a single-appliance cluster, 8 PEs for a two-appliance cluster, etc.). Each of the compute-only appliance nodes 1404-A and 1404-B has 2 PEs for each appliance in the cluster, one optimized and one non-optimized. Both PEs have the same paths which are configured asymmetrically. The optimized PE (denoted as OPT-PE in FIGS. 14A-14O) has optimized paths via the local TPG and non-optimized paths via the remote TPG. The non-optimized PE (denoted as NOPT-PE in FIGS. 14A-14O) has optimized paths via the remote TPG and non-optimized paths via the local TPG. A set of APIs (e.g., vStorage APIs for Storage Awareness (VASA)) are used to bind the local VVol to a local (optimized) PE to keep 110 local to the node. Generic ALUA SATP and MRU PSP may be used. There is one target data protection group (DPG), denoted as "TGT DPG" in FIGS. 14A-14O, and two initiator DPGs, denoted as "INIT1 DPG" and "INIT2 DPG" in FIGS. 14A-14O with the same VLAN configuration (e.g., VLAN=55 in FIGS. 14A-14O). Network port binding (NPB) is utilized, along with two iSCSI VMKs (denoted as VMK1 and VMK2 in FIGS. 14A-14O). The iSCSI software adapter on each node is configured with all target IPs in a dynamic list (e.g., 10.0.55.10, 10.0.55.20, . . . , 10.0.55.60). In the bare-metal appliance nodes 1403-A and 1403-B, the VLANs are configured using virtual Linux devices inside CoreOS. Link Aggregation Control Protocol (LACP) bonding is used on top of the first two uplinks. FIGS. 14A-14O also shows initiators and associated initiator groups (IGs).

Cluster-wide storage network reconfiguration approaches will now be discussed with reference to the storage cluster shown in FIGS. 14A-14O. In one approach, referred to as a "naïve" reconfiguration approach, non-coordinated independent changes are utilized. The naïve reconfiguration approach proceeds as follows. A master appliance identifies what needs to be changed, and sends commands to all slave appliances. Each slave appliance receives the command and makes the changes (e.g., via an associated adapter on the HCI appliance nodes and bare-metal appliance nodes). Such changes are not coordinated among appliances, and the changes done via the associated adapters are also not coordinated.

There are various issues with the naïve reconfiguration approach. For example, the data path depends on the control path and specifically how quickly the reconfiguration may be completed. Because changes are not coordinated, it's possible that all iSCSI portals on the target side have already been changed, but portals on initiator side are still old and all paths to VVols via all PEs will become dead after detecting the failure. Resume of I/O is going to depend on when the initiator configuration is updated and new portals are configured. The same is true if all initiators have been changed first, and this is especially critical for compute-only nodes 1404-A and 1404-B which are going to have only remote PE's and all I/O will be remote on those nodes.

Another issue with the naïve reconfiguration approach relates to changes of storage VLAN and subnet. As noted above, the storage cluster of FIGS. 14A-14O has one target DPG and 2 initiator DPGs created on the virtual distributed switch. All these DPGs have the same VLAN ID configured. With the naïve reconfiguration approach, changes to the configuration of those DPGs are not coordinated and hence it's possible that all initiators are switched to a different VLAN before targets. This is going to mean that connectivity via all PE's will be lost for some period of time. This issue is exacerbated in mixed clusters.

Also, there are issues related to consistency of changing the storage VLAN and subnet. Because the VLAN is changed on the virtual distributed switch layer for all hosts and iSCSI portal IPs are changed on a per host basis, it's possible that the LAN gets changed first potentially causing issues with duplicate IPs in a new VLAN before subnet is changed. Things become even worse in mixed clusters where the HCI appliance nodes 1401-A, 1401-B, 1402-A and 1402-B have storage VLANs configured on each DPG, but the bare-metal appliance nodes 1403-A and 1403-B have the VLAN configured inside a CVM on a virtual VLAN interface on each node.

Even for the simplest case of changing only initiator IPs within the same subnet, the naïve reconfiguration approach is going to cause high latency spikes if those IPs belong to active paths.

Another approach, referred to as an appliance-by-appliance reconfiguration approach, reconfigures one appliance at a time. While the appliance-by-appliance reconfiguration approach seems like a logical approach, in practice it has more issues than the naïve reconfiguration approach. As the appliances are reconfigured in some order (e.g., sequentially), all remote I/O will potentially be stopped for an even longer period of time (e.g., such as with compute-only appliance nodes 1404-A and 1404-B as well as bare-metal appliance nodes 1403-A and 1403-B in the mixed cluster of FIGS. 14A-14O). The master appliance which does the orchestration of cluster reconfiguration may fail during the process (e.g., node failure, container failure, network partitioning, etc.) As a result, some appliances will have the new configuration and other appliances will have the old one. The reconfiguration process may continue only after master re-election which also takes time and thus increases down time. Further, because VLANs are handled at the virtual distributed switch layer in some embodiments, it may not be possible to implement an appliance-by-appliance reconfiguration approach with the same three iSCSI DPGs used as described above.

A further approach, referred to as an A-then-B reconfiguration approach, relies on the fact that each appliance has two nodes A and B, and that storage is visible via both of the nodes. In the A-then-B reconfiguration approach, the master appliance identifies what needs to be changed, and sends commands to all slave appliances to only change configuration on "A" nodes. Each slave appliance receives the command and makes the changes using associated adapters. The master appliance then sends commands to all slave appliances to only change configuration on "B" nodes. Each slave appliance receives the command and makes the changes using associated adapters. The main benefit of this approach is that storage remains available via the old or the new configuration during the reconfiguration process. This means that VMs can have access to the VVols on remote nodes. The A-then-B reconfiguration approach, however, has the same issues with respect to VLAN changes as described above with respect to the naïve reconfiguration approach. Another issue with the A-then-B reconfiguration approach is that it assumes that all nodes of all appliances in the cluster must be up and healthy for storage network reconfiguration to happen. In some cases, this is too strict an assumption because the storage cluster may be very large and nodes may be down for various reasons (e.g., power supply (PSU) failure, SSD failure, etc.). It is not desirable to fully block the ability to reconfigure the cluster if a user is awaiting repair or recovery of a single or small subset of the nodes therein.

As discussed above, some embodiments utilize a shadow network reconfiguration approach, where the existing storage network is not modified but rather an additional storage network is created alongside the existing storage network for the entire storage cluster. This means that I/O continues to run via the original network while the shadow network is initially in standby mode. Once the shadow network is added and it is ensured that both the existing and shadow storage networks are operational, switchover is performed from the old or existing storage network to the new or shadow storage network in a non-disruptive manner on all nodes of the cluster. Once all nodes have switched to the new or shadow network, the old or existing network configuration is removed from the nodes and the IPs are returned to the user.

The shadow network reconfiguration approach has numerous benefits relative to the naïve, appliance-by-appliance and A-then-B reconfiguration approaches. For example, while the shadow storage network is created on the storage cluster, the existing storage network is not touched and thus I/O is not affected. Because of this, creation of the shadow storage network does not have to be very fast. The switchover from the old or existing storage network to the new or shadow storage network on each particular node, however, may be performed very quickly without producing any noticeable I/O delays. Also, the cluster-wide switchover does not have to be fast, and nodes may be switched in parallel or sequentially without affecting the I/O. Further, the shadow network reconfiguration approach generally does not need extra IP addresses to work, as both old and new IP addresses may be used during the reconfiguration (although there are some exceptions to this described in further detail below). The shadow network reconfiguration approach also enables correct implementation of changes to the subnet and VLAN, making sure that the new VLAN never sees old IP addresses and vice versa. The shadow network reconfiguration approach, however, has increased complexity relative to the naïve, appliance-by-appliance and A-then-B reconfiguration approaches.

Figure 18:
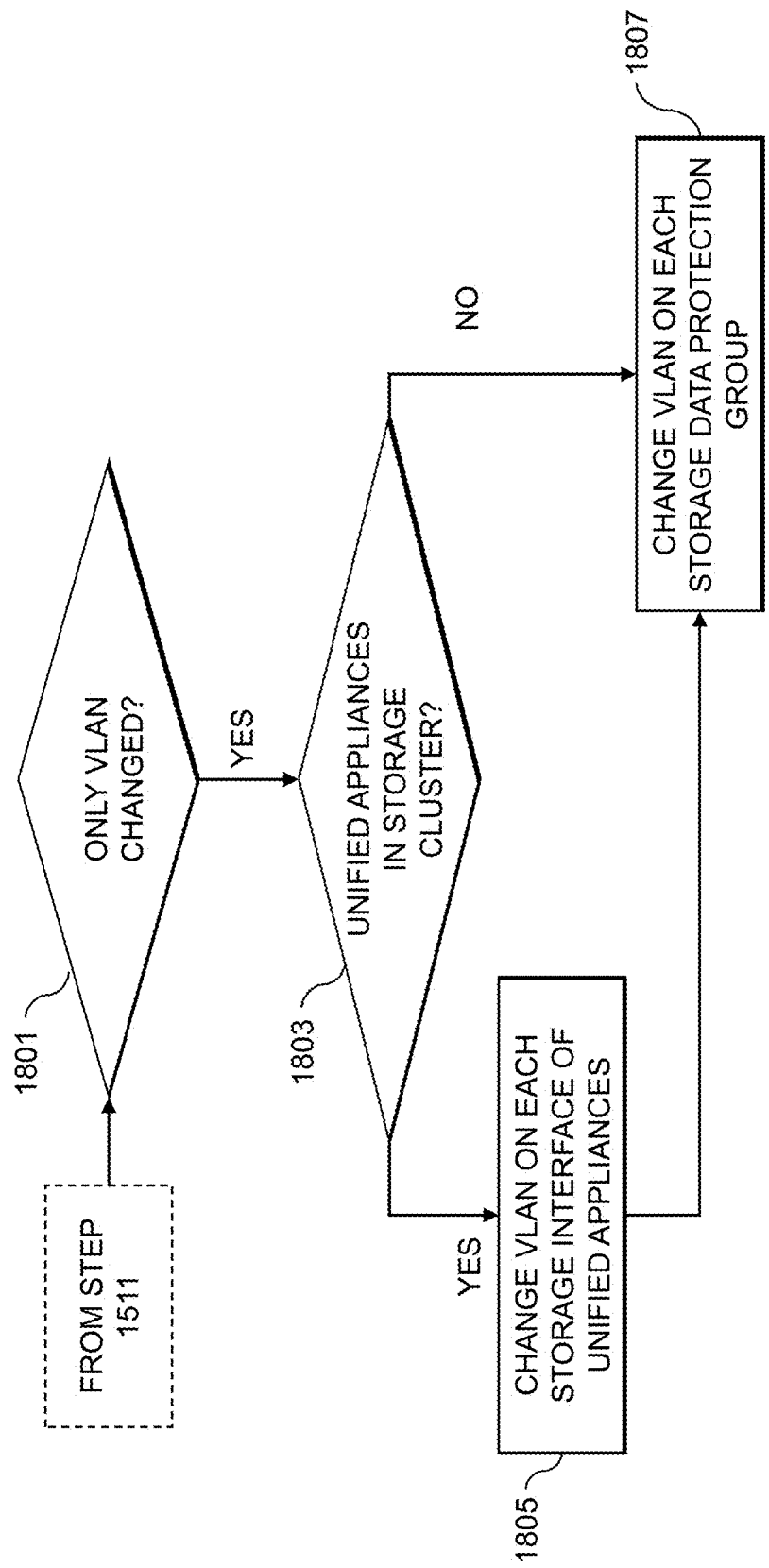
FIG. 18 is a flow diagram of an exemplary process for changing a virtual local area network used in a storage network in an illustrative embodiment.
Figure 19:
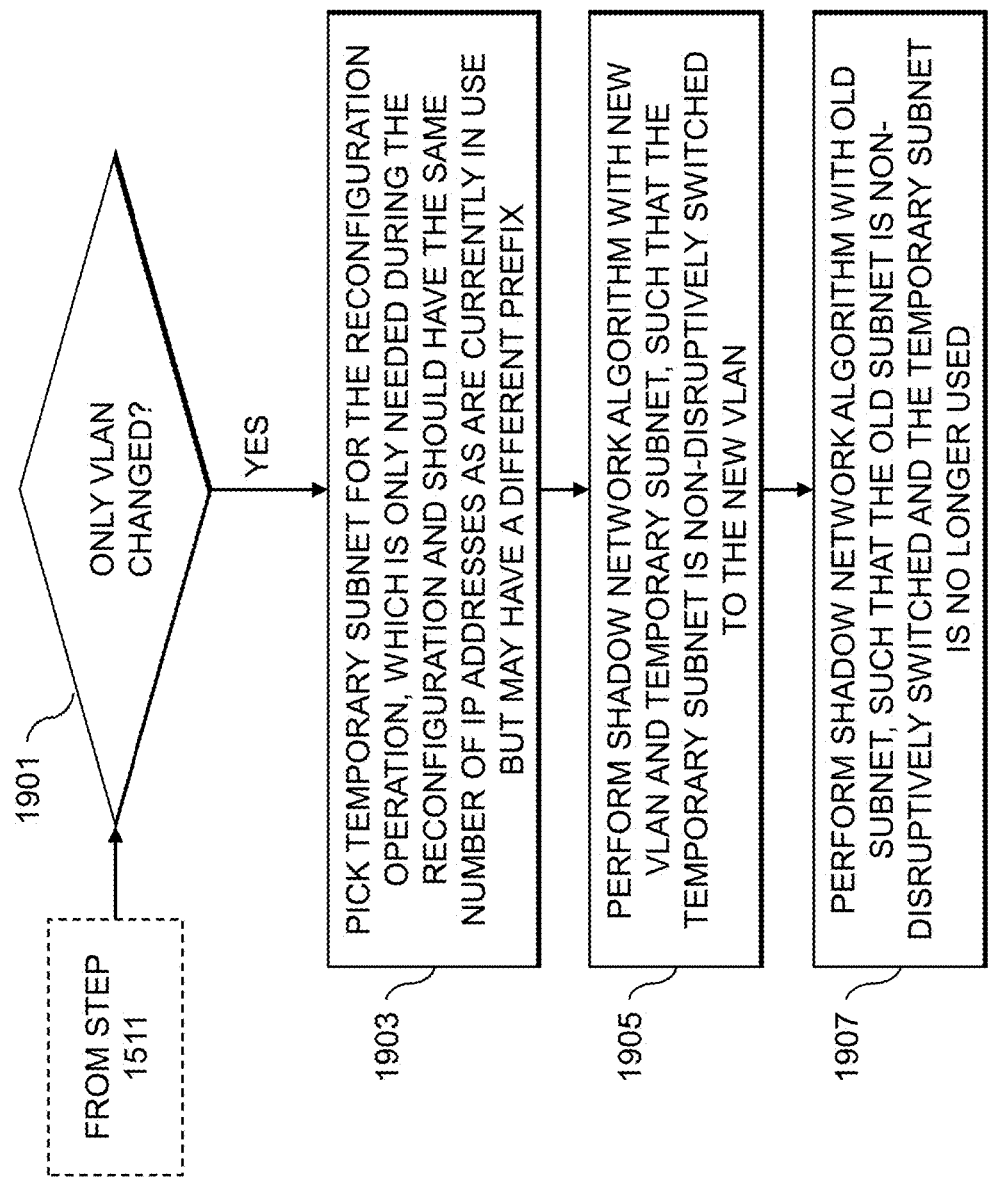
FIG. 19 is a flow diagram of another exemplary process for changing a virtual local area network used in a storage network in an illustrative embodiment.

Algorithms for implementing the shadow network reconfiguration approach will now be described with respect to FIGS. 15A-20H. FIGS. 15A-15E show a general flow for determining whether to apply a general shadow network reconfiguration algorithm (illustrated in FIGS. 20A-20H) or whether an "edge" case applies, in which sub-algorithms shown in one or more of FIGS. 16-19 are utilized. The edge cases cover situations in which the general shadow network reconfiguration algorithm needs to be altered, such as where the storage network reconfiguration includes: changing a storage network gateway only (FIG. 16); changing a storage network prefix only (FIG. 17); and changing a storage VLAN only (FIG. 18 or FIG. 19). These edge cases utilize various sub-algorithms because the general shadow network algorithms (FIGS. 20A-20H) assumes that there is a second active storage network (e.g., the shadow network) available while the first (e.g., existing storage network) storage network is still in use. These edge cases, however, cover scenarios where the IP addresses are not changed.

Figure 15A:
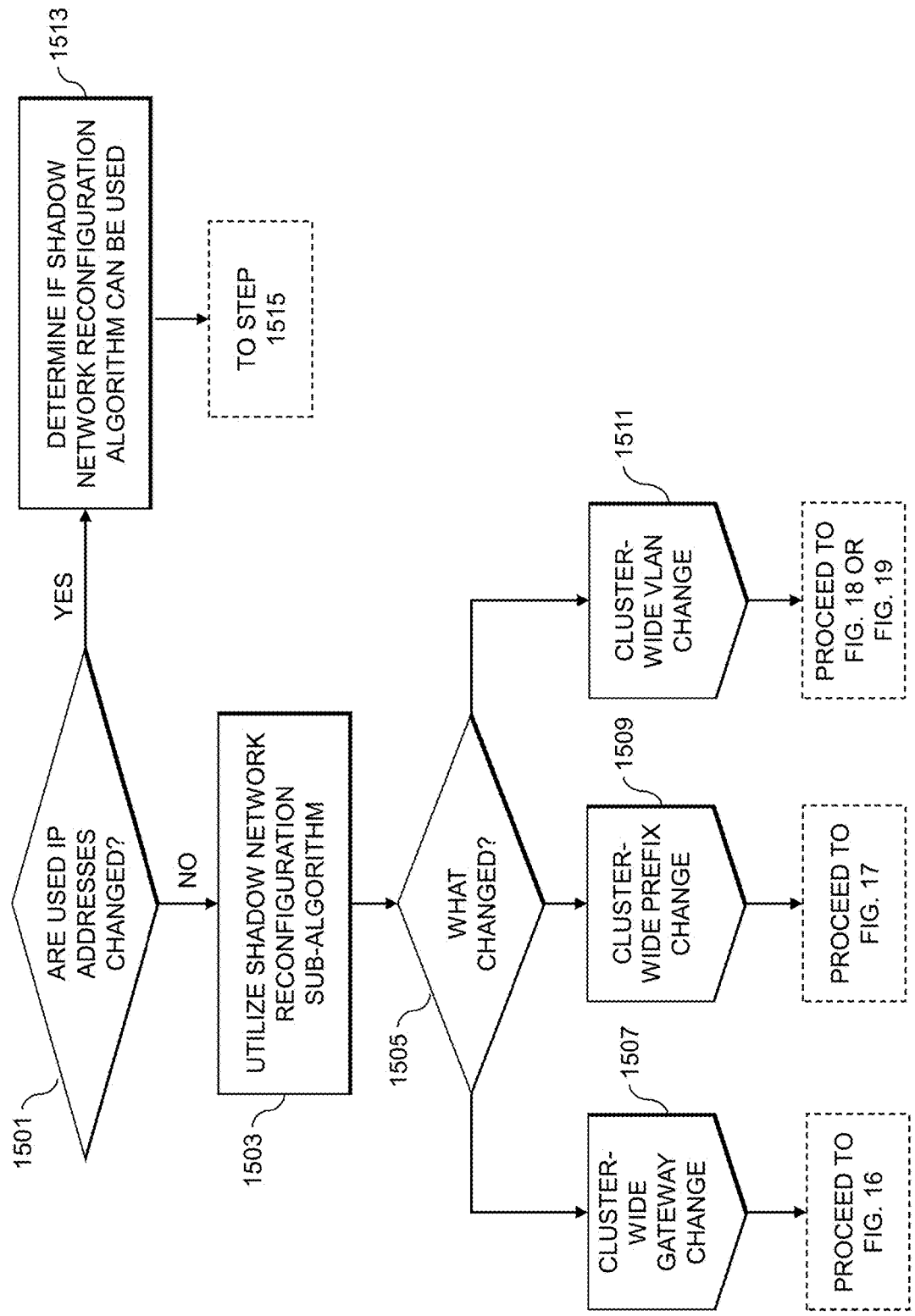
FIGS. 15A-15E are a flow diagram of an exemplary process for determining whether to apply a shadow network reconfiguration to a storage network in an illustrative embodiment.

The process flow of FIGS. 15A-15E begins in FIG. 15A with step 1501, where a determination is made as to whether IP addresses used in the existing storage network are changed in a proposed storage network reconfiguration. If the result of the step 1501 determination is no, the process flow proceeds to step 1503 where a shadow network reconfiguration sub-algorithm is utilized. In step 1505, a determination is made as to what is changed in the proposed storage network reconfiguration. If the proposed storage network reconfiguration includes a cluster-wide gateway change 1507, processing proceeds to the FIG. 16 flow. If the proposed storage network reconfiguration includes a cluster-wide prefix change 1509, processing proceeds to the FIG. 17 flow. If the proposed storage network reconfiguration includes a cluster-wide VLAN change 1511, processing proceeds to the FIG. 18 or FIG. 19 flow.

Figure 15B:
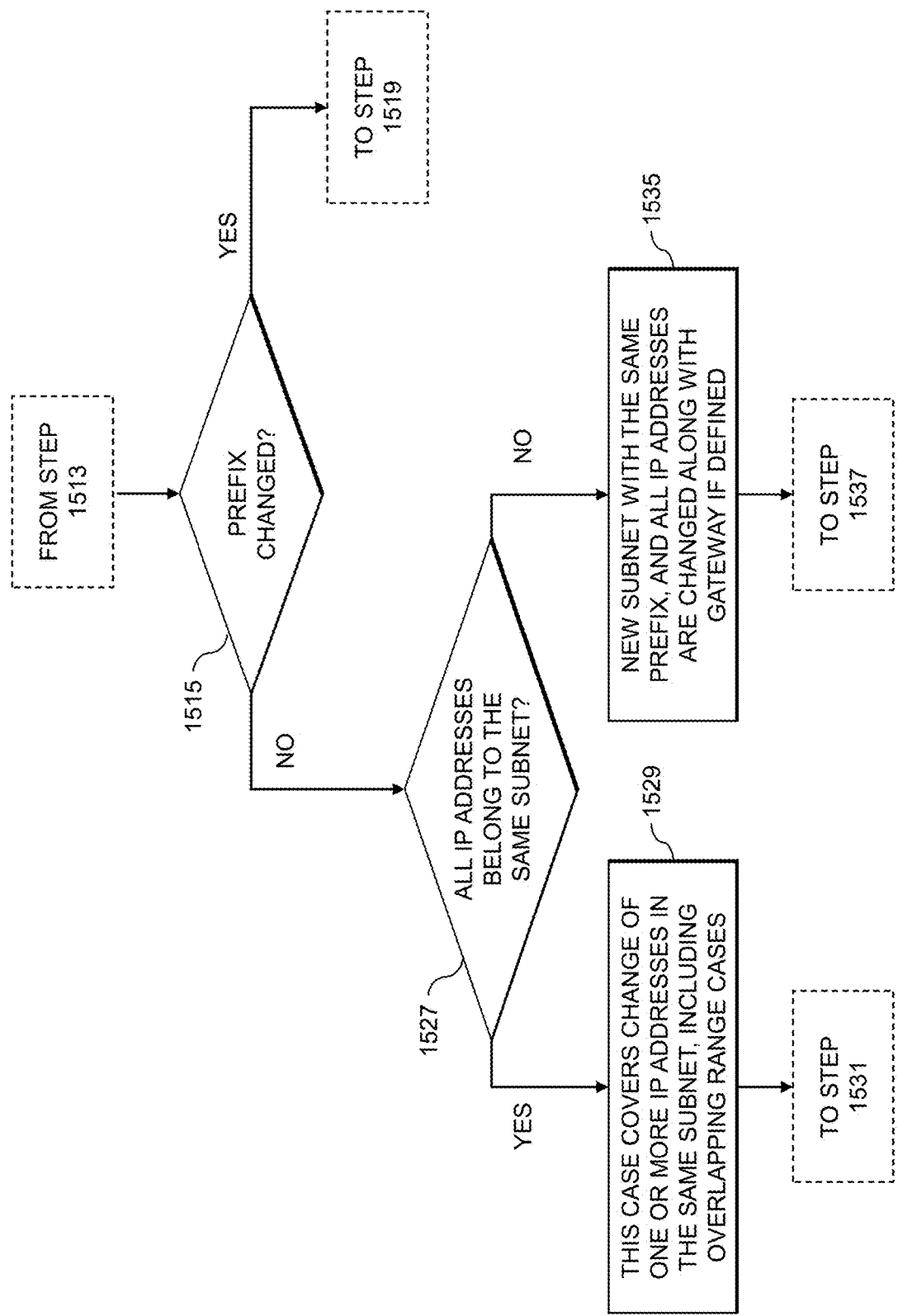
Figure 15C:
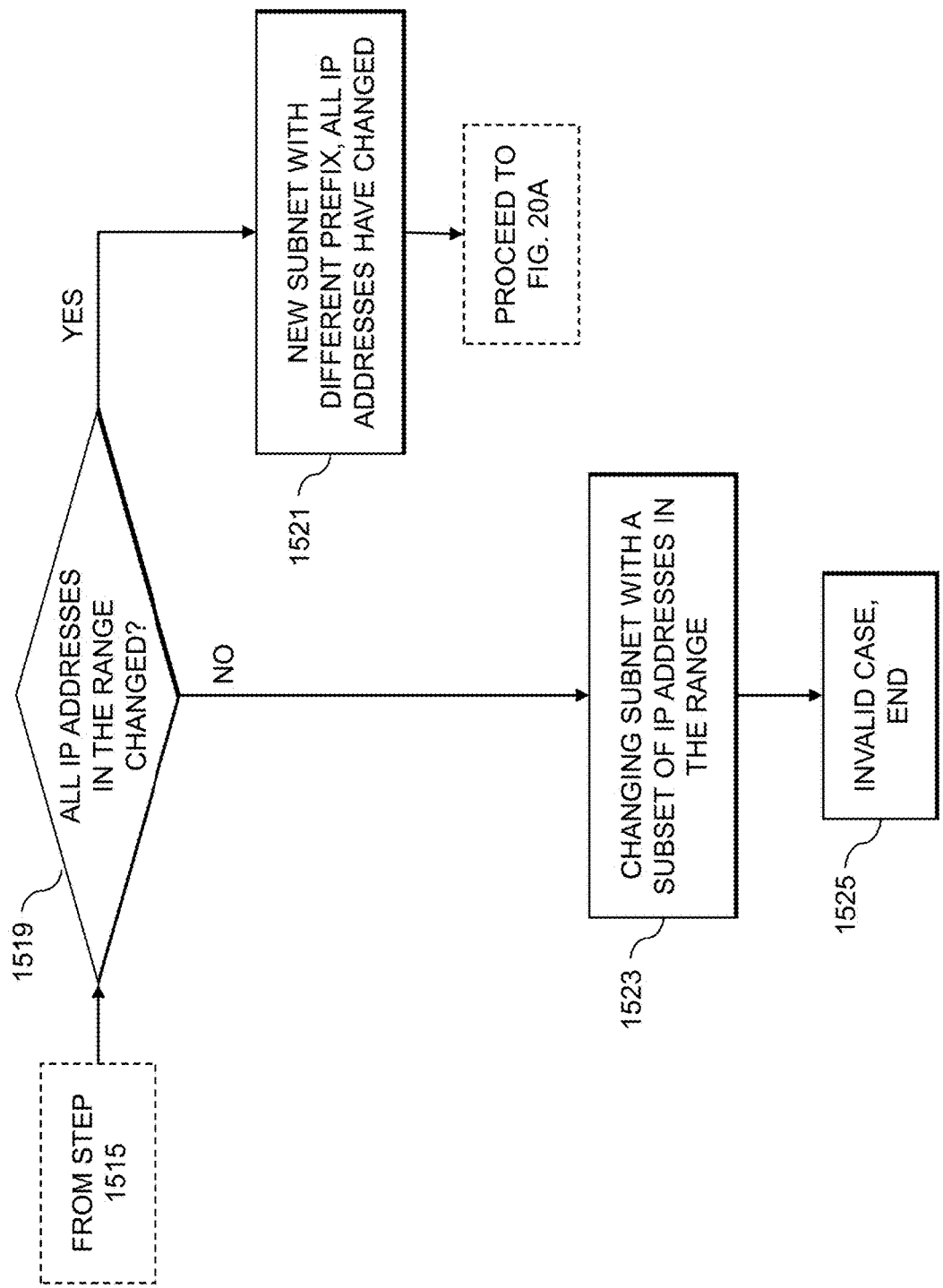
Figure 15D:
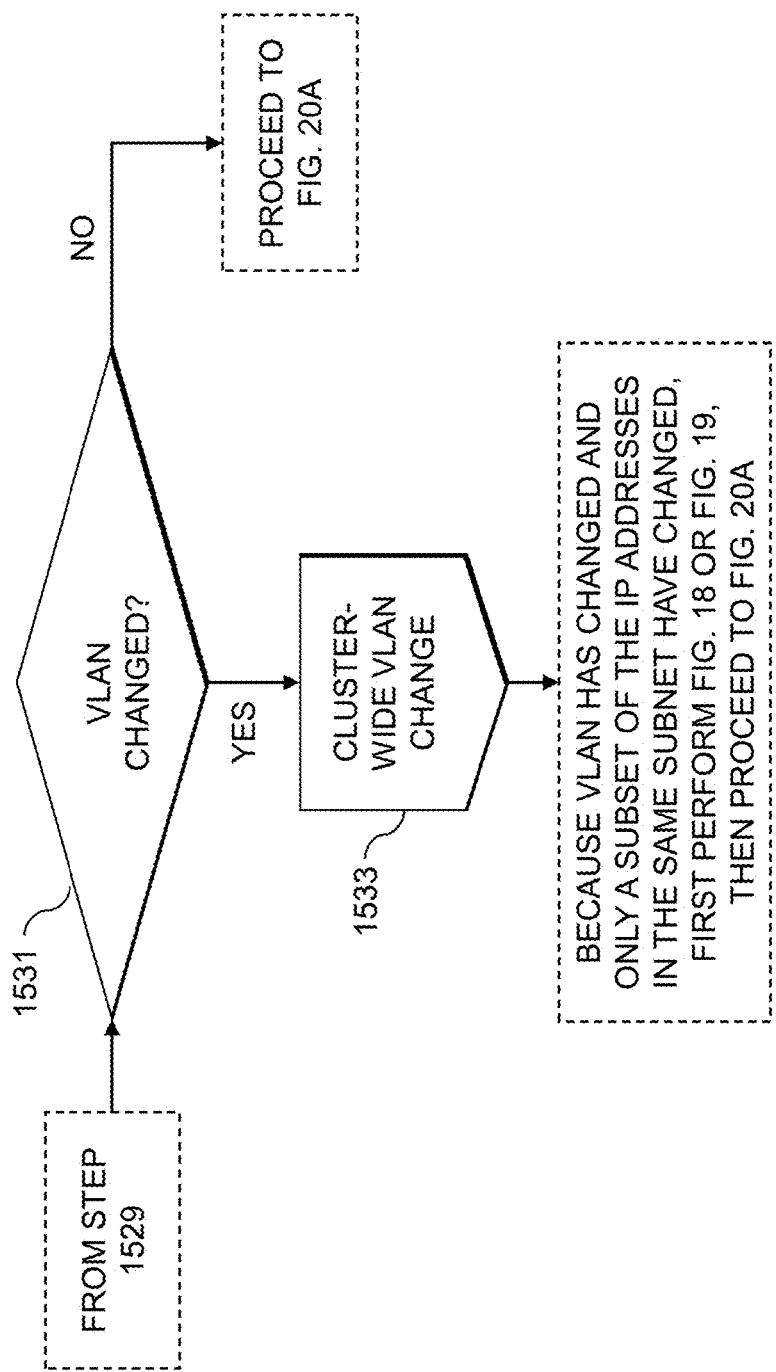
Figure 15E:
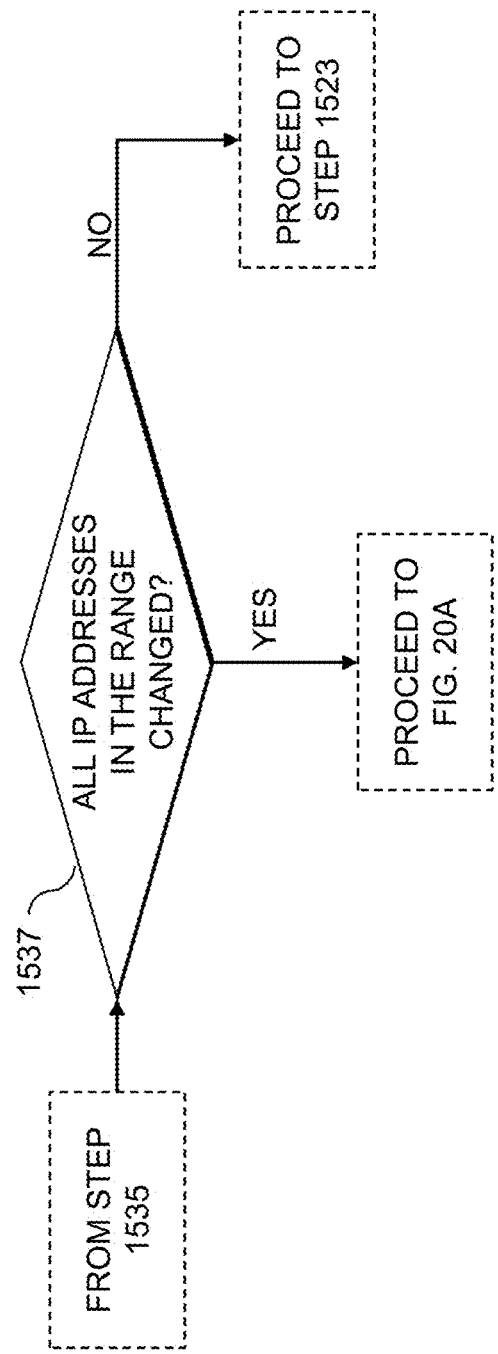

If the result of the step 1501 determination is yes, processing proceeds to step 1513 to determine if the shadow network reconfiguration algorithm (FIGS. 20A-20H) can be used for the proposed storage network reconfiguration. As shown in FIG. 15B, a determination is made in step 1515 as to whether a storage network prefix has changed. If the result of the step 1515 determination is yes, processing proceeds to step 1519 shown in FIG. 15C. In step 1519, a determination is made as to whether all IP addresses in the prefix range have changed. If the result of the step 1519 determination is yes, processing proceeds to step 1521 where a new subnet with a different prefix is used and all IP addresses have changed. This case is supported by the shadow network reconfiguration algorithm, and processing proceeds to FIG. 20A. If the result of the step 1519 determination is no, processing proceeds to step 1523 where it is determined that there is a change of a subnet with a subset of the IP addresses in the prefix range. This is considered an invalid case not supported by the shadow network reconfiguration algorithm, and the processing flow ends in step 1525.

Returning to FIG. 15B, if the result of the step 1515 determination is no, a determination is made in step 1527 as to whether all IP addresses belong to the same subnet. If the result of the step 1527 determination is yes, processing proceeds to step 1529 where this case covers a change of one or more IP addresses in the same subnet, including overlapping range cases. Processing then proceeds to step 1531 shown in FIG. 15D. In step 1531, a determination is made as to whether the VLAN changed. If the result of the step 1531 determination is yes, it is determined that the proposed storage network reconfiguration includes a cluster-wide VLAN change 1533. Because the VLAN has changed and only a subset of the IP addresses in the same subnet have changed, the FIG. 18 or FIG. 19 flow is first performed, followed by the shadow network reconfiguration algorithm in FIG. 20A. If the result of the step 1531 determination is no, processing also proceeds to the shadow network reconfiguration algorithm in FIG. 20A.

Returning again to FIG. 15B, if the result of the step 1527 determination is no, processing proceeds to step 1535 where this case covers a new subnet with the same prefix, where all IP addresses are changed along with a gateway (if defined). Processing then proceeds to step 1537 shown in FIG. 15E. In step 1537, a determination is made as to whether all IP addresses in the prefix range have changed. If the result of the step 1537 determination is yes, processing proceeds to the shadow network reconfiguration algorithm in FIG. 20A. If the result of the step 1537 determination is no, processing proceeds to step 1523 shown in FIG. 15C.

Figure 16:
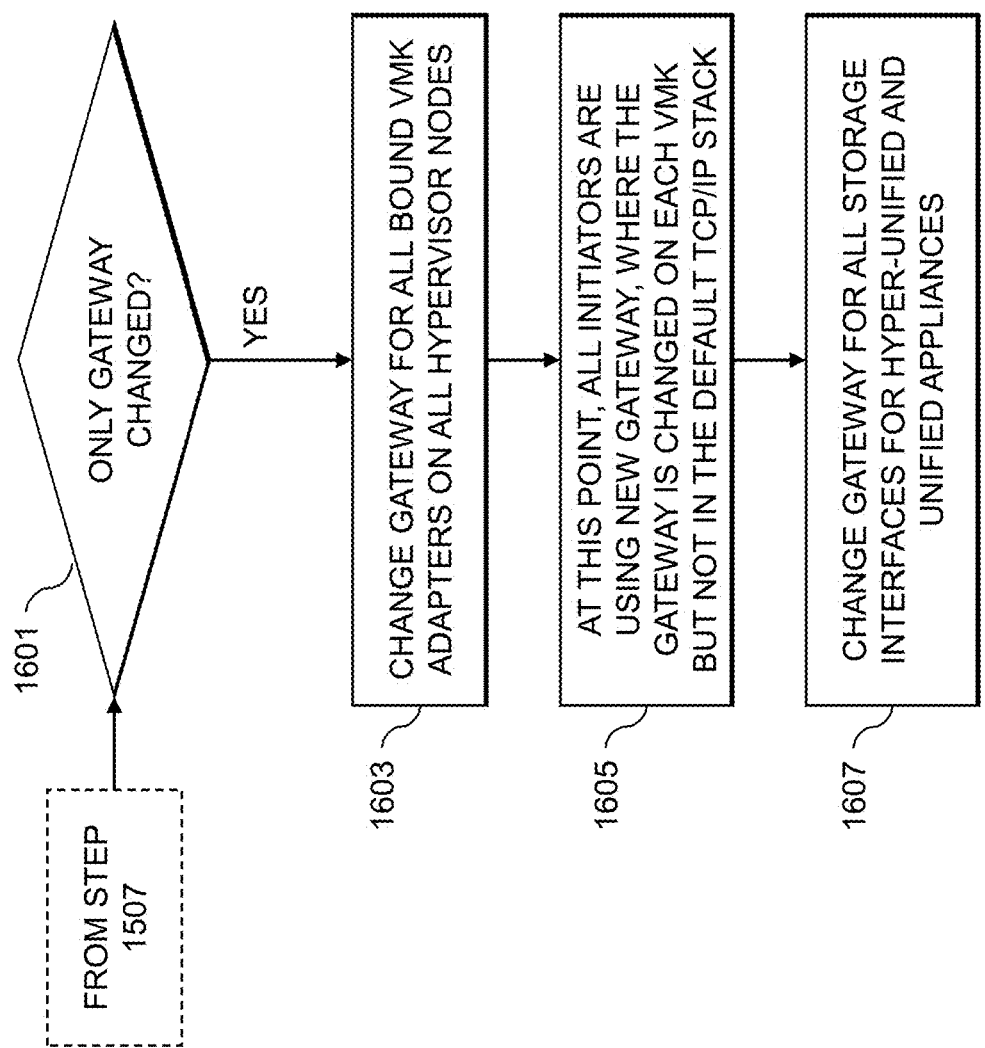
FIG. 16 is a flow diagram of an exemplary process for changing a storage network gateway in an illustrative embodiment.

FIG. 16, as noted above, covers the edge case where only a gateway has changed. An adapter (e.g., a VMware adapter) is used to change the storage gateway on each bound VMK. The storage gateway is not changed in the network stack. An adapter is used to change the storage gateway and persist such changes in a routing table for all storage interfaces. Technically, the storage gateway may be changed in any order across different nodes (e.g., the HCI appliance nodes 1401-A, 1401-B, 1402-A and 1402-B, the bare-metal appliance nodes 1403-A and 1403-B, and the compute-only appliance nodes 1404-A and 1404-B). FIG. 16 illustrates one possible flow or order, though other orders may be utilized as desired. The FIG. 16 process flow also assumes that the new gateway has passed any validation checks and is a valid gateway.

The FIG. 16 process flow begins with step 1601, where a determination is made that only a gateway has changed in the proposed storage network reconfiguration (e.g., the FIG. 16 process flow is entered from step 1507 described above). In step 1603, the gateway is changed for all bound VMK adapters on all hypervisor (e.g., ESXi) nodes. In step 1605, all initiators are using the new gateway, but the gateway is not changed in the default TCP/IP stack but rather is changed on each VMK. In step 1607, the gateway is changed for all storage interfaces (e.g., on CoreOS) for the HCI appliances (e.g., 1401-A, 1401-B, 1402-A and 1402-B) and bare-metal appliances (e.g., 1403-A and 1403-B) in the case of a mixed or heterogeneous cluster.

Figure 17:
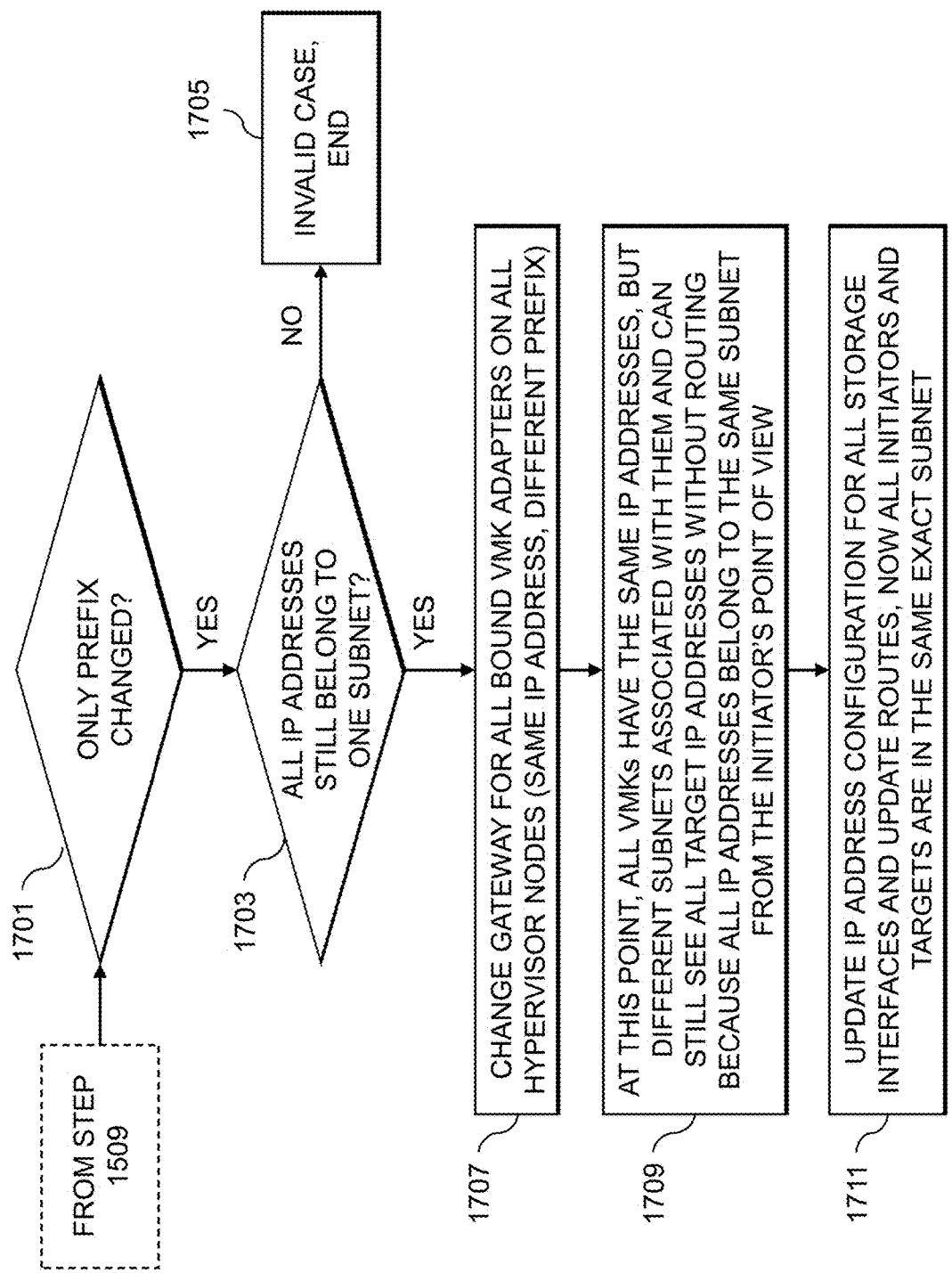
FIG. 17 is a flow diagram of an exemplary process for changing a storage network prefix in an illustrative embodiment.

FIG. 17, as noted above, covers the edge case where only a prefix has changed. When changing a prefix to a bigger one (e.g., from 24 to 25), all the old IP addresses are validated to determine if they still belong to one storage subnet. Once this is verified, it is safe to change the prefix on all nodes in any order. Routing will still treat all IP addresses as being on the same subnet on hosts with the new and old prefix. When changing the subnet to a smaller prefix (e.g., from 24 to 23), all IP addresses by the definition will be in one storage subnet. On hosts with the new prefix, all hosts can still be reached via the local subnet without routing. The same should be true for hosts with the old prefix. For this edge case, it does not matter which IP addresses are not part of the storage range. Gateway validation is performed to ensure that the gateway is reachable via both prefixes. If both the gateway and the prefix are changed, the new gateway should only be visible via new prefix. The prefix is changed on each bound VMK (e.g., ESXi) and on each storage interface and in the corresponding routing table (e.g., CoreOS).

The FIG. 17 process flow begins with step 1701, where a determination is made that only a prefix has changed in the proposed storage network reconfiguration (e.g., the FIG. 17 process flow is entered from step 1509 described above). In step 1703, a determination is made as to whether all IP addresses still belong to one subnet. If the result of the step 1703 determination is no, this is considered an invalid case and the process flow ends in step 1705. If the result of the step 1703 determination is yes, the process flow proceeds to step 1707 where the gateway is changed for all bound VMK adapters on all hypervisor (e.g., ESXi) nodes (e.g., same IP address, different prefix). In step 1709, all VMKs have the same IP addresses, but different subnets associated with them and can still see all target IP addresses without routing because all IP addresses belong to the same subnet from the initiator's point of view. In step 1711, the IP address configuration is updated for all storage interfaces and routes are updated, such that all initiators and targets are in the same exact subnet.

FIGS. 18 and 19, as noted above, cover the edge case where only the VLAN has changed in the proposed storage network reconfiguration. FIG. 18 provides a first approach, referred to as a "best effort" approach. FIG. 19 provides a second approach, referred to as a "temporary network" approach. The VLAN is changed on each storage DPG on the HCI appliances (e.g., 1401-A, 1401-B, 1402-A, and 1402-B) and on each storage interface of the bare-metal appliances (e.g., 1403-A and 1403-B) in a mixed storage cluster. It should be noted that only the default storage network should be affected by the VLAN change. There is no way to guarantee consistency of VLAN changes in this case, because the shadow network approach is not directly applicable.

One option is to change the VLAN on each node and try to orchestrate it so that all changes are executed in parallel in the best effort approach of FIG. 18. The FIG. 18 process flow begins with step 1801, where a determination is made that only the VLAN has changed in the proposed storage network reconfiguration (e.g., the FIG. 18 process flow is entered from step 1511 described above). In step 1803, a determination is made as to whether there are bare-metal appliances (e.g., 1403-A and 1403-B) in the storage cluster. If the result of the step 1803 determination is yes, the process flow proceeds to step 1805 and the VLAN is changed on each storage interface of the bare-metal appliances. Following step 1805, or if the result of the step 1803 determination is no, the processing proceeds to step 1807 where the VLAN is changed on each storage DPG.

Another option is to change the VLAN using an intermediate or temporary storage network as in FIG. 19. The FIG. 19 process flow begins with step 1901, where a determination is made that only the VLAN has changed in the proposed storage network reconfiguration (e.g., the FIG. 19 process flow is entered from step 1511 described above). In step 1903, a temporary subnet is picked for the storage network reconfiguration operation, where the temporary subnet is only needed during the reconfiguration and should have the same number of IP addresses as are currently in use but may have a different prefix. In step 1905, the shadow network algorithm (e.g., of FIGS. 20A-20H described below) is performed with the new VLAN and the temporary subnet picked in step 1903, such that the temporary subnet is non-disruptively switched to the new VLAN. In step 1907, the shadow network algorithm (e.g., of FIGS. 20A-20H described below) is performed with the old subnet, such that the old subnet is non-disruptively switched and the temporary subnet is no longer used.

Once the edge cases are handled (e.g., using one or more the FIG. 16-19 process flows described above), the shadow network approach of FIGS. 20A-20H can be used for all other cases. Such cases include, but are not limited to: change of the whole subnet (e.g., assuming change of the gateway if it exists, or removal of the gateway if the new subnet doesn't have one), where the new subnet may have a different prefix but should still have enough IP addresses; change of the VLAN and the subnet, where the new subnet should be visible only in the new VLAN and the old subnet should not be visible in the new VLAN, and where the new subnet may have a different prefix and/or a different gateway; change of IP address range within the same subnet, with or without VLAN change, where if the VLAN is not changed there is an extra target or initiator portal and eventual removal of the old one, and where if the VLAN is changed it is assumed that the VLAN is already changed (e.g., using one of the FIG. 18 and FIG. 19 algorithms); changes with the same subnet assumes that the prefix has not changed, but the IP addresses are validated (e.g., that they still belong to the same subnet and that only the host part is changed); etc.

Figure 20A:
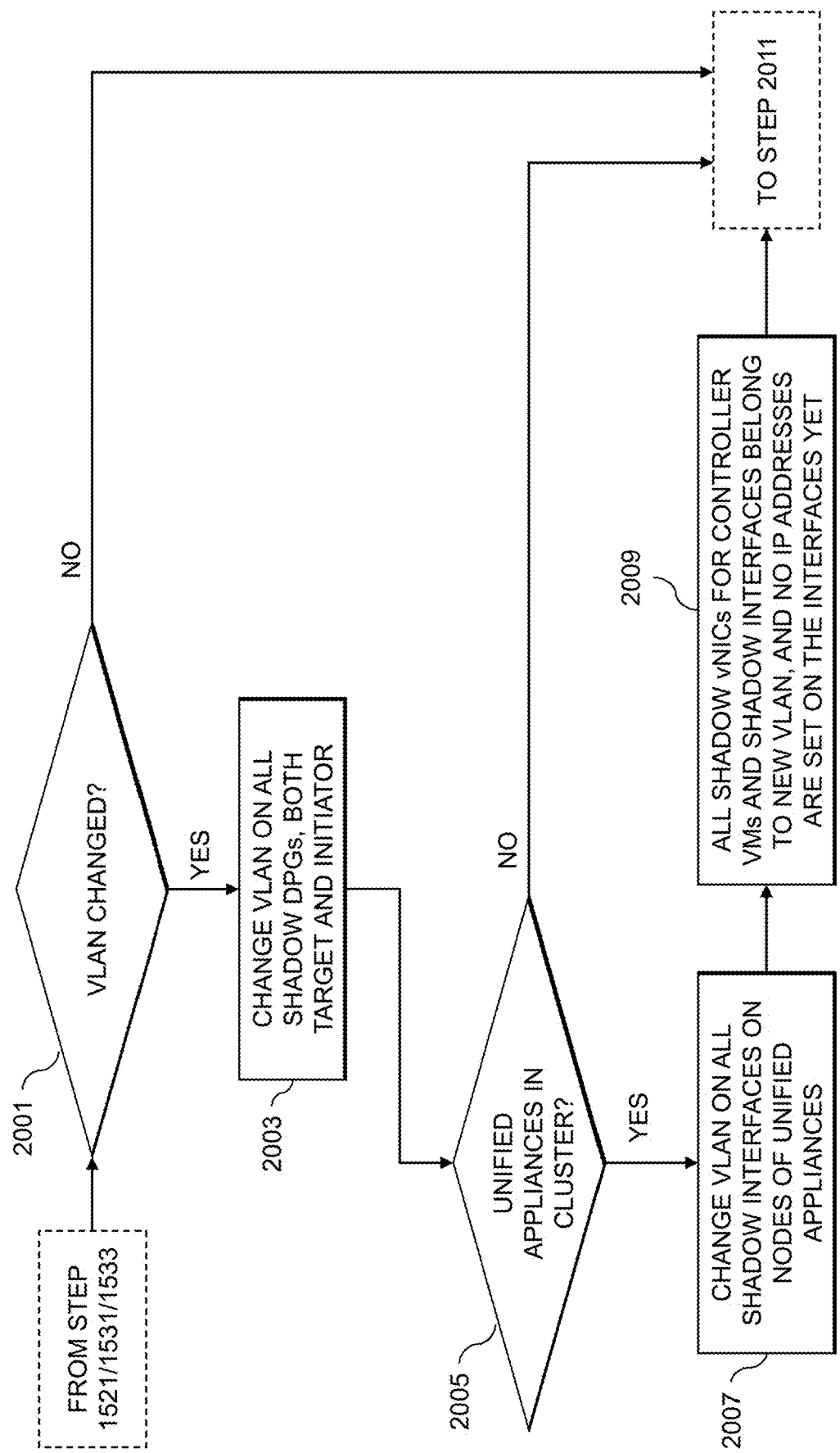

The process flow of FIGS. 20A-20H begins, as shown in FIG. 20A, with step 2001 where a determination is made as whether the VLAN is changed in the proposed storage network reconfiguration. Step 2001 is entered from step 1521, 1531 or 1533 in the process flow of FIGS. 15A-15E, or may be invoked as part of the FIG. 19 process flow as described above. If the result of the step 2001 determination is yes, the process flow proceeds to step 2003 where the VLAN is changed on all shadow DPGs, both target and initiator. In step 2005, a determination is made as to whether there are bare-metal appliances in the storage cluster. If the result of the step 2005 determination is yes, the process flow proceeds to step 2007 where the VLAN is changed on all shadow interfaces on nodes of the bare-metal appliances (e.g., 1403-A and 1403-B). In step 2009, all shadow vNICs for controller VMs and shadow interfaces belong to the new VLAN, and no IP addresses are set on the interfaces yet. The process flow then proceeds to step 2011. The process flow also proceeds to step 2011 if the result of the step 2001 determination is no, or if the result of the step 2005 determination is no.

Figure 20B:
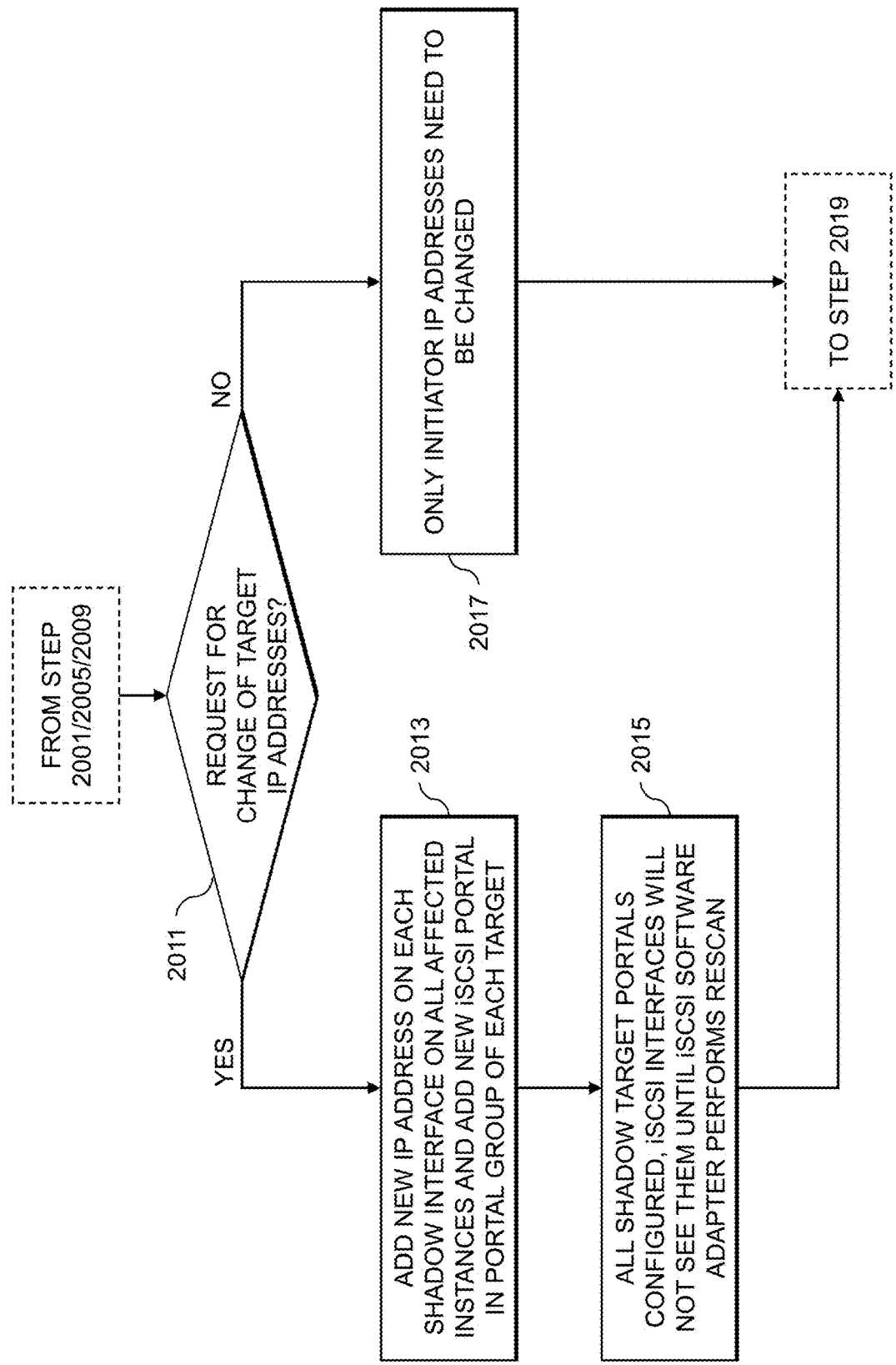
Figure 20C:
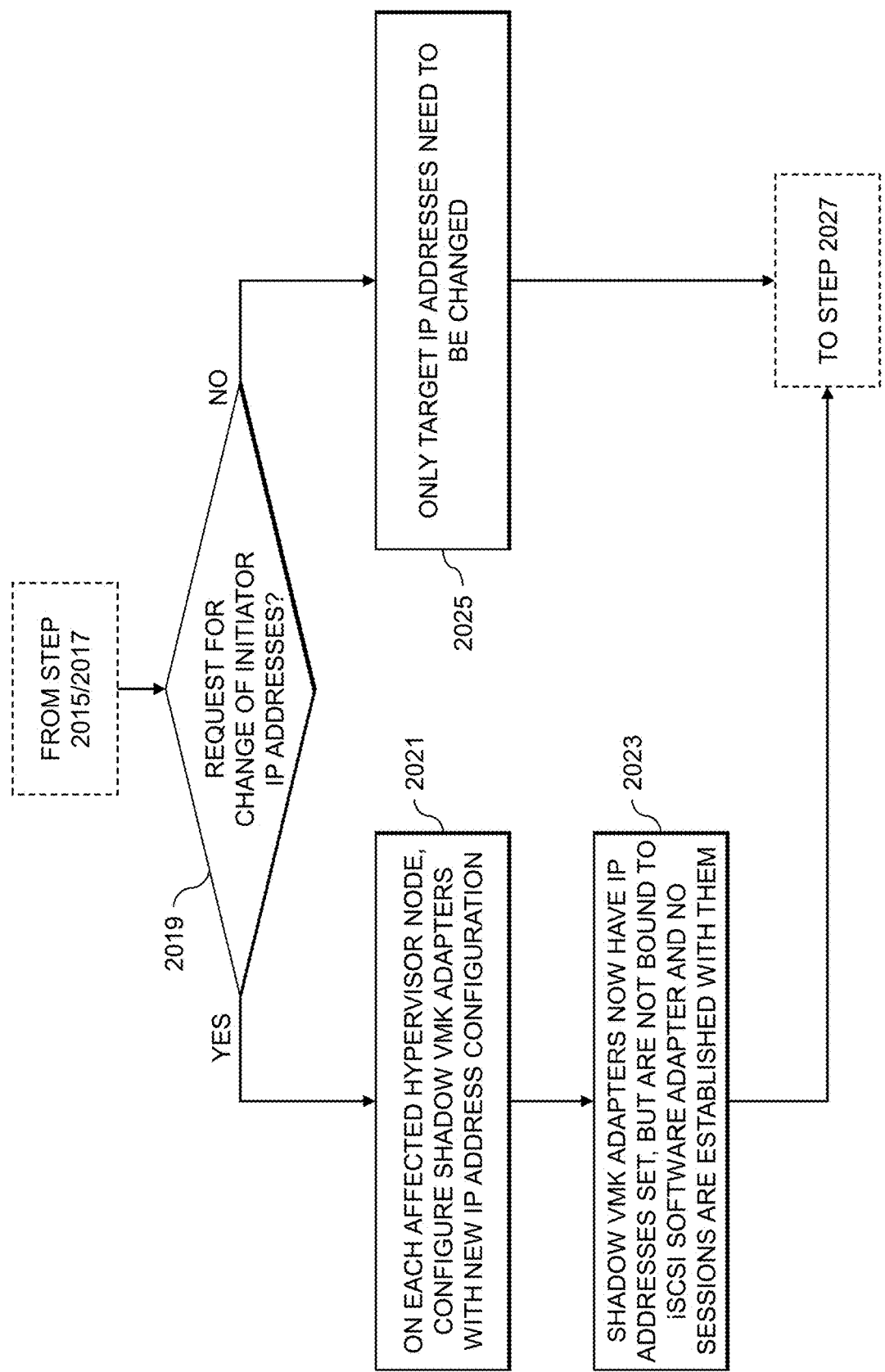
Figure 20D:
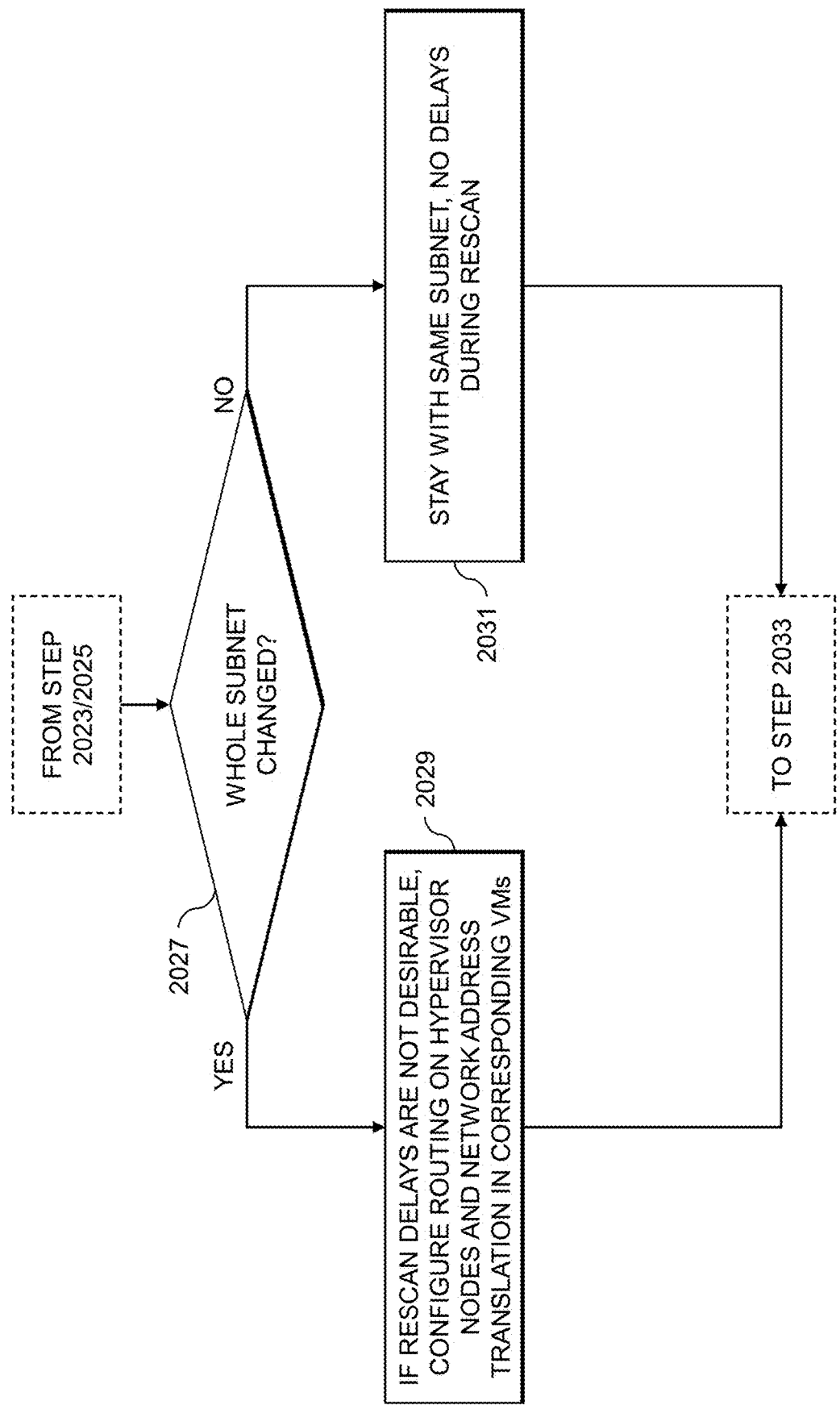
Figure 20E:
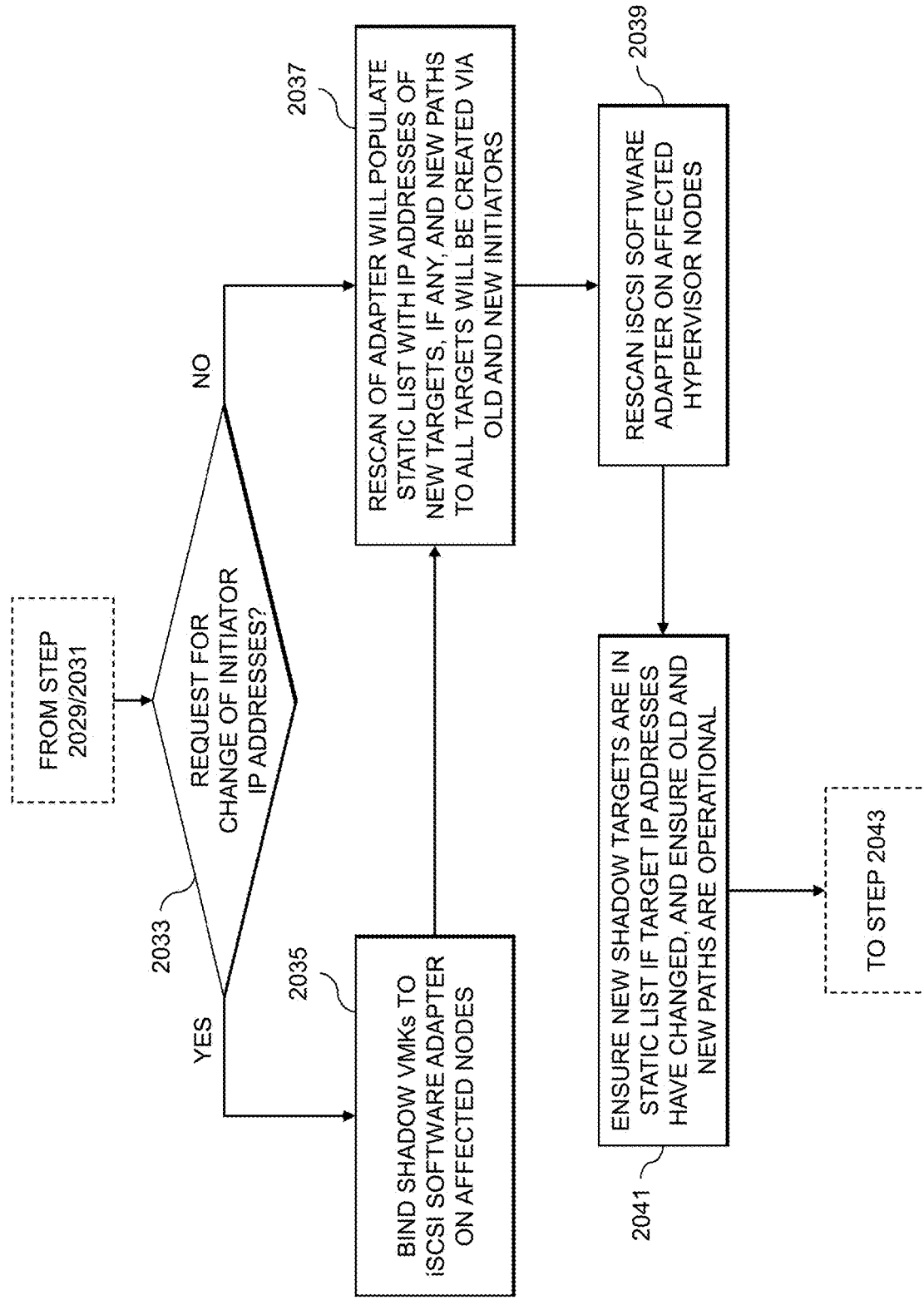
Figure 20F:
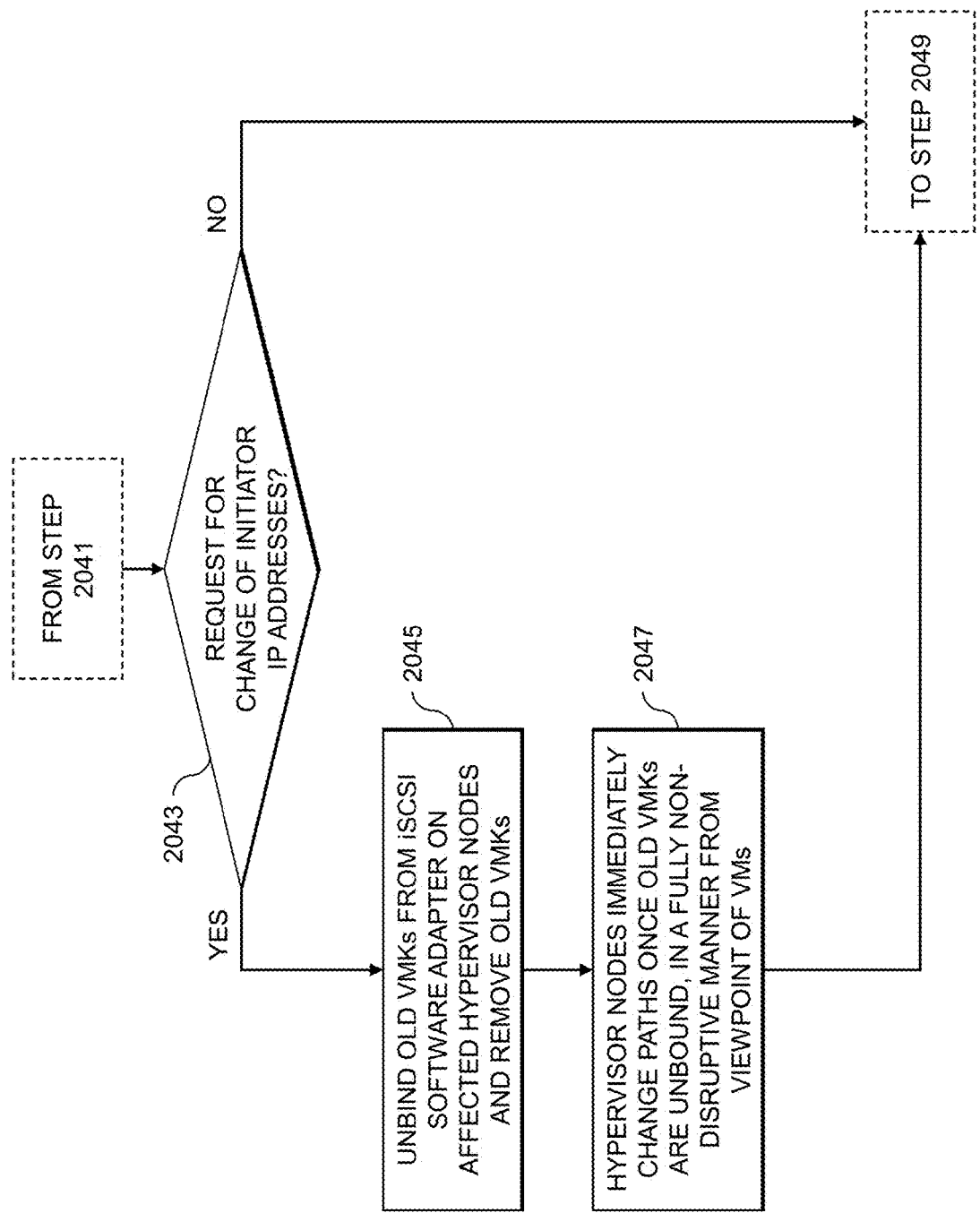
Figure 20H:
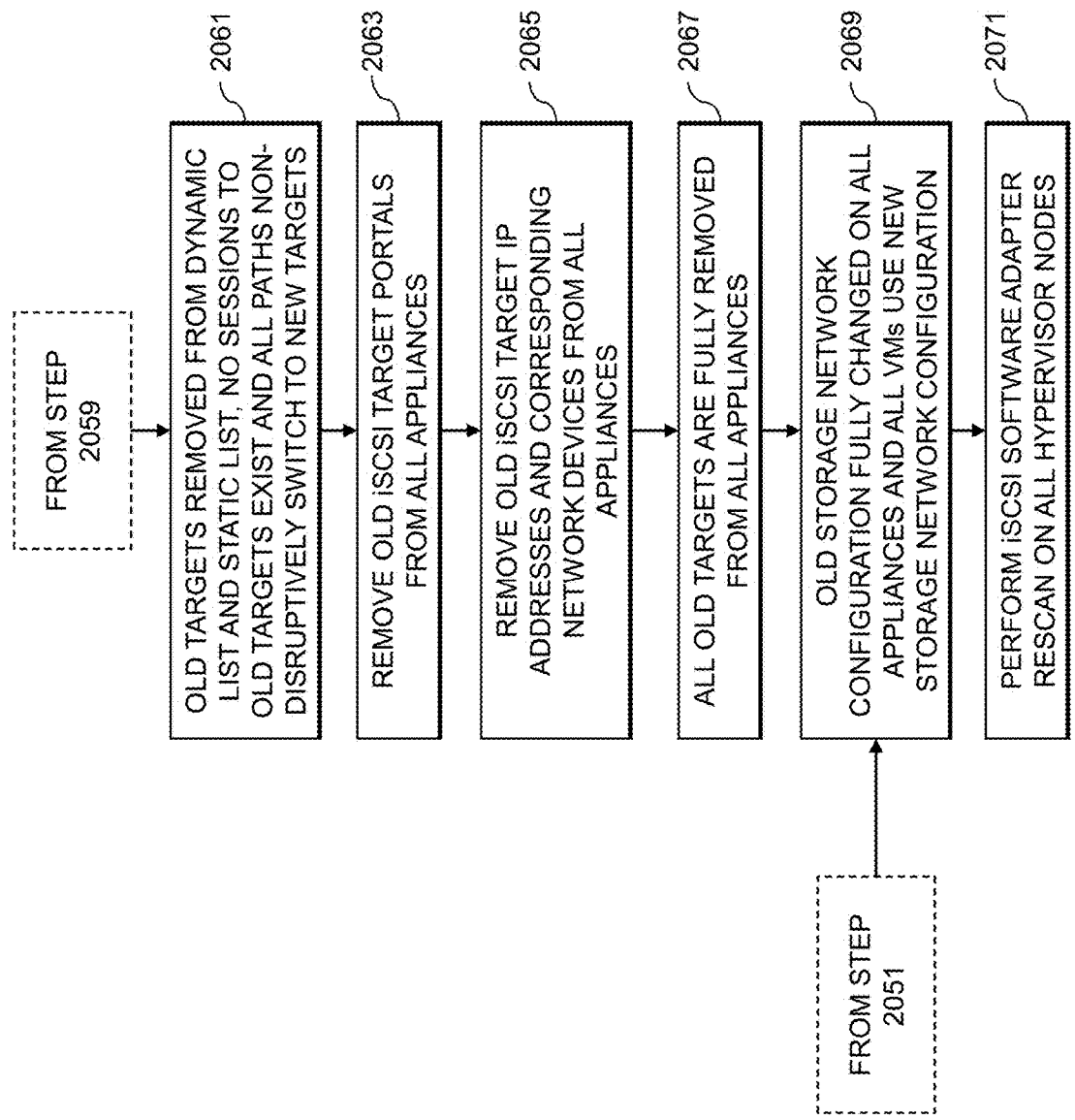

As shown in FIG. 20B, a determination is made in step 2011 as to whether the proposed storage network reconfiguration includes a request for change of target IP addresses. If the result of the step 2011 determination is yes, the process flow proceeds to step 2013 where a new IP address is added on each shadow interface on all affected instances and a new iSCSI portal is added in the portal group of each target. In step 2015, all shadow target portals are configured, and the iSCSI interfaces will not see them until the iSCSI software adapter performs a rescan. If the result of the step 2011 determination is no, the process flow proceeds to step 2017 where only initiator IP addresses need to be changed. Following step 2015 or 2017, the process flow proceeds to step 2019 as shown in FIG. 20C.

In step 2019, a determination is made as to whether the proposed storage network reconfiguration includes a request for change of initiator IP addresses. If the result of the step 2019 determination is yes, the process flow proceeds to step 2021 where, on each affected hypervisor node, shadow VMK adapters are configured with the new IP address configuration. In step 2023, the shadow VMK adapters now have IP addresses set, but are not bound to the iSCSI software adapter and no sessions are established with them. If the result of the step 2019 determination is no, the process flow proceeds to step 2025 where only target IP addresses need to be changed. Following step 2023 or 2025, the process flow proceeds to step 2027 shown in FIG. 20D.

In step 2027, a determination is made as to whether the whole subnet is changed in the proposed storage network reconfiguration. If the result of the step 2027 determination is yes, the process flow proceeds to step 2029 where, if rescan delays are not desirable, routing is configured on hypervisor nodes and network address translation (NAT) in corresponding VMs. If the result of the step 2027 determination is no, the process flow proceeds to step 2031 where the same subnet is used and there are no delays during rescan. Following step 2029 or 2031, the process flow proceeds to step 2033 shown in FIG. 20E.

In step 2033, a determination is made as to whether the proposed storage network reconfiguration includes a request for change of initiator IP addresses. If the result of the step 2033 determination is yes, the process flow proceeds to step 2035 where the shadow VMKs are bound to the iSCSI software adapter on affected nodes. Following step 2035, or if the result of the step 2033 determination is no, the process flow proceeds to step 2037 where a rescan of the iSCSI software adapter will populate the static list with IP addresses of new targets (if any) and new paths to all targets will be created via the old and new initiators. In step 2039, the iSCSI software adapter performs rescan on affected hypervisor nodes. In step 2041, it is ensured that new shadow targets are in the static list if target IP addresses have changed and that old and new paths are operational. Processing then proceeds to step 2043 shown in FIG. 20F.

In step 2043, a determination is made as to whether the proposed storage network reconfiguration includes a request for change of initiator IP addresses. If the result of the step 2043 determination is yes, the process flow proceeds to step 2045 where the old VMKs are unbound from the iSCSI software adapter on affected hypervisor nodes and the old VMKs are removed. In step 2047, the hypervisor nodes immediately change paths once the old VMKs are unbound, in a fully non-disruptive manner from the viewpoint of the associated VMs. Following step 2047, or if the result of the step 2043 determination is no, the process flow proceeds to step 2049 shown in in FIG. 20G.

In step 2049, a determination is made as to whether the proposed storage network reconfiguration includes a request for change of target IP addresses. If the result of the step 2051 determination is no, the process flow proceeds to step 2051 where old VMKs have already been unbound and removed, which means new initiators are working with the old targets. Following step 2051, the process flow proceeds to step 2069 shown in FIG. 20H.

If the result of the step 2049 determination is yes, the process flow proceeds to step 2053 where the old targets may or may not be used, but may be removed because all initiators are already aware of the new targets. In step 2055, new targets are added in the dynamic list of the iSCSI software adapter on each hypervisor node. The new targets are in the dynamic list in step 2057, and discovery will consider them on rescan. In step 2059, the old targets are removed from the dynamic list of the iSCSI software adapter on each hypervisor node. The process flow then proceeds to step 2061 shown in FIG. 20H.

In step 2061, the old targets are removed from the dynamic list and the static list, and no sessions to the old targets exist and all paths non-disruptively switch to the new targets. In step 2063, the old iSCSI target portals are removed from all appliances. The old iSCSI target IP addresses are removed in step 2065, along with corresponding network devices from all appliances. In step 2067, the old targets are all fully removed from all appliances. Following step 2067 or step 2051, the old storage network configuration is fully changed on all appliances and all VMs use the new storage network configuration in step 2069. In step 2071, an optional rescan is performed on the iSCSI software adapter on all hypervisor nodes.

Figure 21:
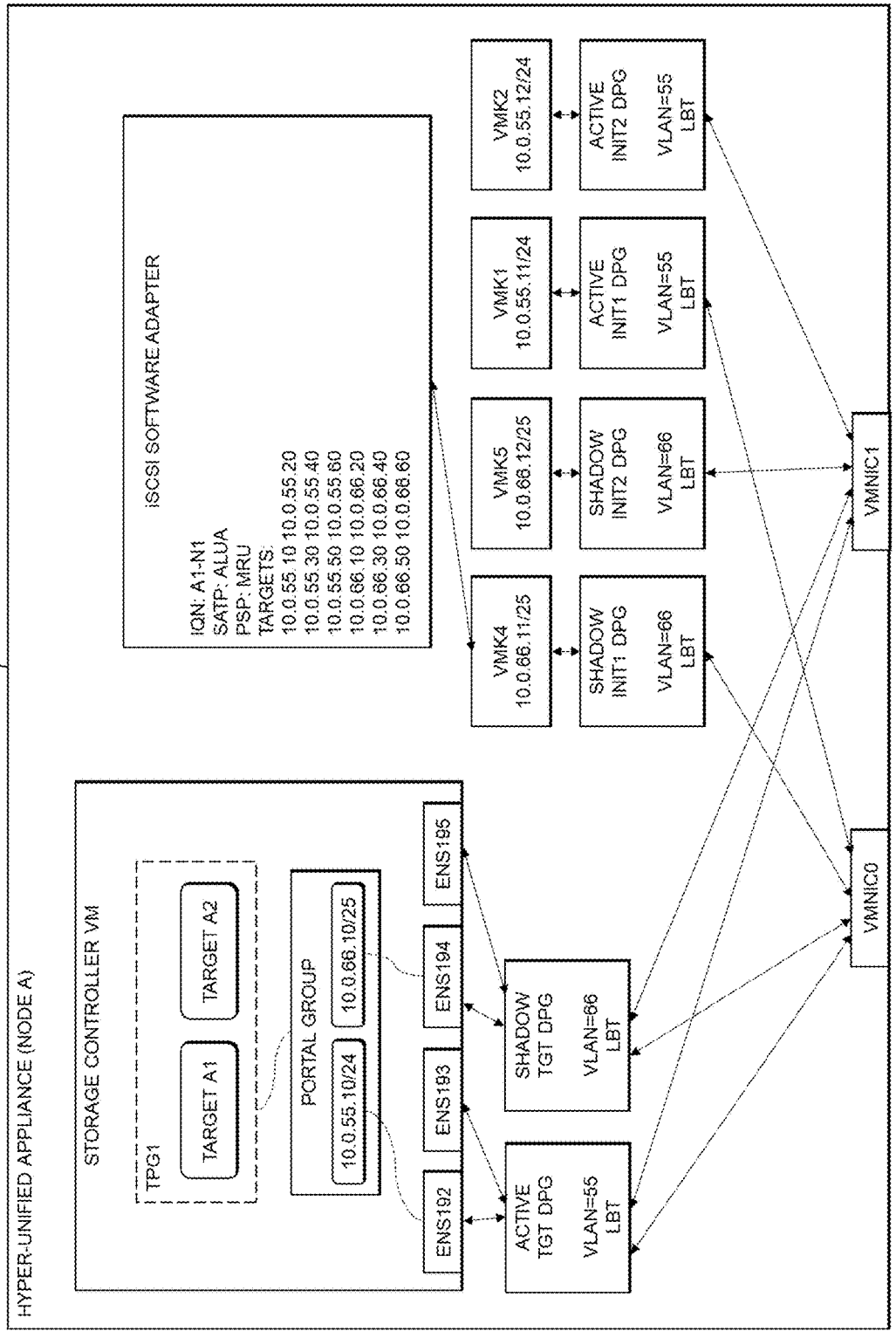
FIG. 21 illustrates components of a hyper-converged infrastructure appliance of a storage cluster used for shadow network reconfiguration of a shadow network in an illustrative embodiment.

In order to implement the shadow network algorithm of FIGS. 20A-20H, hypervisor (e.g., ESXi networking) is modified. On HCI appliances, various additional components are used. FIG. 21, for example, illustrates a HCI appliance node 2100 that shows the "extra" components relative to the corresponding HCI appliance node 1401-A (for clarity, PEs are omitted from FIG. 21): an extra DPG for targets is added (e.g., shadow TGT DPG); two extra vNICs (e.g., ens194 and ens195) connected to the targets DGP and controller VM (four, if considering port scaling); two extra DPGs for initiators (e.g., shadow INIT1 DPG and shadow INIT2 DGP); and two extra VMKs for the extra initiators (e.g., VMK4 and VMK5). It should be noted that these "extra" components are only needed during the storage network reconfiguration, and are not needed for normal operation of the storage cluster.

Figure 22:
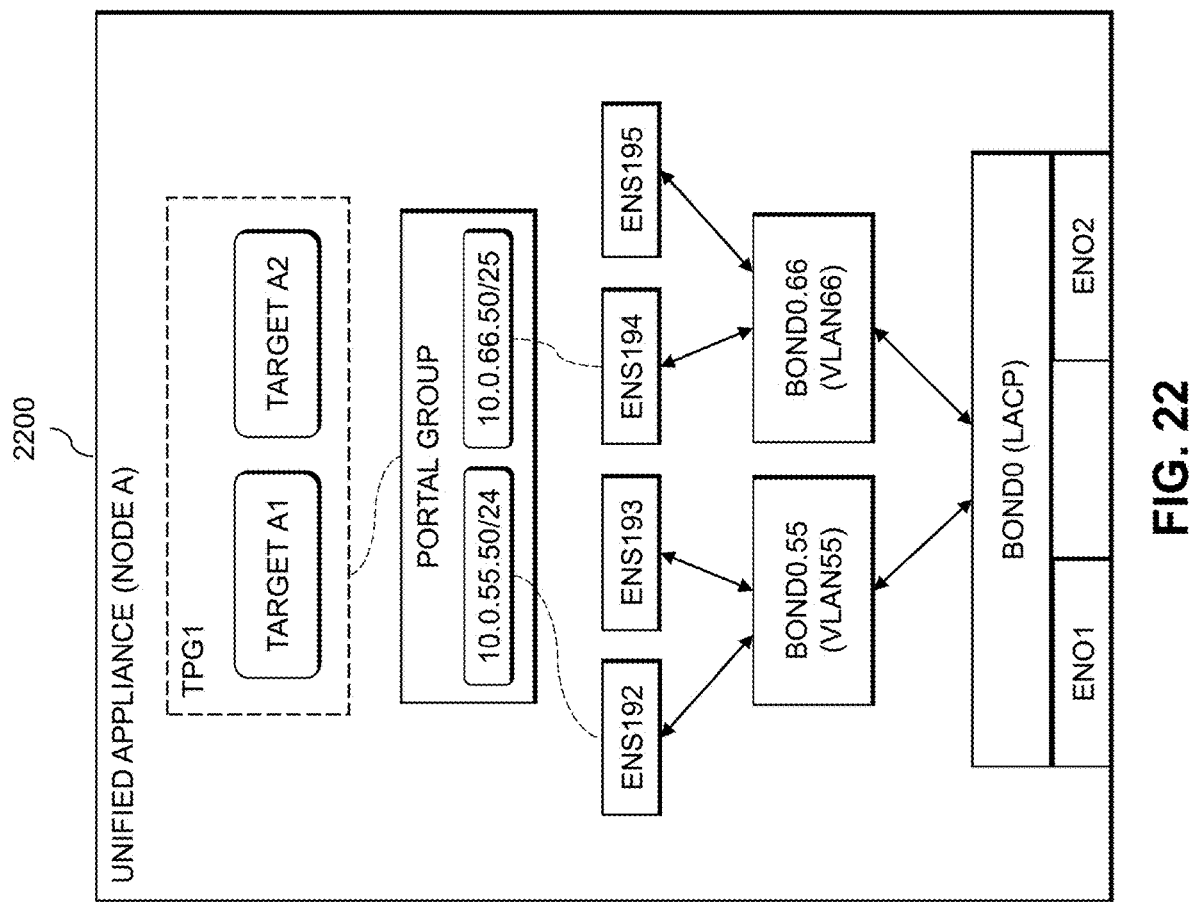
FIG. 22 illustrates components of a bare-metal appliance of a storage cluster used for shadow network reconfiguration of a shadow network in an illustrative embodiment.

In a similar manner, additional components are used in bare-metal appliance nodes (e.g., 1403-A and 1403-B). Whereas the HCI appliance nodes use more vNICs to support the shadow network algorithm, on the bare-metal appliance nodes more virtual interfaces (e.g., VLAN or macvlan) are used to support the shadow network algorithm. FIG. 22, for example illustrates a bare-metal appliance node 2200 that shows "extra" components relative to the corresponding bare-metal appliance node 1403-A (again, for clarity, PEs are omitted from FIG. 22). Additional virtual interfaces (e.g., ens194 and ens195) are added along with the additional bound component (e.g., bond0.66). In either case, an extra iSCSI target portal is created and put into a portal group for a particular target (e.g., where the IP address for the extra portal is created on top of a virtual device associated with the bond or physical port). It is assumed that this is possible to achieve in PSI25 after XMS refactoring is done.

In some embodiments, techniques are used to avoid rescan delays in the case of different subnets with the proposed storage network reconfiguration. Because rescan of the iSCSI adapter on the hypervisor (e.g., ESXi) side is an important operation performed during the reconfiguration, it is highly desirable to avoid rescan delays caused by the usage of bound VMKs in different subnets. If both subnets have a gateway configured and each network is visible via that gateway, then there should not be observable delays and the rescan should be fast. However, if different subnets don't have gateways or the other subnet is not reachable via the provided gateway, techniques may be used to minimize the time of the adapter rescan. Such techniques leverage the fact that each HCI appliance nodes has a controller VM running thereon that has vNICs connected to both the current and shadow networks. The controller VM (e.g., using CoreOS Linux running inside of it) may be used as a distributed router. For each bound VMK on the hypervisor (e.g., ESXi) side, the IP address of the corresponding iSCSI target is configured on the local controller VM as a gateway. This may be done for each VMK without touching the routing configuration for the default TCP/IP stack of the hypervisor (e.g., ESXi).

Then, on the CoreOS side, the routing tables are modified. The "ip_forward" feature is assumed to be enabled, and routes are set up in the main routing tables in addition to what is in the PBR tables for the storage interfaces. In addition to that, each PBR table is updated with routes to the second network (e.g., the current network PBR should reference the shadow network, and vice versa). Masquerading is also configured on both interfaces. With the configuration above, each VMK on the hypervisor (e.g., ESXi) side can reach each target IP regardless of which network it belongs to. For its own targets, the local subnet is used. For the targets in shadow network, the local controller VM is used as a gateway. Packets sent to the controller VM are then routed between storage interfaces and get sent to the destination network after NAT. The PE has paths to all targets in both networks (e.g., for both MRU PSP and RR PSP). It should be noted that the above implementation of a distributed router is presented by way of example only, and that other implementations may be used in other embodiments.

Experiments with a storage cluster having two HCI appliances demonstrate the efficacy of the techniques described herein. A number of tenant or user VMs were deployed on the two HCI appliances, with each running an instance of a tool that runs I/O to the virtual disk backed by the VVol. With this setup, there was active I/O running and reconfiguration of the cluster was performed to see the maximum latency reported inside the tenant VMs. Several tests were conducted, including: reconfiguration with one tenant VM running and doing local I/O; reconfiguration with one tenant VM running and doing remote I/O; reconfiguration with 40 tenant VMs running on all 4 nodes of the storage cluster doing local and remote I/O. During all tests with a single VM, the tool never reported maximum latency exceeding one second. Usual numbers were in a range of 650-850 milliseconds (ms). During the tests with 40 VMs, maximum latency didn't exceed 2.5 seconds, but the reason for this is that baseline maximum latency was about 1.8 due to bad storage cluster performance (e.g., latency without reconfiguration going was still bad). In both cases, the maximum latency was significantly lower than anything achieved by relying on hypervisor (e.g., ESXi) dead path detection and path failover. The shadow network approach is thus viable and enables cluster-wide storage network reconfiguration fully non-disruptively.

Advantageously, the techniques described herein enable fully non-disruptive storage network reconfiguration for HCI and heterogeneous storage clusters using block protocols with multi-pathing support (e.g., iSCSI, NVMeoF, etc.). The techniques described herein further enable zero-configuration internal storage interconnection for HCI clusters not requiring access to the external block storage which eliminates the need for reconfiguration completely, and fully automatic storage network reconfiguration for storage clusters without external storage initiators. Techniques described herein may also be used for automating all storage system side reconfiguration operations for heterogeneous storage clusters with external storage initiators (e.g., including reporting of currently configured storage initiators and automatic detection of switchover completion on external hosts).

Some embodiments further do not require the storage cluster to support multiple user-visible storage networks represented as separate objects and are fully compatible with storage initiators supporting only one storage network. For internal storage initiators not supporting two storage networks without external routing, some embodiments provide fully transparent intra-cluster traffic routing to avoid network timeouts during reconfiguration. Algorithms are provided which can work for any number of storage networks and for both internal and external storage initiators. Some embodiments further support any granularity of the reconfiguration, from a single IP address of the storage initiator or target to changing the entire cluster-wide storage subnet, IP version and VLAN at the same time. The algorithms used can guarantee continuous availability and non-disruptive access to the storage targets regardless of storage cluster management and orchestrator performance and order of operations within any of three major phases (e.g., any storage initiator always has access to any storage target in the cluster at any stage of the reconfiguration process).

Illustrative embodiments further enable an approach to fully automatic and non-disruptive storage network reconfiguration applicable to pure HCI clusters as well as heterogeneous storage clusters with external storage initiators and any number of storage networks. Two approaches to zero configuration of the storage network for the storage clusters (e.g., with and without further non-disruptive reconfiguration support via a shadow network approach) are disclosed. Some embodiments further integrate a common algorithm with the reconfiguration of the external storage initiators (including reporting of currently configured storage initiators and automatic detection of switchover completion on external hosts). Advantageously, elimination of external routing requirements between old and new storage networks during the reconfiguration is enabled by providing transparent distributed routing via the local storage controller VMs collocated with internal storage initiators.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automatic reconfiguration of storage networks for heterogeneous storage clusters will now be described in greater detail with reference to FIGS. 23 and 24. Although described in the context of system 100, these platforms may also be used to implement at least portions of other information processing systems in other embodiments.

Figure 23:
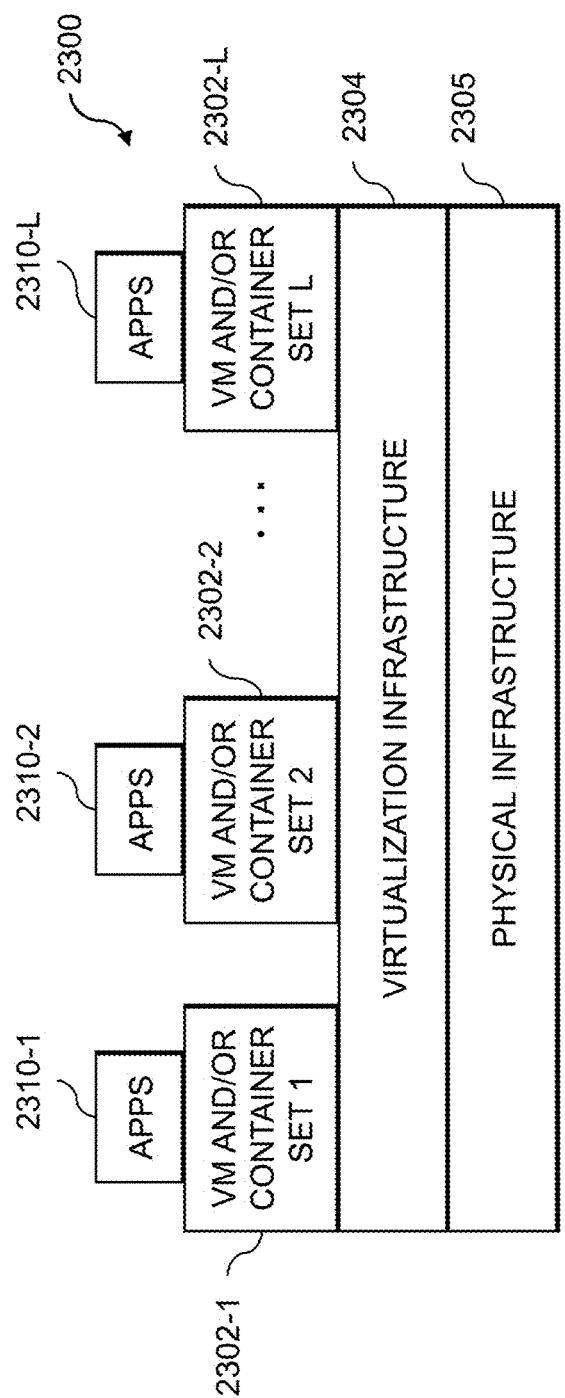
FIGS. 23 and 24 show examples of processing platforms that may be utilized to implement at least a portion of an information processing system in illustrative embodiments.
Figure 24:
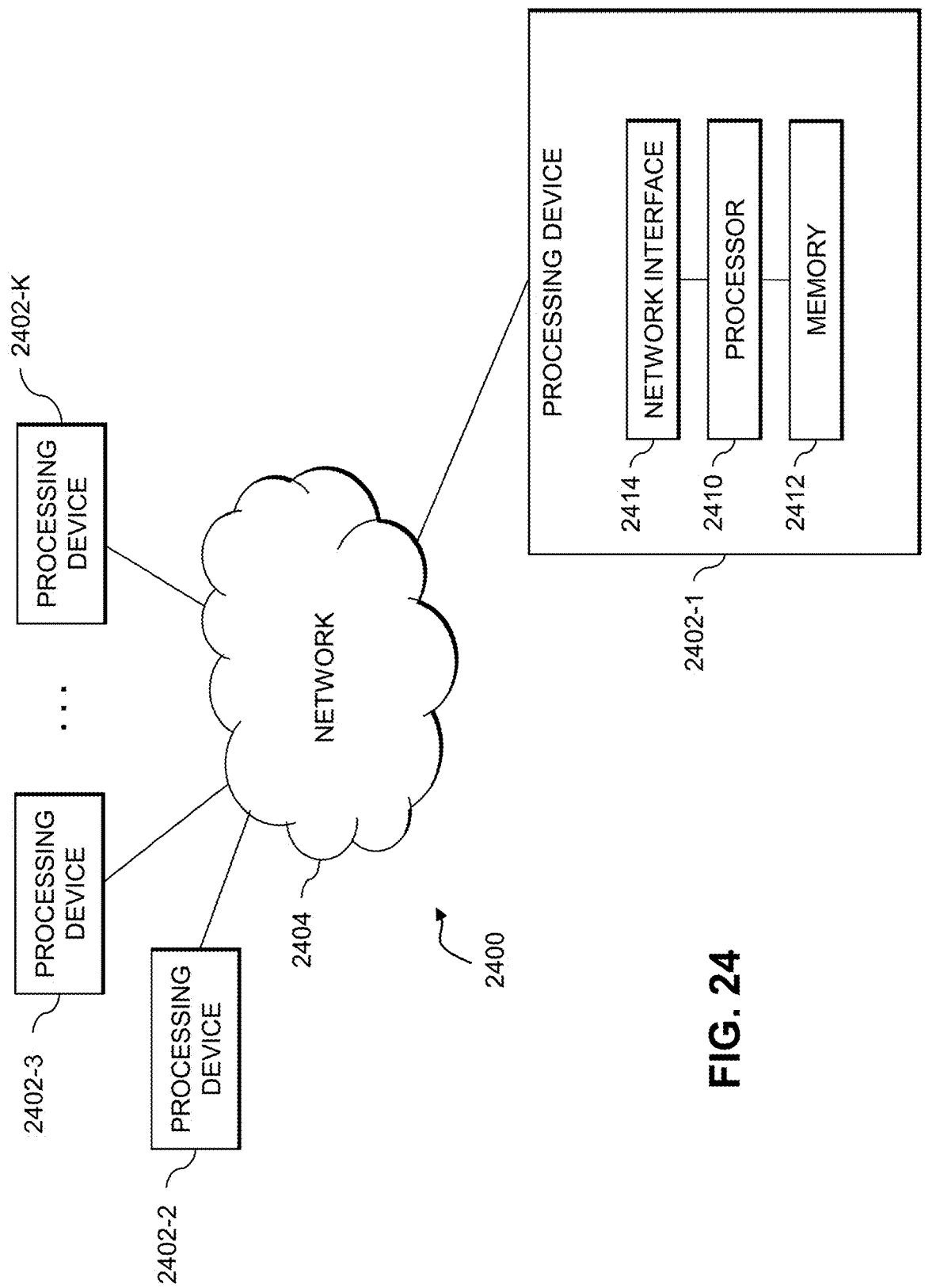

FIG. 23 shows an example processing platform comprising cloud infrastructure 2300. The cloud infrastructure 2300 comprises a combination of physical and virtual processing resources that may be utilized to implement at least a portion of the information processing system 100 in FIG. 1. The cloud infrastructure 2300 comprises multiple VMs and/or container sets 2302-1, 2302-2, ... 2302-L implemented using virtualization infrastructure 2304. The virtualization infrastructure 2304 runs on physical infrastructure 2305, and illustratively comprises one or more hypervisors and/or operating system level virtualization infrastructure. The operating system level virtualization infrastructure illustratively comprises kernel control groups of a Linux operating system or other type of operating system.

The cloud infrastructure 2300 further comprises sets of applications 2310-1, 2310-2, ... 2310-L running on respective ones of the VMs/container sets 2302-1, 2302-2, ... 2302-L under the control of the virtualization infrastructure 2304. The VMs/container sets 2302 may comprise respective VMs, respective sets of one or more containers, or respective sets of one or more containers running in VMs.

In some implementations of the FIG. 23 embodiment, the VMs/container sets 2302 comprise respective VMs implemented using virtualization infrastructure 2304 that comprises at least one hypervisor. A hypervisor platform may be used to implement a hypervisor within the virtualization infrastructure 2304, where the hypervisor platform has an associated virtual infrastructure management system. The underlying physical machines may comprise one or more distributed processing platforms that include one or more storage systems.

In other implementations of the FIG. 23 embodiment, the VMs/container sets 2302 comprise respective containers implemented using virtualization infrastructure 2304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2300 shown in FIG. 23 may represent at least a portion of one processing platform. Another example of such a processing platform is processing platform 2400 shown in FIG. 24.

The processing platform 2400 in this embodiment comprises a portion of system 100 and includes a plurality of processing devices, denoted 2402-1, 2402-2, 2402-3, . . . 2402-K, which communicate with one another over a network 2404.

The network 2404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2402-1 in the processing platform 2400 comprises a processor 2410 coupled to a memory 2412.

The processor 2410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2412 may comprise random access memory (RAM), read-only memory (ROM), flash memory or other types of memory, in any combination. The memory 2412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2402-1 is network interface circuitry 2414, which is used to interface the processing device with the network 2404 and other system components, and may comprise conventional transceivers.

The other processing devices 2402 of the processing platform 2400 are assumed to be configured in a manner similar to that shown for processing device 2402-1 in the figure.

Again, the particular processing platform 2400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automatic reconfiguration of storage networks for heterogeneous storage clusters as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, storage network configurations, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a request to change a given storage network from a first configuration to a second configuration, the given storage network being associated with a heterogeneous storage cluster comprising a plurality of storage targets and storage initiators having first network addresses in the first configuration;
generating a shadow storage network comprising second network addresses having the second configuration;
assigning ones of the second network addresses in the shadow storage network to at least a subset of the plurality of storage targets and storage initiators in the heterogeneous storage cluster affected by the request to change the given storage network from the first configuration to the second configuration;
validating connectivity of the subset of the plurality of storage targets and storage initiators with one or more other ones of the plurality of storage targets and storage initiators utilizing the second network addresses in the shadow storage network; and
responsive to validating the connectivity of the subset of the plurality of storage targets and storage initiators, applying the requested change to the given storage network by unassigning ones of the first network addresses assigned to the subset of the plurality of storage targets and storage initiators.

2. The apparatus of claim 1 wherein the plurality of storage targets is implemented on at least one of:
one or more physical storage controllers of one or more storage systems in the heterogeneous storage cluster; and
one or more virtual storage controllers running on one or more embedded hypervisors of the one or more storage systems in the heterogeneous storage cluster.

3. The apparatus of claim 2 wherein the plurality of storage initiators comprises one or more internal storage initiators running on the one or more embedded hypervisors.

4. The apparatus of claim 2 wherein the plurality of storage initiators comprises one or more external storage initiators, each of the one or more external storage initiators running on one of:
one or more host devices external to the heterogeneous storage cluster; and
one or more virtual machines running on the one or more embedded hypervisors.

5. The apparatus of claim 4 wherein the given storage network comprises a public storage network associated with the heterogeneous storage cluster, and wherein the heterogeneous storage cluster is also associated with an intra-cluster storage network providing automatic addressing of third network addresses to the plurality of storage targets and one or more internal storage initiators running on the one or more embedded hypervisors.

6. The apparatus of claim 5 wherein the intra-cluster storage network provides the automatic addressing utilizing Unique Local Address (ULA) generation of the third network addresses for an Internet Protocol version 6 (IPv6) ULA subnet generated for the intra-cluster storage network.

7. The apparatus of claim 5 wherein at least one of the plurality of storage targets is associated with (i) at least one of the first network addresses in the given storage network for connection to the one or more external storage initiators and (ii) at least one of the third network addresses in the intra-cluster storage network for connection to the one or more external storage initiators.

8. The apparatus of claim 1 wherein assigning ones of the second network addresses in the shadow storage network to the subset of the plurality of storage targets and storage initiators comprises assigning ones of the second network addresses in the shadow storage network to any storage targets in the subset prior to assigning ones of the second network addresses in the shadow storage network to any storage initiators in the subset.

9. The apparatus of claim 8 wherein applying the requested change to the given storage network comprises unassigning ones of the first network addresses from any of the storage initiators in the subset prior to unassigning ones of the first network addresses from any of the storage targets in the subset.

10. The apparatus of claim 1 wherein validating connectivity of the subset of the plurality of storage targets and storage initiators comprises validating that each of the storage initiators is able to reach each of the storage targets utilizing both the given storage network and the shadow storage network.

11. The apparatus of claim 1 wherein the requested change to the given storage network comprises a request to change one or more of the first network addresses of one or more of the plurality of storage targets and storage initiators.

12. The apparatus of claim 1 wherein the requested change to the given storage network comprises a request to change a network address subnet utilized by the plurality of storage targets and storage initiators.

13. The apparatus of claim 1 wherein the first network addresses and the second network addresses comprise respective Internet Protocol (IP) addresses, and wherein the requested change to the given storage network comprises a request to change from a first IP version to a second IP version.

14. The apparatus of claim 1 wherein the requested change to the given storage network comprises a request to change a virtual local area network (VLAN) utilized by at least a subset of the plurality of storage targets and storage initiators.

15. A computer program product comprising a non-transitory processor-readable storage medium having stored therein program code of one or more software programs, wherein the program code when executed by at least one processing device causes the at least one processing device to perform steps of:
receiving a request to change a given storage network from a first configuration to a second configuration, the given storage network being associated with a heterogeneous storage cluster comprising a plurality of storage targets and storage initiators having first network addresses in the first configuration;
generating a shadow storage network comprising second network addresses having the second configuration;
assigning ones of the second network addresses in the shadow storage network to at least a subset of the plurality of storage targets and storage initiators in the heterogeneous storage cluster affected by the request to change the given storage network from the first configuration to the second configuration;
validating connectivity of the subset of the plurality of storage targets and storage initiators with one or more other ones of the plurality of storage targets and storage initiators utilizing the second network addresses in the shadow storage network; and
responsive to validating the connectivity of the subset of the plurality of storage targets and storage initiators, applying the requested change to the given storage network by unassigning ones of the first network addresses assigned to the subset of the plurality of storage targets and storage initiators.

16. The computer program product of claim 15 wherein the plurality of storage targets is implemented on at least one of:
one or more physical storage controllers of one or more storage systems in the heterogeneous storage cluster; and
one or more virtual storage controllers running on one or more embedded hypervisors of the one or more storage systems in the heterogeneous storage cluster.

17. The computer program product of claim 16 wherein the plurality of storage initiators comprises:
one or more internal storage initiators running on the one or more embedded hypervisors; and
one or more external storage initiators, each of the one or more external storage initiators running on one of (i) one or more host devices external to the heterogeneous storage cluster and (ii) one or more virtual machines running on the one or more embedded hypervisors.

18. A method comprising steps of:
receiving a request to change a given storage network from a first configuration to a second configuration, the given storage network being associated with a heterogeneous storage cluster comprising a plurality of storage targets and storage initiators having first network addresses in the first configuration;

generating a shadow storage network comprising second network addresses having the second configuration;

assigning ones of the second network addresses in the shadow storage network to at least a subset of the plurality of storage targets and storage initiators in the heterogeneous storage cluster affected by the request to change the given storage network from the first configuration to the second configuration;

validating connectivity of the subset of the plurality of storage targets and storage initiators with one or more other ones of the plurality of storage targets and storage initiators utilizing the second network addresses in the shadow storage network; and responsive to validating the connectivity of the subset of the plurality of storage targets and storage initiators, applying the requested change to the given storage network by unassigning ones of the first network addresses assigned to the subset of the plurality of storage targets and storage initiators;

wherein the method is performed by at least one processing device comprising a processor coupled to a memory.

19. The method of claim 18 wherein the plurality of storage targets is implemented on at least one of:

one or more physical storage controllers of one or more storage systems in the heterogeneous storage cluster; and one or more virtual storage controllers running on one or more embedded hypervisors of the one or more storage systems in the heterogeneous storage cluster.

20. The method of claim 18 wherein the plurality of storage initiators comprises:

one or more internal storage initiators running on the one or more embedded hypervisors; and one or more external storage initiators, each of the one or more external storage initiators running on one of (i) one or more host devices external to the heterogeneous storage cluster and (ii) one or more virtual machines running on the one or more embedded hypervisors.

* * * * *